US008195760B2

(12) United States Patent
Lacapra et al.

(10) Patent No.: US 8,195,760 B2
(45) Date of Patent: *Jun. 5, 2012

(54) FILE AGGREGATION IN A SWITCHED FILE SYSTEM

(75) Inventors: Francesco Lacapra, Sunnyvale, CA (US); Srinivas P. Duvvuri, Hyderabad (IN); Vladimir I. Miloushev, Dana Point, CA (US); Krasimira Nikolova, legal representative, Dana Point, CA (US); Peter A. Nickolov, Laguna Niguel, CA (US)

(73) Assignee: F5 Networks, Inc., Seattle, WA (US)

( * ) Notice: Subject to any disclaimer, the term of this patent is extended or adjusted under 35 U.S.C. 154(b) by 251 days.

This patent is subject to a terminal disclaimer.

(21) Appl. No.: 12/104,197

(22) Filed: Apr. 16, 2008

(65) Prior Publication Data

US 2009/0106255 A1    Apr. 23, 2009

Related U.S. Application Data

(63) Continuation-in-part of application No. 10/043,413, filed on Jan. 10, 2002, now Pat. No. 7,562,110, which is a continuation-in-part of application No. 10/336,832, filed on Jan. 2, 2003, now Pat. No. 7,512,673, which is a continuation-in-part of application No. 10/043,413, filed on Jan. 10, 2002, now Pat. No. 7,562,110.

(60) Provisional application No. 60/261,153, filed on Jan. 11, 2001.

(51) Int. Cl.
*G06F 13/00* (2006.01)

(52) U.S. Cl. ......... 709/214; 709/215; 709/219; 707/600

(58) Field of Classification Search ................... 709/213, 709/214, 215, 217, 219; 707/600
See application file for complete search history.

(56) References Cited

U.S. PATENT DOCUMENTS 4,993,030 A    2/1991    Krakauer et al.
(Continued)

FOREIGN PATENT DOCUMENTS

AU    2003300350 A1    7/2004
(Continued)

OTHER PUBLICATIONS

Basney, Jim et al., "Credential Wallets: A Classification of Credential Repositories Highlighting MyProxy," TPRC 2003, Sep. 19-21, 2003.

(Continued)

*Primary Examiner* — Viet Vu
(74) *Attorney, Agent, or Firm* — LeClairRyan, a Professional Corporation

(57) ABSTRACT

In a switched file system, a file switching device is logically positioned between clients and file servers and communicates with the clients and the file servers using standard network file protocols. The file switching device appears as a server to the client devices and as a client to the file servers. The file switching device aggregates storage from multiple file servers into a global filesystem and presents a global namespace to the client devices. The file switching device typically supports a "native" mode for integrating legacy files into the global namespace and an "extended" mode for actively managing files across one or more file servers. Typically, native-mode files may be accessed directly or indirectly via the file switching device, while extended-mode files may be accessed only through the file switching device. The file switching device may manage file storage using various types of rules, e.g., for managing multiple storage tiers or for applying different types of encoding schemes to files. Rules may be applied to pre-existing files.

51 Claims, 17 Drawing Sheets

A reference NFM configuration

U.S. PATENT DOCUMENTS

| | | | |
|---|---|---|---|
| 5,218,695 A | 6/1993 | Noveck et al. |
| 5,303,368 A | 4/1994 | Kotaki |
| 5,473,362 A | 12/1995 | Fitzgerald et al. |
| 5,511,177 A | 4/1996 | Kagimasa et al. |
| 5,537,585 A | 7/1996 | Blickenstaff et al. |
| 5,548,724 A | 8/1996 | Akizawa et al. |
| 5,550,965 A | 8/1996 | Gabbe et al. |
| 5,583,995 A | 12/1996 | Gardner et al. |
| 5,586,260 A | 12/1996 | Hu |
| 5,590,320 A | 12/1996 | Maxey |
| 5,649,194 A | 7/1997 | Miller et al. |
| 5,649,200 A | 7/1997 | Leblang et al. |
| 5,668,943 A | 9/1997 | Attanasio et al. |
| 5,692,180 A | 11/1997 | Lee |
| 5,721,779 A | 2/1998 | Funk |
| 5,724,512 A | 3/1998 | Winterbottom |
| 5,806,061 A | 9/1998 | Chaudhuri et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,884,303 A | 3/1999 | Brown |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,920,873 A | 7/1999 | Van Huben et al. |
| 5,937,406 A * | 8/1999 | Balabine et al. ............. 1/1 |
| 5,999,664 A | 12/1999 | Mahoney et al. |
| 6,012,083 A | 1/2000 | Savitzky et al. |
| 6,029,168 A | 2/2000 | Frey |
| 6,044,367 A | 3/2000 | Wolff |
| 6,047,129 A | 4/2000 | Frye |
| 6,072,942 A | 6/2000 | Stockwell et al. |
| 6,078,929 A | 6/2000 | Rao |
| 6,085,234 A | 7/2000 | Pitts et al. |
| 6,088,694 A | 7/2000 | Burns et al. |
| 6,128,627 A | 10/2000 | Mattis et al. |
| 6,128,717 A | 10/2000 | Harrison et al. |
| 6,161,145 A | 12/2000 | Bainbridge et al. |
| 6,161,185 A | 12/2000 | Guthrie et al. |
| 6,181,336 B1 | 1/2001 | Chiu et al. |
| 6,223,206 B1 | 4/2001 | Dan et al. |
| 6,233,648 B1 | 5/2001 | Tomita |
| 6,237,008 B1 | 5/2001 | Beal et al. |
| 6,256,031 B1 | 7/2001 | Meijer et al. |
| 6,282,610 B1 | 8/2001 | Bergsten |
| 6,289,345 B1 | 9/2001 | Yasue |
| 6,308,162 B1 | 10/2001 | Ouimet et al. |
| 6,324,581 B1 | 11/2001 | Xu et al. |
| 6,339,785 B1 | 1/2002 | Feigenbaum |
| 6,349,343 B1 | 2/2002 | Foody et al. |
| 6,374,263 B1 | 4/2002 | Bunger et al. |
| 6,389,433 B1 | 5/2002 | Bolosky et al. |
| 6,393,581 B1 | 5/2002 | Friedman et al. |
| 6,397,246 B1 | 5/2002 | Wolfe |
| 6,412,004 B1 | 6/2002 | Chen et al. |
| 6,438,595 B1 | 8/2002 | Blumenau et al. |
| 6,477,544 B1 | 11/2002 | Bolosky et al. |
| 6,487,561 B1 | 11/2002 | Ofek et al. |
| 6,493,804 B1 | 12/2002 | Soltis et al. |
| 6,516,350 B1 | 2/2003 | Lumelsky et al. |
| 6,516,351 B2 | 2/2003 | Borr |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,601,101 B1 | 7/2003 | Lee et al. |
| 6,612,490 B1 | 9/2003 | Herrendoerfer et al. |
| 6,721,794 B2 | 4/2004 | Taylor et al. |
| 6,738,790 B1 | 5/2004 | Klein et al. |
| 6,742,035 B1 | 5/2004 | Zayas et al. |
| 6,748,420 B1 | 6/2004 | Quatrano et al. |
| 6,757,706 B1 | 6/2004 | Dong et al. |
| 6,775,673 B2 * | 8/2004 | Mahalingam et al. ........... 1/1 |
| 6,775,679 B2 | 8/2004 | Gupta |
| 6,782,450 B2 | 8/2004 | Arnott et al. |
| 6,801,960 B1 | 10/2004 | Ericson et al. |
| 6,826,613 B1 | 11/2004 | Wang et al. |
| 6,839,761 B2 | 1/2005 | Kadyk et al. |
| 6,847,959 B1 | 1/2005 | Arrouye et al. |
| 6,847,970 B2 | 1/2005 | Keller et al. |
| 6,850,997 B1 | 2/2005 | Rooney et al. |
| 6,889,249 B2 | 5/2005 | Miloushev et al. |
| 6,922,688 B1 | 7/2005 | Frey, Jr. |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,959,373 B2 | 10/2005 | Testardi |
| 6,961,815 B2 | 11/2005 | Kistler et al. |
| 6,973,455 B1 | 12/2005 | Vahalia et al. |
| 6,973,549 B1 | 12/2005 | Testardi |
| 6,985,936 B2 | 1/2006 | Agarwalla et al. |
| 6,985,956 B2 | 1/2006 | Luke et al. |
| 6,986,015 B2 | 1/2006 | Testardi |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 7,010,553 B2 | 3/2006 | Chen et al. |
| 7,013,379 B1 | 3/2006 | Testardi |
| 7,051,112 B2 | 5/2006 | Dawson |
| 7,072,917 B2 | 7/2006 | Wong et al. |
| 7,089,286 B1 | 8/2006 | Malik |
| 7,111,115 B2 | 9/2006 | Peters et al. |
| 7,113,962 B1 | 9/2006 | Kee et al. |
| 7,120,746 B2 | 10/2006 | Campbell et al. |
| 7,127,556 B2 | 10/2006 | Blumenau et al. |
| 7,133,967 B2 | 11/2006 | Fujie et al. |
| 7,146,524 B2 | 12/2006 | Patel et al. |
| 7,152,184 B2 | 12/2006 | Maeda et al. |
| 7,155,466 B2 | 12/2006 | Rodriguez et al. |
| 7,165,095 B2 | 1/2007 | Sim |
| 7,167,821 B2 | 1/2007 | Hardwick et al. |
| 7,173,929 B1 | 2/2007 | Testardi |
| 7,194,579 B2 | 3/2007 | Robinson et al. |
| 7,234,074 B2 | 6/2007 | Cohn et al. |
| 7,280,536 B2 | 10/2007 | Testardi |
| 7,284,150 B2 | 10/2007 | Ma et al. |
| 7,293,097 B2 | 11/2007 | Borr |
| 7,293,099 B1 | 11/2007 | Kalajan |
| 7,293,133 B1 | 11/2007 | Colgrove et al. |
| 7,346,664 B2 * | 3/2008 | Wong et al. ............. 709/214 |
| 7,383,288 B2 | 6/2008 | Miloushev et al. |
| 7,401,220 B2 | 7/2008 | Bolosky et al. |
| 7,406,484 B1 | 7/2008 | Srinivasan et al. |
| 7,415,488 B1 | 8/2008 | Muth et al. |
| 7,415,608 B2 | 8/2008 | Bolosky et al. |
| 7,440,982 B2 | 10/2008 | Lu et al. |
| 7,475,241 B2 | 1/2009 | Patel et al. |
| 7,477,796 B2 | 1/2009 | Sasaki et al. |
| 7,509,322 B2 | 3/2009 | Miloushev et al. |
| 7,512,673 B2 | 3/2009 | Miloushev et al. |
| 7,519,813 B1 | 4/2009 | Cox et al. |
| 7,562,110 B2 | 7/2009 | Miloushev et al. |
| 7,571,168 B2 | 8/2009 | Bahar et al. |
| 7,574,433 B2 | 8/2009 | Engel |
| 7,599,941 B2 | 10/2009 | Bahar et al. |
| 7,610,307 B2 | 10/2009 | Havewala et al. |
| 7,624,109 B2 | 11/2009 | Testardi |
| 7,639,883 B2 | 12/2009 | Gill |
| 7,653,699 B1 * | 1/2010 | Colgrove et al. ............. 709/213 |
| 7,734,603 B1 | 6/2010 | McManis |
| 7,788,335 B2 | 8/2010 | Miloushev et al. |
| 7,822,939 B1 | 10/2010 | Veprinsky et al. |
| 7,831,639 B1 | 11/2010 | Panchbudhe et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,913,053 B1 | 3/2011 | Newland |
| 7,958,347 B1 | 6/2011 | Ferguson |
| 8,005,953 B2 | 8/2011 | Miloushev et al. |
| 2001/0014891 A1 | 8/2001 | Hoffert et al. |
| 2001/0047293 A1 | 11/2001 | Waller et al. |
| 2001/0051955 A1 | 12/2001 | Wong |
| 2002/0035537 A1 | 3/2002 | Waller et al. |
| 2002/0059263 A1 | 5/2002 | Shima et al. |
| 2002/0065810 A1 | 5/2002 | Bradley |

| | | |
|---|---|---|
| 2002/0073105 A1 | 6/2002 | Noguchi et al. |
| 2002/0083118 A1 | 6/2002 | Sim |
| 2002/0120763 A1 | 8/2002 | Miloushev et al. |
| 2002/0133330 A1 | 9/2002 | Loisey et al. |
| 2002/0133491 A1 | 9/2002 | Sim et al. |
| 2002/0138502 A1 | 9/2002 | Gupta |
| 2002/0147630 A1 | 10/2002 | Rose et al. |
| 2002/0150253 A1 | 10/2002 | Brezak et al. |
| 2002/0161911 A1 | 10/2002 | Pinckney, III et al. |
| 2002/0188667 A1 | 12/2002 | Kirnos |
| 2003/0009429 A1 | 1/2003 | Jameson |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0061240 A1 | 3/2003 | McCann et al. |
| 2003/0115218 A1 | 6/2003 | Bobbitt et al. |
| 2003/0115439 A1 | 6/2003 | Mahalingam et al. |
| 2003/0135514 A1 | 7/2003 | Patel et al. |
| 2003/0149781 A1 | 8/2003 | Yared et al. |
| 2003/0159072 A1 | 8/2003 | Bellinger et al. |
| 2003/0171978 A1 | 9/2003 | Jenkins et al. |
| 2003/0177388 A1 | 9/2003 | Botz et al. |
| 2003/0204635 A1 | 10/2003 | Ko et al. |
| 2004/0003266 A1 | 1/2004 | Moshir et al. |
| 2004/0006575 A1 | 1/2004 | Visharam et al. |
| 2004/0010654 A1 | 1/2004 | Yasuda et al. |
| 2004/0025013 A1 | 2/2004 | Parker et al. |
| 2004/0028043 A1 | 2/2004 | Maveli et al. |
| 2004/0028063 A1 | 2/2004 | Roy et al. |
| 2004/0030857 A1 | 2/2004 | Krakirian et al. |
| 2004/0054777 A1 | 3/2004 | Ackaouy et al. |
| 2004/0093474 A1 | 5/2004 | Lin et al. |
| 2004/0098383 A1 | 5/2004 | Tabellion et al. |
| 2004/0133573 A1 | 7/2004 | Miloushev et al. |
| 2004/0133577 A1 | 7/2004 | Miloushev et al. |
| 2004/0133606 A1 | 7/2004 | Miloushev et al. |
| 2004/0133607 A1 | 7/2004 | Miloushev et al. |
| 2004/0133650 A1 | 7/2004 | Miloushev et al. |
| 2004/0139355 A1 | 7/2004 | Axel et al. |
| 2004/0148380 A1 | 7/2004 | Meyer et al. |
| 2004/0153479 A1 | 8/2004 | Mikesell et al. |
| 2004/0181605 A1 | 9/2004 | Nakatani et al. |
| 2004/0199547 A1 | 10/2004 | Winter et al. |
| 2004/0236798 A1 | 11/2004 | Srinivasan et al. |
| 2004/0267830 A1 | 12/2004 | Wong et al. |
| 2005/0021615 A1 | 1/2005 | Arnott et al. |
| 2005/0050107 A1 | 3/2005 | Mane et al. |
| 2005/0091214 A1 | 4/2005 | Probert et al. |
| 2005/0108575 A1 | 5/2005 | Yung |
| 2005/0114291 A1 | 5/2005 | Becker-Szendy et al. |
| 2005/0187866 A1 | 8/2005 | Lee |
| 2005/0246393 A1 | 11/2005 | Coates et al. |
| 2005/0289109 A1 | 12/2005 | Arrouye et al. |
| 2005/0289111 A1 | 12/2005 | Tribble et al. |
| 2006/0010502 A1 | 1/2006 | Mimatsu et al. |
| 2006/0075475 A1 | 4/2006 | Boulos et al. |
| 2006/0080353 A1 | 4/2006 | Miloushev et al. |
| 2006/0106882 A1 | 5/2006 | Douceur et al. |
| 2006/0112151 A1 | 5/2006 | Manley et al. |
| 2006/0123062 A1 | 6/2006 | Bobbitt et al. |
| 2006/0161518 A1 | 7/2006 | Lacapra |
| 2006/0167838 A1 | 7/2006 | Lacapra |
| 2006/0179261 A1 | 8/2006 | Rajan |
| 2006/0184589 A1 | 8/2006 | Lees et al. |
| 2006/0190496 A1 | 8/2006 | Tsunoda |
| 2006/0200470 A1 | 9/2006 | Lacapra et al. |
| 2006/0212746 A1 | 9/2006 | Amegadzie et al. |
| 2006/0224687 A1 | 10/2006 | Popkin et al. |
| 2006/0230265 A1 | 10/2006 | Krishna |
| 2006/0242179 A1 | 10/2006 | Chen et al. |
| 2006/0259949 A1 | 11/2006 | Schaefer et al. |
| 2006/0271598 A1* | 11/2006 | Wong et al. ............ 707/200 |
| 2006/0277225 A1 | 12/2006 | Mark et al. |
| 2006/0282461 A1 | 12/2006 | Marinescu |
| 2006/0282471 A1 | 12/2006 | Mark et al. |
| 2007/0022121 A1 | 1/2007 | Bahar et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0088702 A1 | 4/2007 | Fridella et al. |
| 2007/0098284 A1 | 5/2007 | Sasaki et al. |
| 2007/0136308 A1* | 6/2007 | Tsirigotis et al. ............ 707/10 |
| 2007/0208748 A1 | 9/2007 | Li |
| 2007/0209075 A1 | 9/2007 | Coffman |
| 2007/0226331 A1 | 9/2007 | Srinivasan et al. |
| 2008/0046432 A1 | 2/2008 | Anderson et al. |
| 2008/0070575 A1 | 3/2008 | Claussen et al. |
| 2008/0104443 A1 | 5/2008 | Akutsu et al. |
| 2008/0208933 A1 | 8/2008 | Lyon |
| 2008/0209073 A1 | 8/2008 | Tang |
| 2008/0222223 A1 | 9/2008 | Srinivasan et al. |
| 2008/0243769 A1 | 10/2008 | Arbour et al. |
| 2008/0282047 A1 | 11/2008 | Arakawa et al. |
| 2009/0007162 A1 | 1/2009 | Sheehan |
| 2009/0037975 A1 | 2/2009 | Ishikawa et al. |
| 2009/0041230 A1 | 2/2009 | Williams |
| 2009/0055607 A1 | 2/2009 | Schack et al. |
| 2009/0077097 A1 | 3/2009 | Lacapra et al. |
| 2009/0089344 A1 | 4/2009 | Brown et al. |
| 2009/0094252 A1 | 4/2009 | Wong et al. |
| 2009/0106255 A1 | 4/2009 | Lacapra et al. |
| 2009/0106263 A1 | 4/2009 | Khalid et al. |
| 2009/0132616 A1 | 5/2009 | Winter et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0254592 A1 | 10/2009 | Marinov et al. |
| 2010/0077294 A1 | 3/2010 | Watson |
| 2010/0211547 A1 | 8/2010 | Kamei et al. |
| 2011/0087696 A1 | 4/2011 | Lacapra |

FOREIGN PATENT DOCUMENTS

| | | | |
|---|---|---|---|
| CA | 2512312 | A1 | 7/2004 |
| EP | 0 738 970 | A1 | 10/1996 |
| JP | 63010250 | A | 1/1988 |
| JP | 06-332782 | | 12/1994 |
| JP | 08-328760 | | 12/1996 |
| JP | 08-339355 | | 12/1996 |
| JP | 9016510 | A | 1/1997 |
| JP | 11282741 | A1 | 10/1999 |
| WO | WO 02/056181 | A2 | 7/2002 |
| WO | WO 2004/061605 | A2 | 7/2004 |
| WO | WO 2008/130983 | A1 | 10/2008 |
| WO | WO 2008/147973 | A2 | 12/2008 |

OTHER PUBLICATIONS

Botzum, Keys, "Single Sign On—A Contrarian View," Open Group Website, <http://www.opengroup.org/security/topics.htm>, Aug. 6, 2001, pp. 1-8.

Novotny, Jason et al., "An Online Credential Repository for the Grid: MyProxy," 2001, pp. 1-8.

Pashalidis, Andreas et al., "A Taxonomy of Single Sign-On Systems," 2003, pp. 1-16, Royal Holloway, University of London, Egham Surray, TW20, 0EX, United Kingdom.

Pashalidis, Andreas et al., "Impostor: a single sign-on system for use from untrusted devices," Global Telecommunications Conference, 2004, GLOBECOM '04, IEEE, Issue Date: Nov. 29-Dec. 3, 2004. Royal Holloway, University of London.

Tulloch, Mitch, "Microsoft Encyclopedia of Security," pp. 218, 300-301, Microsoft Press, 2003, Redmond, Washington.

"The AFS File System in Distributed Computing Environment", www.transarc.ibm.com/Library/whitepapers/AFS/afsoverview. html, last accessed on Dec. 20, 2002.

Aguilera, Marcos K. et al., "Improving recoverability in multi-tier storage systems", International Conference on Dependable Systems and Networks (DSN-2007), Edinburgh, Scotland, Jun. 2007, 10 pages.

Anderson, Darrell C. et al., "Interposed Request Routing for Scalable Network Storage", ACM Transactions on Computer Systems 20(1): (Feb. 2002), pp. 1-24.

Anderson et al., "Serverless Network File System", in the 15th Symposium on Operating Systems Principles, Dec. 1995, Association for Computing Machinery, Inc.

Anonymous, "How DFS Works: Remote File Systems", Distributed File System (DFS) Technical Reference, retrieved from the Internet on Feb. 13, 2009: URL<:http://technetmicrosoft.com/en-us/library/cc782417WS.10,printer).aspx> (Mar. 2003).
Apple, Inc. "Mac OS X Tiger Keynote Intro. Part 2", Jun. 2004, www.youtube.com <http://www.youtube.com/watch?v=zSBJwEmRJbY>, p. 1.
Apple, Inc. "Tiger Developer Overview Series: Working with Spotlight", Nov. 23, 2004, www.apple.com using www.archive.org <http://web.archive.org/web/20041123005335/developer.apple.com/macosx/tiger/spotlight.html>, pp. 1-6.
"Auspex Storage Architecture Guide", Second Edition, 2001, Auspex Systems, Inc., www.auspex.com, last accessed on Dec. 30, 2002.
Cabrera et al., "Swift: Storage Architecture for Large Objects", In Proceedings of the-Eleventh IEEE Symposium on Mass Storage Systems, pp. 123-128, Oct. 1991.
Cabrera et al, "Swift: Using Distributed Disk Striping to Provide High I/O Data Rates", Computing Systems 4, 4 (Fall 1991), pp. 405-436.
Cabrera et al., "Using Data Striping in a Local Area Network", 1992, technical report No. UCSC-CRL-92-09 of the Computer & Information Sciences Department of University of California at Santa. Cruz.
Callaghan et al., "NFS Version 3 Protocol Specifications" (RFC 1813), Jun. 1995, The Internet Engineering Task Force (IETN), www.ietf.org, last accessed on Dec. 30, 2002.
Carns et al., "PVFS: A Parallel File System for Linux Clusters", in Proceedings of the Extreme Linux Track: 4th Annual Linux Showcase and Conference, pp. 317- 327, Atlanta, Georgia, Oct. 2000, USENIX Association.
Cavale, M. R., "Introducing Microsoft Cluster Service (MSCS) in the Windows Server 2003", Microsoft Corporation, Nov. 2002.
"CSA Persistent File System Technology", Colorado Software Architecture, Inc. White Paper, Jan. 1, 1999, pp. 1-3, <http://www.cosoa.com/white_papers/pfs.php>.
"Distributed File System: Logical View of Physical Storage", White Paper, 1999, Microsoft Corp., www.microsoft.com, <http://www.eu.microsoft.com/TechNet/prodtechnol/windows2000serv/maintain/DFSnt95>, pp. 1-26, last accessed on Dec. 20, 2002.
English Language Abstract of JP 08-328760 from Patent Abstracts of Japan, Jun. 23, 1998.
English Language Abstract of JP 08-339355 from Patent Abstracts of Japan, Jun. 30, 1998.
English Translation of paragraphs 17, 32, and 40-52 of JP 08-328760, Jun. 23, 1998.
English Translation of Notification of Reason(s) for Refusal for JP 2002-556371 (Dispatch Date: Jan. 22, 2007).
Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.
Farley, M., "Building Storage Networks", Jan. 2000, McGraw Hill, ISBN 0072120509.
Final Office action dated Sep. 21, 2007 for related U.S. Appl. No. 10/336,784.
Gibson et al., "File Server Scaling with Network-Attached Secure Disks", in Proceedings of the ACM International Conference on Measurement and Modeling of Computer Systems (Sigmetrics '97), Jun. 15-18, 1997, Association for Computing Machinery, Inc.
Gibson et al., "NASD Scalable Storage Systems", Jun. 1999, USENIX99, Extreme Linux Workshop, Monterey, California.
Harrison, C., May 19, 2008 response to Communication pursuant to Article 96(2) EPC dated Nov. 9, 2007 in corresponding European patent application No. 02718824.2.
Hartman, J., "The Zebra Striped Network File System", 1994, Ph.D. dissertation submitted in the Graduate Division of the University of California at Berkeley.
Haskin et al., "The Tiger Shark File System", 1996, in proceedings of IEEE, Spring COMPCON, Santa Clara, CA, www.research.ibm.com, last accessed on Dec. 30, 2002.
Hwang et al., "Designing SSI Clusters with Hierarchical Checkpointing and Single 1/0 Space", IEEE Concurrency, pp. 60-69, Jan.-Mar. 1999.
International Search Report for International Patent Application No. PCT/US2008/083117 (Jun. 23, 2009).
International Search Report for International Patent Application No. PCT/US2008/060449 (Apr. 9, 2008).
International Search Report for International Patent Application No. PCT/US2008/064677 (Sep. 6, 2009).
International Search Report from International Application No. PCT/US03/41202, mailed Sep. 15, 2005.
International Search Report for International Patent Application No. PCT/US02/00720, Jul. 8, 2004.
Karamanolis, C. et al., "An Architecture for Scalable and Manageable File Services", A1., HPL-2001-173, Jul. 26, 2001. pp. 1-114.
Katsurashima, W. et al., "NAS Switch: A Novel CIFS Server Virtualization", Proceedings. 20th IEEE/11th NASA Goddard Conference on Mass Storage Systems and Technologies, 2003 (MSST 2003), Apr. 2003.
Kimball, C.E. et al., "Automated Client-Side Integration of Distributed Application Servers", 13Th LISA Conf., 1999, pp. 275-282 of the Proceedings.
Klayman, J., Nov. 13, 2008 e-mail to Japanese associate including instructions for response to office action dated May 26, 2008 in corresponding Japanese patent application No. 2002-556371.
Klayman, J., response filed by Japanese associate to office action dated Jan. 22, 2007 in corresponding Japanese patent application No. 2002-556371.
Klayman, J., Jul. 18, 2007 e-mail to Japanese associate including instructions for response to office action dated Jan. 22, 2007 in corresponding Japanese patent application No. 2002-556371.
Kohl et al., "The Kerberos Network Authentication Service (V5)", RFC 1510, Sep. 1993. (http://www.ietf.org/ rfc/rfc1510.txt?number=1510).
Korkuzas, V., Communication pursuant to Article 96(2) EPC dated Sep. 11, 2007 in corresponding European patent application No. 02718824.2-2201.
Lelil, S., "Storage Technology News: AutoVirt adds tool to help data migration projects", Feb. 25, 2011, last accessed Mar. 17, 2011, <http://searchstorage.techtarget.com/news/article/0,289142,sid5_gci1527986,00.html>.
Long et al., "Swift/RAID: A distributed RAID System", Computing Systems, vol. 7, pp. 333-359, Summer 1994.
"NERSC Tutorials: I/O on the Cray T3E", chapter 8, "Disk Striping", National Energy Research Scientific Computing Center (NERSC), http://hpcfnersc.gov, last accessed on Dec. 27, 2002.
Noghani et al., "A Novel Approach to Reduce Latency on the Internet: Component-Based Download", Proceedings of the Computing, Las Vegas, NV, Jun. 2000, pp. 1-6 on the Internet: Intl Conf. on Internet.
Norton et al., "CIFS Protocol Version CIFS-Spec 0.9", 2001, Storage Networking Industry Association (SNIA), www.snia.org, last accessed on Mar. 26, 2001.
Office action dated Feb. 6, 2007 for related U.S. Appl. No. 10/336,784.
Patterson et al., "A case for redundant arrays of inexpensive disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.
Pearson, P.K., "Fast Hashing of Variable-Length Text Strings", Comm. of the ACM, vol. 33, No. 6, Jun. 1990.
Peterson, M., "Introducing Storage Area Networks", Feb. 1998, InfoStor, www.infostor.com, last accessed on Dec. 20, 2002.
Preslan et al., "Scalability and Failure Recovery in a Linux Cluster File System", in Proceedings of the 4th Annual Linux Showcase & Conference, Atlanta, Georgia, Oct. 10-14, 2000, PGS. 169-180 of the Proceedings, www.usenix.org, last accessed on Dec. 20, 2002.
Response filed Jul. 6, 2007 to Office action dated Feb. 6, 2007 for related U.S. Appl. No. 10/336,784.
Response filed Mar. 20, 2008 to Final Office action dated Sep. 21, 2007 for related U.S. Appl. No. 10/336,784.
Rodriguez et at., "Parallel-access for mirror sites in the Internet", InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar.

26, 2000, pp. 864-873, XP010376176 ISBN: 0-7803-5880-5 p. 867, col. 2, last paragraph—p. 868, col. 1, paragraph 1.

RSYNC, "Welcome to the RSYNC Web Pages",Retrieved from the Internet URL: http://samba.anu.edu.ut.rsync/. ( Retrieved on Dec. 18, 2009).

Savage, et al., "AFRAID—A Frequently Redundant Array of Independent Disks", 1996 USENIX Technical Conf., San Diego, California, Jan. 22-26, 1996.

"Scaling Next Generation Web Infrastructure with Content-Intelligent Switching: White Paper", Apr. 2000, pp. 1-9 Alteon Web Systems, Inc.

Soltis et al., "The Design and Performance of a Shared Disk File System for IRIX", in Sixth NASA Goddard Space Flight Center Conference on Mass Storage and Technologies in cooperation with the Fifteenth IEEE Symposium on Mass Storage Systems. Mar. 23-26, 1998.

Soltis, et al., "The Global File System", in Proceedings of the Fifth NASA Goddard Space Flight Center Conference on Mass Storage Systems and Technologies, Sep. 17-19, 1996, College Park, Maryland.

Sorenson, K.M., "Installation and Administration: Kimberlite ClusterVersion 1.1.0, Rev. Dec. 2000", Mission Critical Linux, http://oss.missioncriticallinux.corn/kimberlite/kimberlite.pdf.

Stakutis, C., "Benefits of SAN-based file system sharing", Jul. 2000, InfoStor, www.infostor.com, last accessed on Dec. 30, 2002.

Thekkath et al., "Frangipani: A Scalable Distributed File System", in Proceedings of the 16th ACM Symposium on Operating Systems Principles, Oct. 1997, Association for Computing Machinery, Inc.

Uesugi, H., Nov. 26, 2008 amendment filed by Japanese associate in response to office action dated May 26, 2008 in corresponding Japanese patent application No. 2002-556371.

Uesugi, H., English translation of office action dated May 26, 2008 in corresponding Japanese patent application No. 2002-556371.

Uesugi, H., Jul. 15, 2008 letter from Japanese associate reporting office action dated May 26, 2008 in corresponding Japanese patent application No. 2002-556371.

"VERITAS SANPoint Foundation Suite(tm) and SANPoint Foundation Suite(tm) HA: New VERITAS Volume Management and File System Technology for Cluster Environments", Sep. 2001, VERITAS Software Corp.

Wilkes, J., et al., "The HP AutoRAID Hierarchical Storage System", ACM Transactions on Computer Systems, vol. 14, No. 1, Feb. 1996.

"Windows Clustering Technologies—An Overview", Nov. 2001, Microsoft Corp., www.microsoft.com, last accessed on Dec. 30, 2002.

Zayas, E., "AFS-3 Programmer's Reference: Architectural Overview", Transarc Corp., version 1.0 of Sep. 2, 1991, doc. No. FS-00-D160.

* cited by examiner

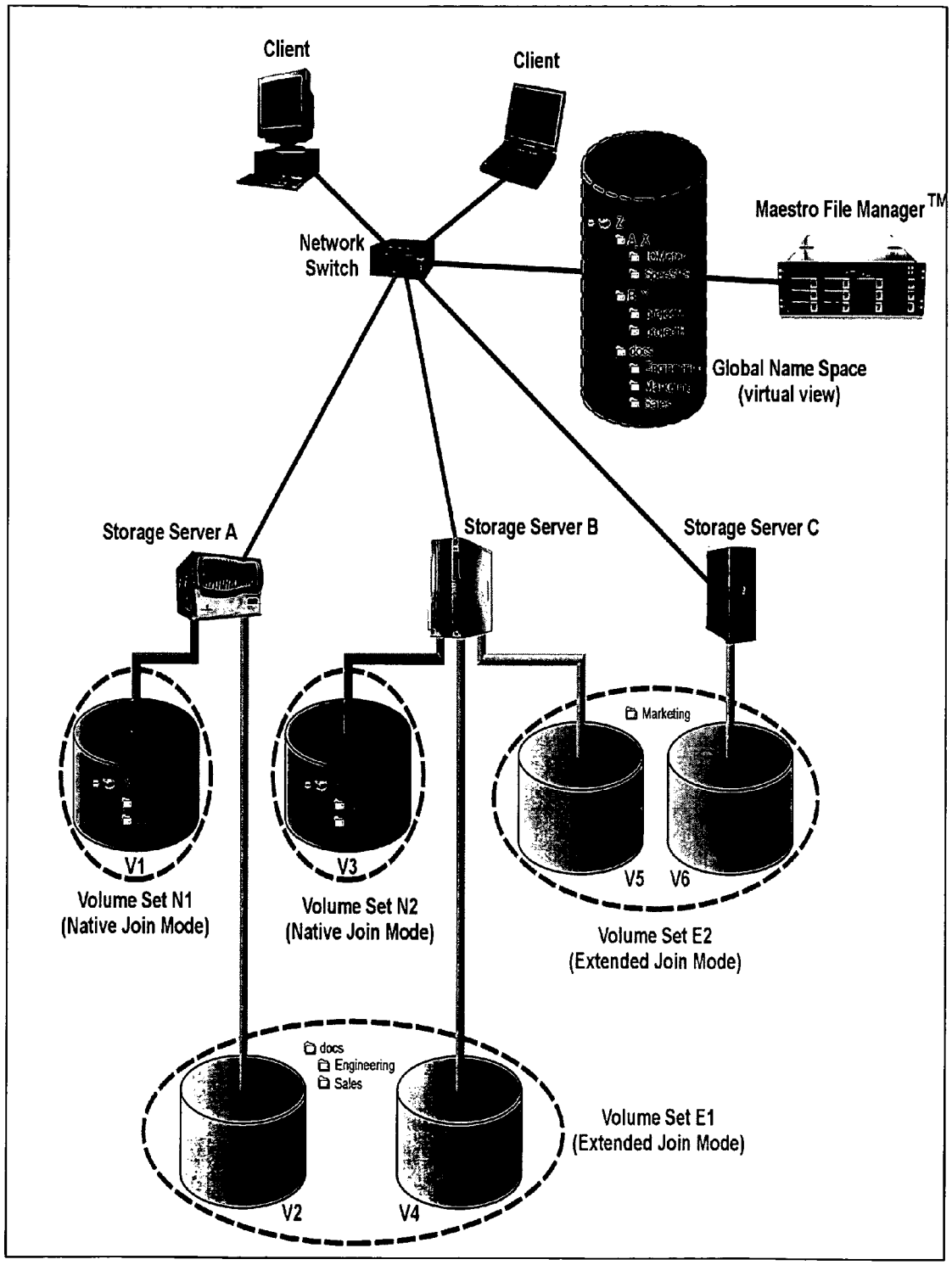
FIG. 1 – A reference NFM configuration

| Volume Sets ||
|---|---|
| Definition ID | Definition |
| a. | N1: native V1 |
| b. | N2: native V3 |
| c. | E1: extended V2, V4 |
| d. | E2: extended V5, V6 |
| e. | E3: extended V7, V8, V9, V10 |

| File Rules ||
|---|---|
| Rule number | Rule Definition |
| 1. | deny {.mp3 .pgp} |
| 2. | N \A_X: N1 |
| 3. | N \B_Y: N2 |
| 4. | D+ \docs\Engineering S 2, 128: E1 |
| 5. | D+ \docs\Sales S 2, 32: E1 |
| 6. | D+ \docs\Marketing S 2, 32: E2 |
| 7. | D+ \docs M 2, 2, 64: E3 |
| 8. | D \docs\Marketing {.ppt .doc} M 2, 2, 32: E3 |
| 9. | D+ \ S 2, 64: E3 |

FIG. 2 – Exemplary Volume Sets and File Rules for FIG. 1

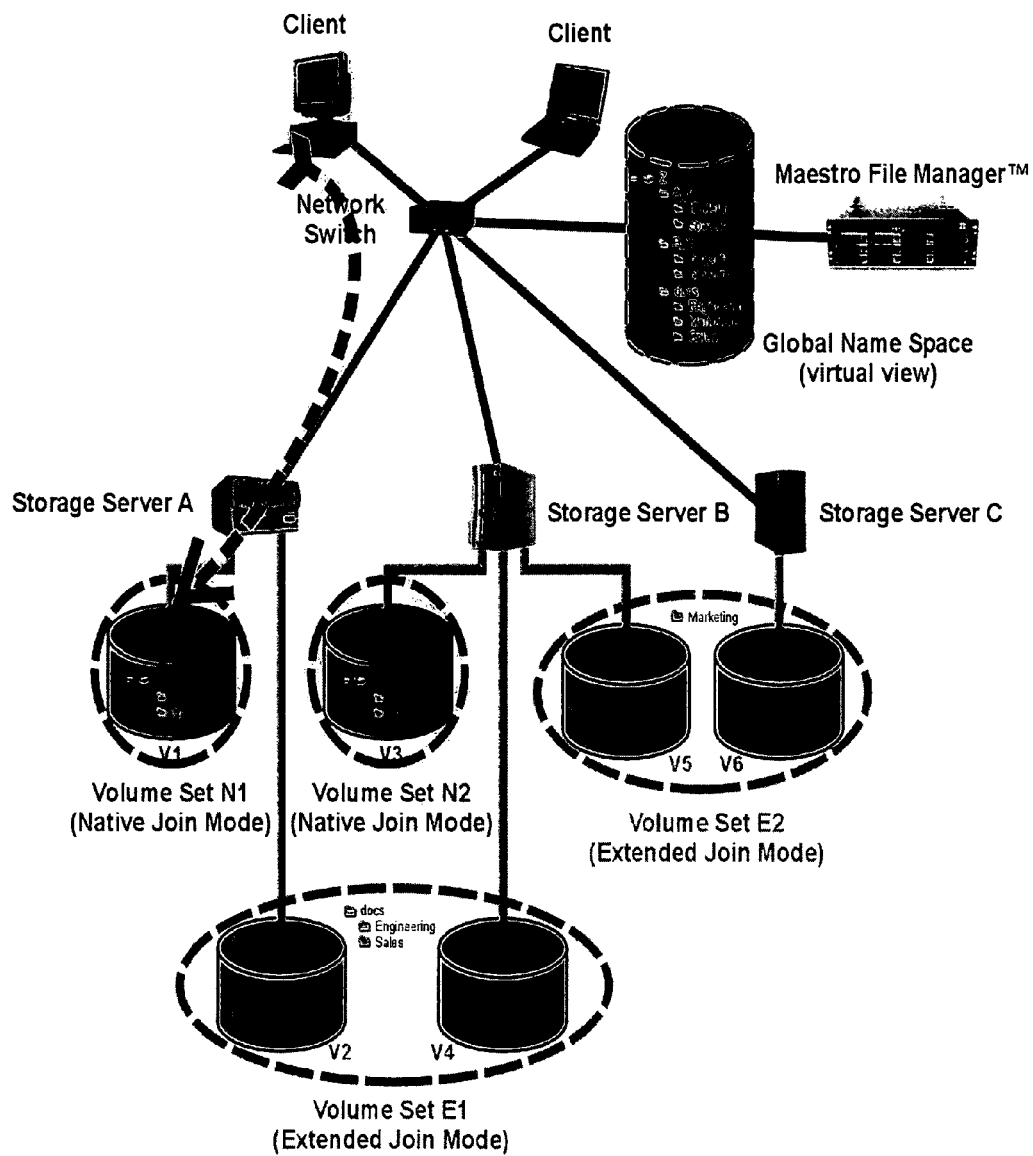
Direct access to Native Volume (file: "X:\SpecSFS\xxx")
FIG. 3 – Direct client access to Native Volume

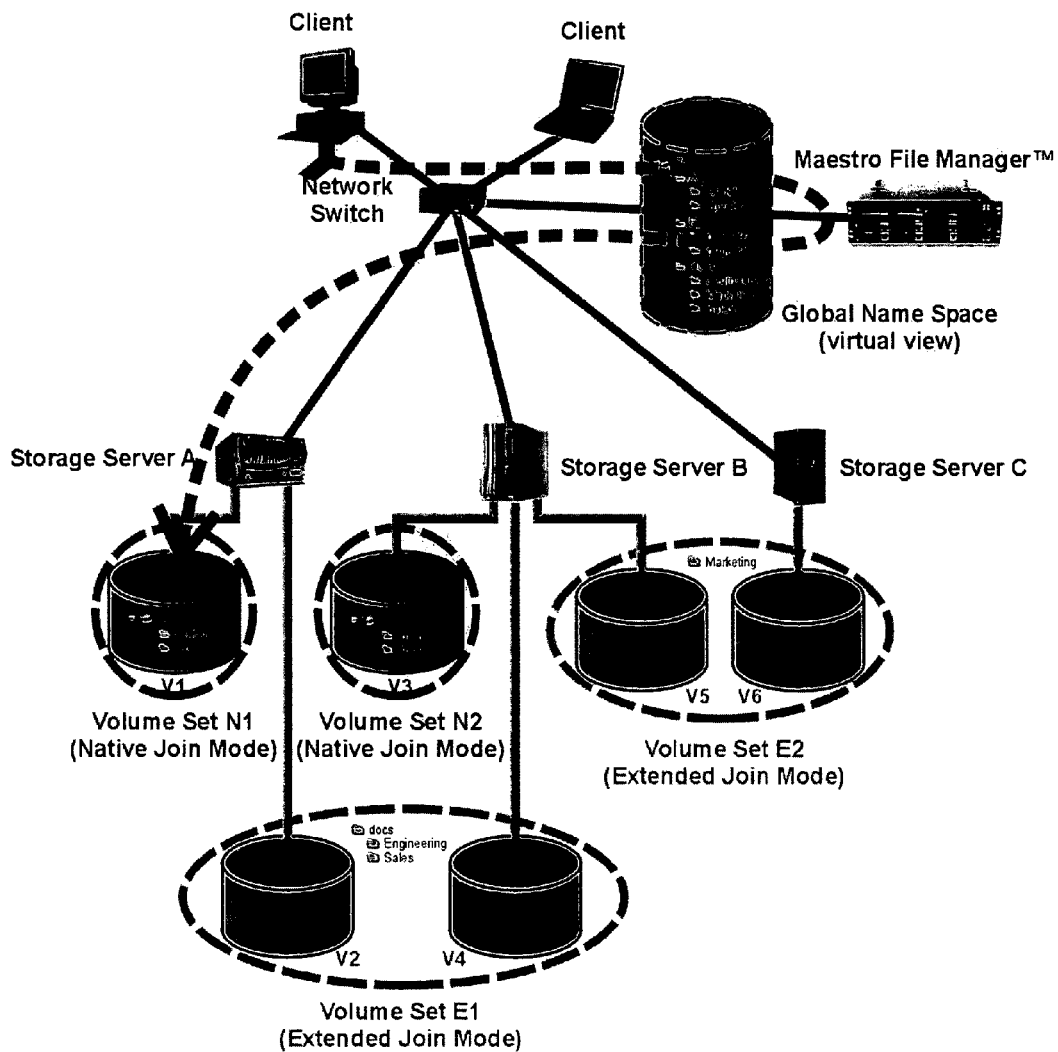
Access to Native Volume through MFM
(file: "Z:\B_Y\SpecSFS\xxx", same as: "X:\SpecSFS")
FIG. 4 – Client access to Native Volume via NFM

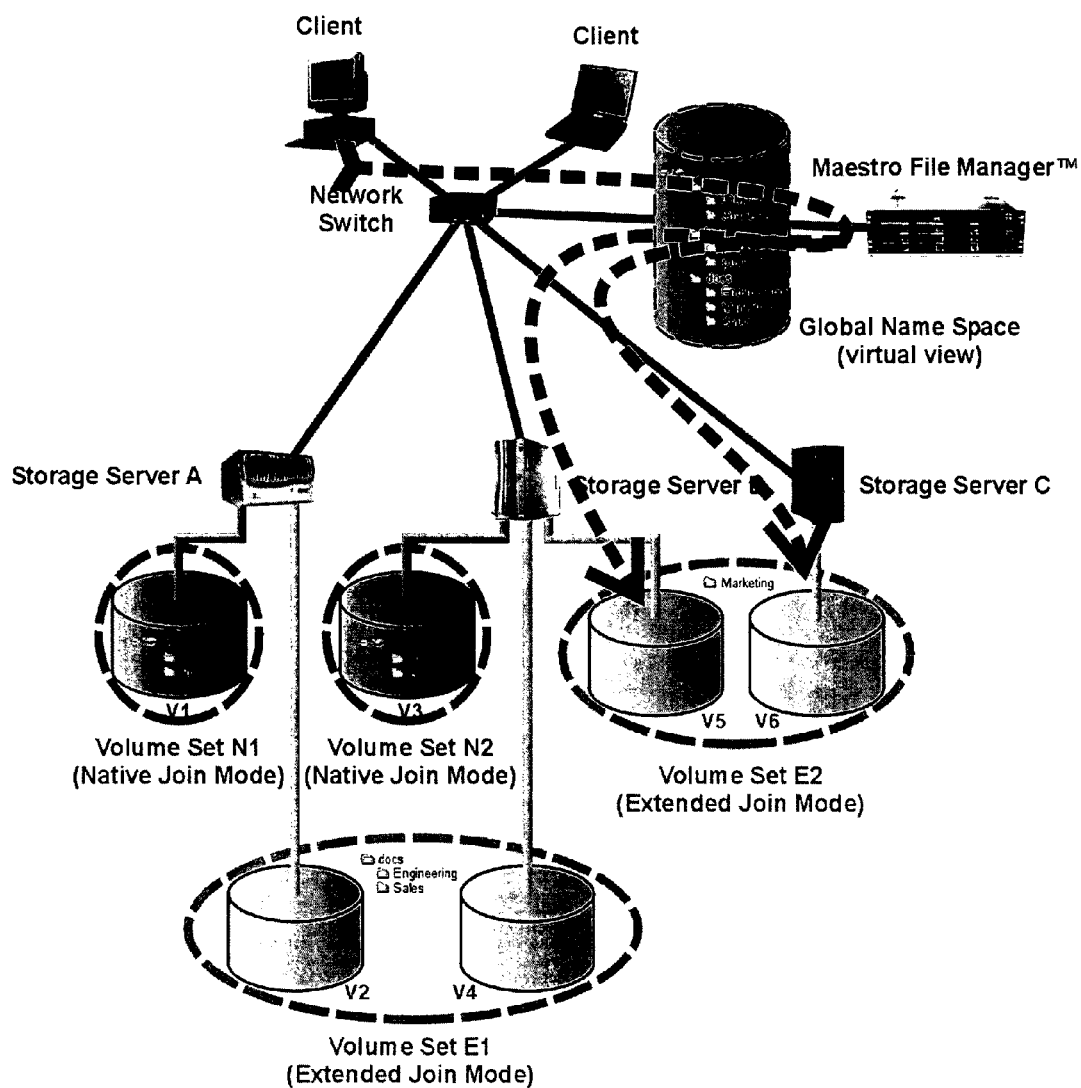
**Access to Extended Volumes
(file: "Z:\docs\Marketing\pres.ppt", striped across E2)**
FIG. 5 – Client access to Extended Mode Volume

| Table 1 – Comparison of capabilities in the available Join Modes | | |
|---|---|---|
| Item | Extended Join Mode | Native Join Mode |
| 1. Join utility (copy file system hierarchy to MDS) | Yes | No |
| 2. Unjoin utility | Yes | No |
| 3. Time needed to Join/Unjoin | Variable | Extremely small |
| 4. Volume accessibility during Join/Unjoin | No | Yes |
| 5. Direct volume access possible | No | Yes |
| 6. Format of original files unchanged | Possible (depending on File Rule) | Yes |
| 7. Decoupling of pathnames from storage | Yes | No |
| 8. Storage pooling | Yes | No |
| 9. Use of allow/deny File Rule | Yes | Yes (only if access via MFM) |
| 10. Use of layout File Rules | Yes | No, only "native" rule |
| 11. Global hard links | Yes | Only local |
| 12. Perceived as non-intrusive | No | Yes |

FIG. 6

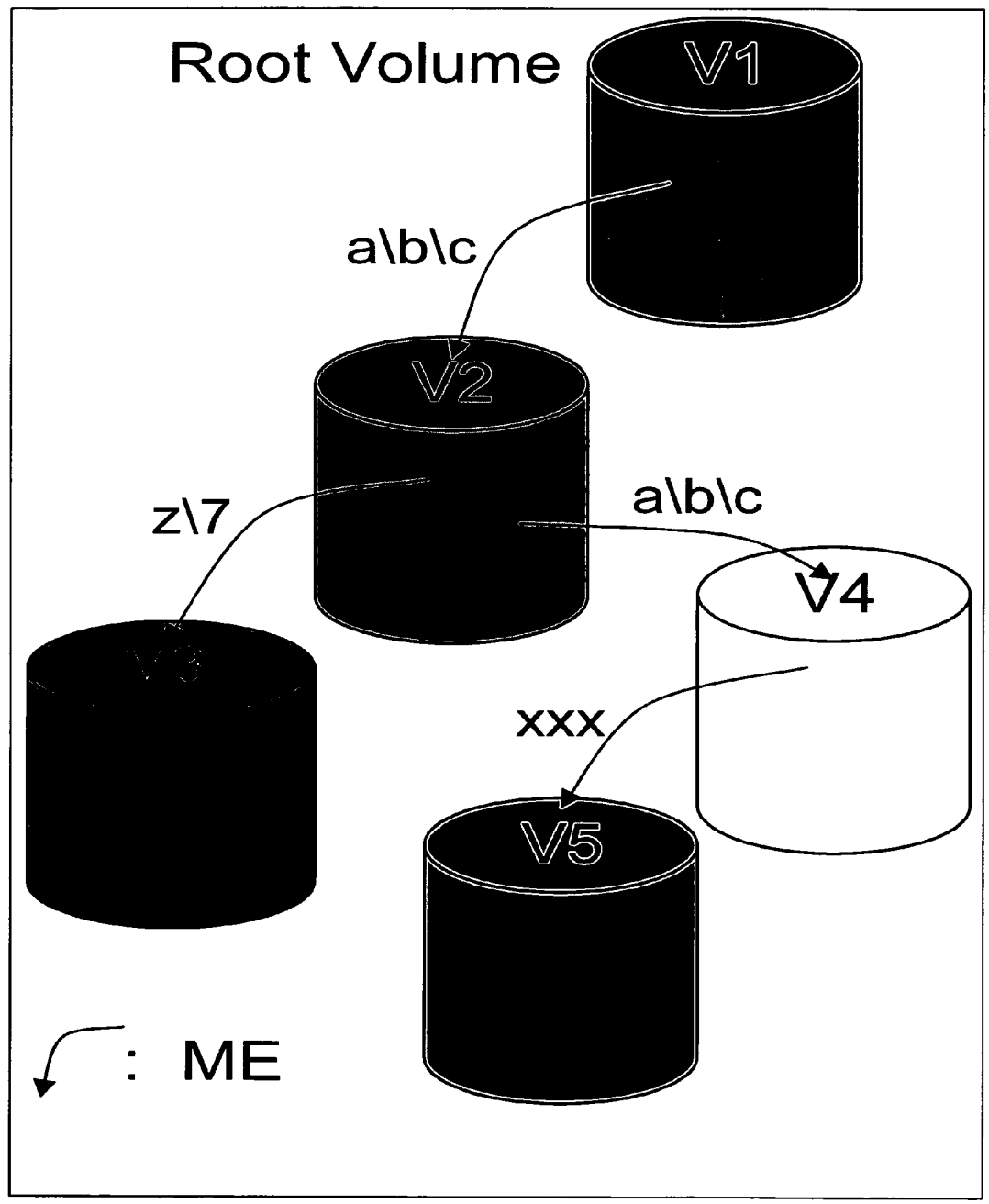
FIG. 7 – A multi-volume metadata hierarchy

| MEC content | | |
|---|---|---|
| Host | Target | Path |
| V1 | V2 | a\b\c |
| V2 | V3 | z\7 |
| V2 | V4 | a\b\c |
| V4 | V5 | xxx |

FIG. 8

| MEC Input and Output | | |
|---|---|---|
| Input | Output | |
| | Target | Residual Path |
| \x\y\z | V1 | x\y\z |
| \a\b\c | V2 | (null) |
| \a\b\c\a\b\c\x | V4 | x |
| \a\b\c\z\7\a\b\c | V3 | a\b\c |
| \a\b\c\a\b\c\xxx\w | V5 | w |
| \a\b\1234 | V1 | a\b\1234 |
| \a\b\c\z\7\xxx\w | V3 | xxx\w |

FIG. 9

FIG. 10 – Layout of file system volume

FIG. 12

FILE AGGREGATION IN A SWITCHED FILE SYSTEM

CROSS REFERENCE TO RELATED APPLICATIONS

This patent application is a continuation-in-part of, and therefore claims priority from, U.S. patent application Ser. No. 10/043,413 entitled FILE SWITCH AND SWITCHED FILE SYSTEM filed Jan. 10, 2002, now issued as U.S. Pat. No. 7,562,110, which claims priority from U.S. Provisional Patent Application No. 60/261,153 entitled FILE SWITCH AND SWITCHED FILE SYSTEM filed Jan. 11, 2001.

This patent application is also a continuation-in-part of, and therefore claims priority from, U.S. patent application Ser. No. 10/336,832 entitled RULE BASED AGGREGATION OF FILES AND TRANSACTIONS IN A SWITCHED FILE SYSTEM filed Jan. 2, 2003, now issued as U.S. Pat. No. 7,512,673, which is a continuation-in-part of U.S. patent application Ser. No. 10/043,413 entitled FILE SWITCH AND SWITCHED FILE SYSTEM filed Jan. 10, 2002, now issued as U.S. Pat. No. 7,562,110, which claims priority from U.S. Provisional Patent Application No. 60/261,153 entitled FILE SWITCH AND SWITCHED FILE SYSTEM filed Jan. 11, 2001.

This patent application is also a continuation-in-part of, and therefore claims priority from, U.S. patent application Ser. No. 11/072,892 entitled SYSTEM AND METHOD FOR MANAGING SMALL-SIZE FILES IN AN AGGREGATED FILE SYSTEM filed Mar. 3, 2005.

This patent application also claims priority from U.S. Provisional Patent Application No. 60/923,765 entitled NETWORK FILE MANAGEMENT SYSTEMS, APPARATUS, AND METHODS filed Apr. 16, 2007.

Each of the above-referenced patent applications is hereby incorporated herein by reference in its entirety.

FIELD OF THE INVENTION

The present invention relates generally to network file management, and, more specifically, to file aggregation in a switched file system.

BACKGROUND OF THE INVENTION

In today's information age, data is often stored in file storage systems. Such file storage systems often include numerous file servers that service file storage requests from various client devices. In such file storage systems, different file servers may use a common network file protocol (e.g., CIFS or NFS) or may use different network file protocols. Certain client devices may be limited to communication with certain file servers, e.g., based on network file protocol or application.

SUMMARY OF THE INVENTION

In accordance with one aspect of the invention there is provided a method for managing files by a file switch in a file storage system. The method involves aggregating a plurality of storage volumes including at least one native mode volume and at least one extended mode volume into a global namespace and allowing client access to files in the at least one native mode volume indirectly via the aggregated global namespace.

In accordance with another aspect of the invention there is provided a system for storing files. The system includes a network file manager and a plurality of file server nodes supporting a plurality of storage volumes including at least one native mode volume accessible by client nodes directly and indirectly through the network file manager and at least one extended mode volume accessible by client nodes only through the network file manager, wherein the network file manager aggregates a plurality of storage volumes including at least one native mode volume and at least one extended mode volume into a global namespace.

In various alternative embodiments, clients may be allowed access to files in the at least one native mode volume directly as well as indirectly.

In various alternative embodiments, files from the native mode volume may be selectively migrated from the native mode volume into an extended mode volume (e.g., converting a native mode file to an extended mode file stored in a fragmented form over a plurality of file servers or converting a native mode file to an extended mode file stored redundantly over a plurality of file servers).

In various alternative embodiments, aggregating may involve creating a mount point for the native mode volume within the global namespace, the mount point associated with a pathname prefix. In this regard, allowing client access to files in the at least one native mode volume indirectly via the aggregated global namespace may involve receiving a first request for access to a native mode file, the first request including a pathname for the file in the global namespace including the pathname prefix and transmitting a second request to a file server hosting the native mode file, the second request including a pathname for the file in the native mode volume without the pathname prefix. Such transmitting of the second request may involve spoofing or protocol translation. A handle may be received from the native mode volume in response to the second request and the handle may be transmitted to the client as a response to the first request. A third request including the handle may be received from the client, and the third request may be transmitted to the native mode volume. A reply may be received from the native mode volume in response to the third request and transmitted to the client.

In various alternative embodiments, a set of rules may be maintained for storing files in a plurality of file servers, the rules specifying criteria for storing files using the at least one native mode volume and at least one extended mode volume, and file storage operations may be managed according to the set of rules. The rules may specify the types of files that may be created in a native mode volume, e.g., the types of files that are expressly allowed to be created in the native mode volume and/or the types of files that expressly denied from being created in the native mode volume. The rules may specify the types of files that may be created in the native mode volume based on at least one of (1) a file suffix and (2) a file size. Storing the file according to the set of rules may be performed upon receipt of a request to create the file. Storing the file according to the set of rules may be performed upon receipt of a request to rename the file. Storing the file according to the set of rules may involve reapplying the set of rules to a pre-existing file.

In accordance with another aspect of the invention there is provided a method of storing files by a file switch in a switched file system. Each file is associated with a file type. The method involves maintaining a set of rules for storing files in a plurality of file servers including at least a metadata server and a storage server, the rules defining at least one file type to be stored in the metadata server, and storing a file based at least in part on the file type associated with the file according to the set of rules, whereby the file is stored in the metadata server only if the file type associated with the file is a file type to be stored in the metadata server.

In various alternative embodiments, the rules may further define a file size threshold for each file type, in which case the file may be stored in the metadata server only if the file type associated with the file is a file type to be stored in the metadata server and the size of the file is below the file size threshold defined for the file type. The file size threshold may be the same for all file types of may be different for at least two different file types. Storing the file according to the set of rules may be performed upon receipt of a request to create the file. Storing the file according to the set of rules may be performed upon receipt of a request to rename the file. Storing the file according to the set of rules may involve reapplying the set of rules to a pre-existing file.

In accordance with one aspect of the invention there is provided a method of achieving file virtualization in a network including client nodes and file server nodes, the client nodes and the file server nodes using standard network file protocols. The method involves providing a network file manager in communication with the network, the network file manager in a logical data path between the client nodes and the file server nodes, appearing as a client to the file server nodes and as a server to the client nodes, and interacting with both the client nodes and the file server nodes using the standard network file protocols.

In various alternative embodiments, a virtual path name may be established and maintained for each file, independent of physical storage location of such file. An aggregation of all name spaces residing in the file server nodes may be provided in a single global name space. Such name spaces may relate to at least one native mode volume and at least one extended mode volume. Storage resources may be automatically discovered and integrated into the global namespace. Throughput and storage capacity of the file server nodes may be aggregated so as to create a unitary virtual storage system. Different file systems (such as CIFS and NFS) may be aggregated into a single global name space. The layout of files in a plurality of file servers may be changed without changing the global paths.

BRIEF DESCRIPTION OF THE DRAWINGS

The foregoing and advantages of the invention will be appreciated more fully from the following further description thereof with reference to the accompanying drawings wherein:

FIG. 1 shows a Network File Management (NFM) configuration in accordance with an exemplary embodiment of the present invention;

FIG. 2 shows one example of a possible set of File Rules and Volume Sets for the global name space in FIG. 1;

FIG. 3 shows a representation of direct client access to a native volume in accordance with an exemplary embodiment of the present invention;

FIG. 4 shows a representation of client access to a native volume via the NFM, in accordance with an exemplary embodiment of the present invention;

FIG. 5 shows a representation of client access to an extended mode volume via the NFM, in accordance with an exemplary embodiment of the present invention;

FIG. 6 includes a table comparing capabilities available for native join mode and extended join mode, in accordance with an exemplary embodiment of the present invention;

FIG. 7 shows a representation of a hierarchy of metadata volumes glued together via Mount Entries, in accordance with an exemplary embodiment of the present invention;

FIG. 8 shows a representation of the contents of the Mount Entry Cache for the multi-volume metadata hierarchy shown in FIG. 7.

FIG. 9 includes a table showing a mapping of Mount Entry Cache inputs and output for the multi-volume metadata hierarchy shown in FIG. 7 and the Mount Entry Cache shown in FIG. 8, in accordance with an exemplary embodiment of the present invention;

FIG. 12 shows the file rules set dialog box, in accordance with an exemplary embodiment of the present invention;

Unless the context suggests otherwise, like reference numerals do not necessarily represent like elements.

DETAILED DESCRIPTION OF SPECIFIC EMBODIMENTS

Figure 10:
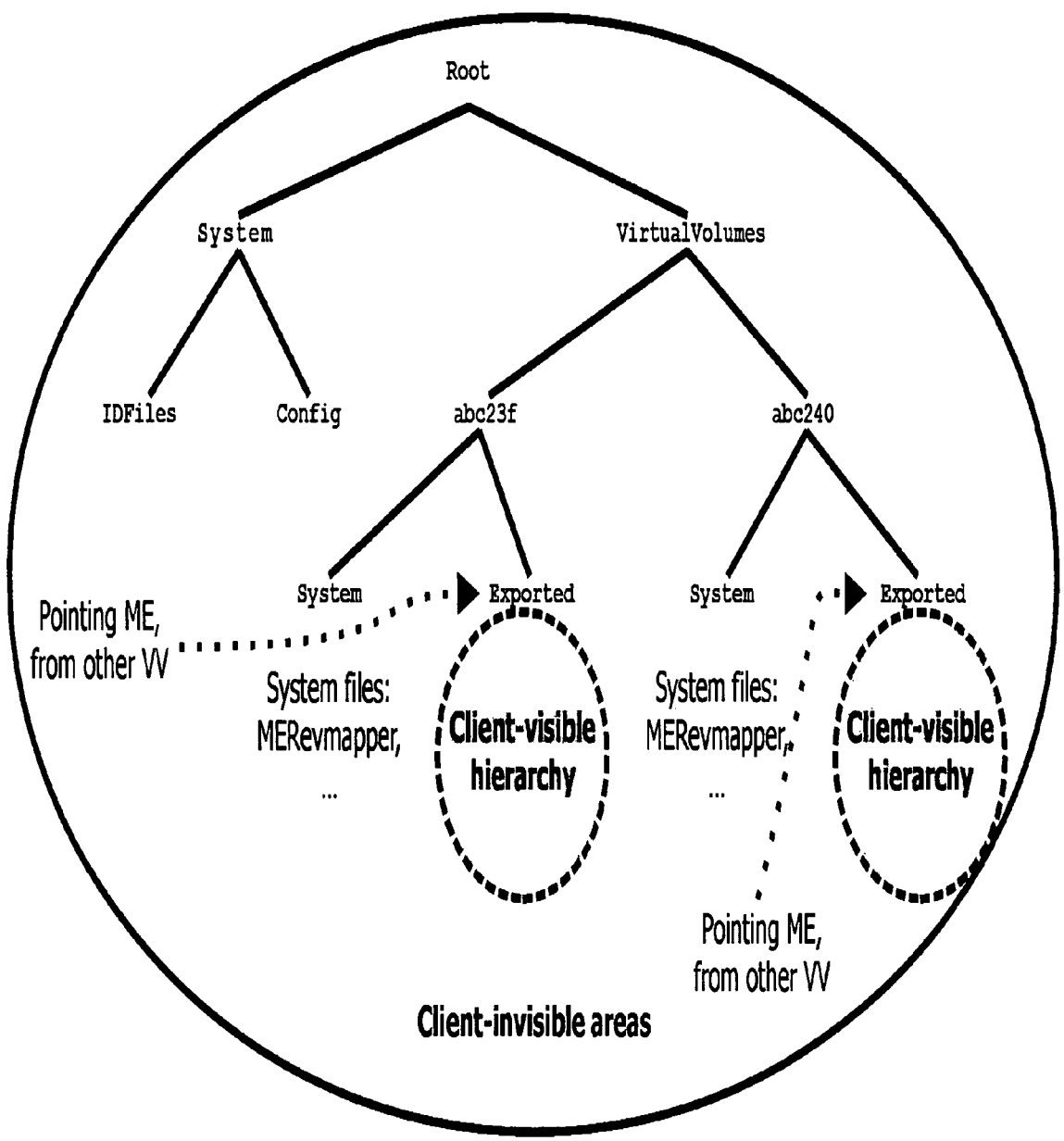
FIG. 10 shows a representation of the layout of a file system volume in accordance with an exemplary embodiment of the present invention.

Definitions. As used in this description and related claims, the following terms shall have the meanings indicated, unless the context otherwise requires:

Aggregator. An "aggregator" is a file switch that performs the function of directory, data or namespace aggregation of a client data file over a file array.

Data Stream. A "data stream" is a segment of a stripe-mirror instance of a user file. If a data file has no spillover, the first data stream is the stripe-mirror instance of the data file. But if a data file has spillovers, the stripe-mirror instance consists of multiple data streams, each data stream having metadata containing a pointer pointing to the next data stream. The metadata file for a user file contains an array of pointers pointing to a descriptor of each stripe-mirror instance; and the descriptor of each stripe-mirror instance in turn contains a pointer pointing to the first element of an array of data streams.

File Array. A "file array" consists of a subset of servers of a NAS array that are used to store a particular data file.

File Switch. A "file switch" is a device (or group of devices) that performs file aggregation, transaction aggregation and directory aggregation functions, and is physically or logically positioned between a client and a set of file servers. To client devices, the file switch appears to be a file server having enormous storage capabilities and high throughput. To the file servers, the file switch appears to be a client. The file switch directs the storage of individual user files over multiple file servers, using striping to improve throughput and using mirroring to improve fault tolerance as well as throughput. The aggregation functions of the file switch are done in a manner that is transparent to client devices. The file switch preferably communicates the with clients and with the file servers using standard file protocols, such as CIFS or NFS. The file switch preferably provides full virtualization of the file system such that data can be moved without changing path names and preferably also allows expansion/contraction/replacement without affecting clients or changing pathnames.

Switched File System. A "switched file system" is defined as a network including one or more file switches and one or more file servers. The switched file system is a file system since it exposes files as a method for sharing disk storage. The switched file system is a network file system, since it provides network file system services through a network file protocol—the file switches act as network file servers and the group of file switches may appear to the client computers as a single file server.

Data File. In the present invention, a file has two distinct sections, namely a "metadata file" and a "data file". The "data file" is the actual data that is read and written by the clients of a file switch. A file is the main component of a file system. A file is a collection of information that is used by a computer. There are many different types of files that are used for many different purposes, mostly for storing vast amounts of data (i.e., database files, music files, MPEGs, videos). There are also types of files that contain applications and programs used by computer operators as well as specific file formats used by different applications. Files range in size from a few bytes to many gigabytes and may contain any type of data. Formally, a file is a called a stream of bytes (or a data stream) residing on a file system. A file is always referred to by its name within a file system.

Metadata File. A "metadata file," also referred as the "metafile," is a file that contains metadata, or at least a portion of the metadata, for a specific file. The properties and state information (e.g, defining the layout and/or other ancillary information of the user file) about a specific file is called metadata. In embodiments of the present invention, ordinary clients are typically not permitted to directly read or write the content of the metadata files by issuing read or write operations, the clients still have indirect access to ordinary directory information and other metadata, such as file layout information, file length, etc. In fact, in embodiments of the invention, the existence of the metadata files is transparent to the clients, who need not have any knowledge of the metadata files.

Mirror. A "mirror" is a copy of a file. When a file is configured to have two mirrors, that means there are two copies of the file.

Network Attached Storage Array. A "Network Attached Storage (NAS) array" is a group of storage servers that are connected to each other via a computer network. A file server or storage server is a network server that provides file storage services to client computers. The services provided by the file servers typically includes a full set of services (such as file creation, file deletion, file access control (lock management services), etc.) provided using a predefined industry standard network file protocol, such as NFS, CIFS or the like.

Oplock. An oplock, also called an "opportunistic lock" is a mechanism for allowing the data in a file to be cached, typically by the user (or client) of the file. Unlike a regular lock on a file, an oplock on behalf of a first client is automatically broken whenever a second client attempts to access the file in a manner inconsistent with the oplock obtained by the first client. Thus, an oplock does not actually provide exclusive access to a file; rather it provides a mechanism for detecting when access to a file changes from exclusive to shared, and for writing cached data back to the file (if necessary) before enabling shared access to the file.

Spillover. A "spillover" file is a data file (also called a data stream file) that is created when the data file being used to store a stripe overflows the available storage on a first file server. In this situation, a spillover file is created on a second file server to store the remainder of the stripe. In the unlikely case that a spillover file overflows the available storage of the second file server, yet another spillover file is created on a third file server to store the remainder of the stripe. Thus, the content of a stripe may be stored in a series of data files, and the second through the last of these data files are called spillover files.

Strip. A "strip" is a portion or a fragment of the data in a user file, and typically has a specified maximum size, such as 32 Kbytes, or even 32 Mbytes. Each strip is contained within a stripe, which is a data file containing one or more strips of the user file. When the amount of data to be stored in a strip exceeds the strip's maximum size, an additional strip is created. The new strip is typically stored in a different stripe than the preceding stripe, unless the user file is configured (by a corresponding aggregation rule) not to be striped.

Stripe. A "stripe" is a portion of a user file. In some cases an entire file will be contained in a single stripe, but if the file being striped becomes larger than the stripe size, an additional stripe is typically created. In the RAID-5 scheme, each stripe may be further divided into N stripe fragments. Among them, N−1 stripe fragments store data of the user file and one stripe fragment stores parity information based on the data. Each stripe may be (or may be stored in) a separate data file, and may be stored separately from the other stripes of a data file. As described elsewhere in this document, if the data file (also called a "data stream file") for a stripe overflows the available storage on a file server, a "spillover" file may be created to store the remainder of the stripe. Thus, a stripe may be a logical entity, comprising a specific portion of a user file, that is distinct from the data file (also called a data stream file) or data files that are used to store the stripe.

Stripe-Mirror Instance. A "stripe-mirror instance" is an instance (i.e., a copy) of a data file that contains a portion of a user file on a particular file server. There is one distinct stripe-mirror instance for each stripe-mirror combination of the user file. For example, if a user file has ten stripes and two mirrors, there will be twenty distinct stripe-mirror instances for that file. For files that are not striped, each stripe-mirror instance contains a complete copy of the user file.

Subset. A subset is a portion of thing, and may include all of the thing. Thus a subset of a file may include a portion of the file that is less than the entire file, or it may include the entire file.

User File. A "user file" is the file or file object that a client computer works with (e.g., read, write, etc.), and in some contexts may also be referred to as an "aggregated file." A user file may be divided into portions and stored in multiple file servers or data files within a switched file system.

In exemplary embodiments of the present invention, a NFM system provides extensive file virtualization capabilities coupled with ease of management for network attached storage (NAS). Such NFM functionality can be achieved by means of appropriate appliances that conjugate the needs of system administrators to perform centralized control of file storage resources, with the ability of abstracting the clients from the knowledge of where such resources are located or dealt with. In the following discussion, the acronym NFM may be used to refer to network file management functionality, devices that perform such network file management functionality, and systems that include one or more network file management devices.

1. Introduction

There are generally two classes of file server systems, namely In-band Systems and Out-of-band Systems.

In-band Systems sit (either physically or logically) between the client machines and the storage devices and handle the client requests. Thus they have visibility of each incoming request, which allows them to perform all the appropriate processing locally, before handing off the requests (possibly transformed somewhat) to the target systems. The main advantage of this approach is that any form of virtualization can be completely dealt with inside the system, without any modification to the storage protocol. A secondary advantage is that the presence of the device in the network path allows the traffic to be analyzed. The biggest disadvantage is that all the network traffic between clients and storage devices flows through the In-band System. So, the device is a potential bottleneck and a potential source of additional latency.

Out-of-band Systems operate by being in the communication path between the clients and the storage only when this is strictly required. This generally requires the cooperation of the clients because standard storage protocols generally cannot be used. One advantage of this approach is that the device does not permanently sit in the network path between clients and storage, so it is not a bottleneck or a source of additional latency. A disadvantage is that the clients must use either non-standard protocols or adaptation software in order to take advantage of this architecture.

In exemplary embodiments, the NFM differs from both of the above schemes because, although the NFM may sit in the data path for some functions, it may be out of the data path for others. The NFM typically communicates with both clients and file servers using standard file access protocols such as NFS and CIFS, so the NFS appears to the clients as a standard file server and to the file servers as a typical client. The NFM may be built on standard high-end PC hardware and can be architected so as to be extremely scalable. The following describes some NFM functions as well as criteria that can impact design and implementation of the NFM:

The NFM should create a single, seamless file system name space across multiple file servers (even of heterogeneous nature) while supporting standard file access protocols such as NFS and CIFS.

The NFM should shield clients and client applications from the detailed knowledge of where certain files or file segments reside in the file storage system. This generally entails the complete decoupling of file pathnames from the location where the associated data is stored.

The NFM should enable the selective redundancy of files on the basis of both very general and finely granular specifications. Effectively, this allows NFM systems to stripe and mirror files across file servers in a way that resembles the way RAID controllers stripe and mirror across disk drives.

The NFM should enable very flexible management of storage in order to provide dynamic expansion of storage pool, good load balancing across the storage servers, and balancing in the amount of storage used on the various storage resources.

The NFM should be capable of exploiting a multiplicity of file servers in improving the performance of I/O operations, without causing negative impact on I/O from/to small files.

The NFM should be capable of reducing or completely avoiding any disruption to clients when the NFM is deployed as a front end to existing file servers.

The NFM architecture should provide for scaling performance as needed without being artificially constrained by bottlenecks introduced by the NFM.

The NFM should enrich the attributes of files so that applications oriented to Information Lifecycle Management (ILM) can manage storage and files in the most effective way, on the basis of dynamic policies. The file attributes can be intrinsic, assigned or set automatically, relying on file access patterns and statistics.

The NFM should provide a single locus of control to support management of the global name space and of the storage behind it.

The NFM should provide centralized facilities that allow dumps, restores and remote replications of the entire global name space or of portions of it in full or in incremental fashion via an industry-standard NDMP engine.

The NFM should not be required to maintain persistent state information. Rather, persistent state should be stored exclusively in the Metadata Service and the Storage Service, as discussed more fully below.

The NFM design should provide client access via standard storage protocols. In this way, clients would not be required to support any specialized software. As an ancillary to this goal, however, the design may permit special-purpose protocols to be added later, for example, for High Performance Computing (HPC) customers.

The storage protocols used to interact with the storage devices in the backend should be widely adopted in file servers and NAS devices and should allow aggressive caching and optimized data transfers.

No additional special-purpose software components should be needed on file servers, in the sense that key NFM functionality should not rely on such components. Among other things, this goal preserves compatibility with proprietary NAS devices accessible via standard protocols (such as NetApp and BlueArc filers).

With regard to error handling, ideally the specified correct behavior should be guaranteed and data corruption should be impossible. If correctness cannot be achieved, operations should be suspended until a full recovery is possible (i.e., correct behavior may be guaranteed at the expense of availability, since this might cause resources to become inaccessible). This may be dependent on the High-Availability readiness for each deployed configuration.

With regard to file system integrity checking, appropriate redundancy should be embedded within the metadata to ease the creation of self-healing subsystems, early detection/correction of inconsistencies should be available, and local correction of inconsistencies without full file system scans should be possible in order to avoid downtime in the unlikely event of a crash of a subsystem.

In an exemplary embodiment, one NFM system (possibly including multiple NFMs) typically provides access to one global file system name space. Multiple such systems may be deployed if multiple global name spaces are needed.

2. The User View

FIG. 1 shows an NFM configuration in accordance with an exemplary embodiment of the present invention. Apart from the clients and the network switch that provides connectivity, FIG. 1 depicts one NFM and some file servers referred to as Storage Servers. Each Storage Server provides access to one or more file system volumes. On Windows(™) machines, the Storage Servers would generally correspond to separate drive letter designators. On Unix(™) machines, the volumes would likely be "mounted" one within the other so as to provide a single local file system hierarchy.

The system in FIG. 1 is a single NFM system that implements a single global file system name space. As mentioned above, multiple such systems can be deployed if multiple name spaces are needed.

The act of adding a Storage Volume to an NFM system is referred to hereinafter as a "join" operation. The act of removing a Storage Volume from the NFM system is referred to hereinafter as an "unjoin". Volumes may be aggregated in different ways into Volume Sets. These different ways are referred to hereinafter as "Join Modes" and will be described in detail below. In the exemplary NFM system shown in FIG. 1, some volumes join the global file system hierarchy in a so-called Native Mode (this is the case for volumes V1 and V3 in FIG. 1) in which those file system hierarchies are managed entirely by the filers that host the volumes and the clients of the system see the file system hierarchies as an integral portion of the global name space. The other volumes (volumes V2, V4, V5 and V6) join the NFM system in a so-called Extended Mode. Volumes V2 and V4 are members of the E1 Extended Mode Volume Set, whereas V5 and V6 are members of the E2 Extended Mode Volume Set.

Among other things, separate Volume Sets allow Volumes to be grouped according to some criterion. For example, different Volume Sets could exist for different storage tiers. In exemplary embodiments, File Rules (see below), controlled by the system administrator, may be used to specify the way files should be laid out, taking into account the destination Volume Sets.

Going back to FIG. 1, the global name space hierarchy perceived by the clients is the one shown on top of the blue cylinder that represents the "virtual view" aggregating all the storage available. As can be seen, the original file system hierarchies in volumes V1 and V3 are represented in the directories named "A_X" for V1 and "B_Y" for V3. These are the pathnames where the administrator chose to place the hierarchies contained in V1 and V3. The locations in the global file system name space, as well as the name of each, are under the complete control of the administrator.

Extended Mode Volume Set E1 stores a portion of the hierarchy under the "docs" directory. The "Marketing" portion is stored within E2. As mentioned, appropriate File Rules allow the storage locations to be specified by the user.

Exemplary file rules are discussed in greater detail below.

3. Architecture and Functional Components

This section describes the rationale behind an exemplary NFM architecture, the architecture itself, and the main components of an exemplary NFM system. This section also provides a fairly complete overview of the capabilities of an exemplary NFM.

3.1. File Rules

Once Volume Sets are defined, the File Rules tie the pathnames to the file layout and to the Volume Sets. An NFM system supports a single global name space. A different set of rules can be applied to the name space supported by each distinct NFM system. For example, an "allow/deny" rule may be a "global" rule that applies to the entire global name space. "Native" rules may be provided, which only apply to Native Mode Volumes. "Layout" rules may be provided, which only apply to Extended Mode Volumes. The rules are generally applied when a file is created. The allow/deny rule may also be applied a file is renamed. In an exemplary embodiment, rule changes are generally not applied to existing files. Thus, for example, if a particular file was stored in a particular volume according to one set of rules, and that set of rules is changed to direct files to a new volume, that particular file generally would not be moved to the new volume.

Layout rules and native rules typically include a pathname specifier and a target Volume Set. Native rules typically can only use Native Mode Volume Sets as targets. Likewise, layout rules typically can only specify Extended Mode Volume Sets as targets. It is possible to use directory specifiers that apply only to a directory or to a directory and its subdirectories. It is also possible to use file specifiers that apply to a single file or to a category of files within the same directory. Both types of specifiers can also list suffixes to which the rule should apply, so that the user can restrict a given file layout, target Volume Set, or level of redundancy only to files of a given type.

FIG. 2 shows one example of a possible set of File Rules and Volume Sets for the global name space in FIG. 1. The syntax shown demonstrates the concept and is not to be taken literally.

Note that the layout rule that applies to a file creation is the most specific layout rule. For example, when file "\docs\Sales\Report.doc" is created, it uses rule 5, which is more specific than rule 7.

The Volume Set definitions in FIG. 2 can be interpreted as follows:

Definition a. qualifies Volume Set "N1" as native. Its member is volume V1. Native Mode Volume Sets always contain only one member volume.

Definition b. does the same for Native Mode Volume Set "N2" and volume V3.

Definition c. qualifies "E1" as an Extended Mode Volume Set with V2 and V4 as members.

Definition d. does the same for Extended Mode Volume Set "E2" and volumes V5 and V6.

Definition e. specifies an Extended Mode Volume Set made of 4 volumes (V7-V10), not shown in FIG. 1.

Once the Volume Sets are defined, the example File Rules can be explained as follows:

Rule 1 prevents any file whose suffix is ".mp3" or ".pgp" from being created through the NFM. Note that this applies to rename operations as well. This applies globally and affects Native Mode Volumes as well. Note however, that this rule can always be circumvented on Native Mode Volumes if direct access (i.e., client access to storage server that is not via the NFM) is provided.

Rule 2 is a native ('N') rule. It specifies that the native hierarchy in the only volume that is member of Native Mode Volume Set N1 should be available under the directory "A_X" in the root directory of the global file system. This effectively specifies the "mount point" of the root directory of the volume file system hierarchy for N1 within the global file system corresponding to the global pathname: "\A_X".

Rule 3 specifies the same for Native Mode Volume Set N2 and directory "B_Y" in the root directory of the global file system. In this case, the "mount point" of the root directory of the volume file system hierarchy for N2 within the global file system corresponds to the global pathname: "\B_Y".

Rule 4 says that all of the files that will be created in directory "\docs\Engineering" and its subdirectories (if any) should be simply striped by 2, with stripe fragment size of 128 Kbytes across the Extended Mode Volume Set E1.

Rule 5 specifies that all of the files that will be created in directory "\docs\Sales" and its subdirectories (if any) should be striped by 2, with stripe fragment size of 32 Kbytes across the Extended Mode Volume Set E2.

Rule 6 says that all the files that will be created in directory "\docs\Marketing" and its subdirectories (if any) should be simply striped by 2, with stripe fragment size of 32 Kbytes across the Extended Mode Volume Set E2.

Rule 7 specifies that all of the files that will be created in directory "\docs" and its subdirectories (excluding those covered by the more specific rules 4-6) should be striped by 2 and mirrored by 2, with stripe fragment size of 64 Kbytes, across the Extended Mode Volume Set E3. Note that this Volume Set, defined by Volume Set definition e. is not shown in the picture and that it must have at least 4 member volumes, in order to allow for 2-way striping and 2-way mirroring.

Rule 8 applies exclusively to all files whose suffix is ".ppt" or ".doc" that are in directory "\docs\Marketing". All files that satisfy this description are to be striped by two and mirrored by two, with stripe fragment size of 32K bytes and stored within Extended Mode Volume "E3".

Rule 9 is the "catch all" rule. This rule applies to all files not covered by any other rule and stores the data for such files within some default Volume Set (in this case E3). This rule is created automatically when the first volume joins the first Extended Mode Volume Set and is removed automatically when no more volumes are part of the system. This rule can later be modified with respect to layout (striping criteria) and target Volume Set, but its directory specifier must identify all file system objects from the root down.

Note that rules such as rule 5 can be changed at any time by specifying a different file layout or a different Volume Set as destination. New files to which the rule applies would then be created as requested. Also note that existing files can be migrated across extended Volume Sets, as desired, at any time. This would not affect the pathname of the files and therefore would be totally undetected by the clients.

It should be noted that the sample rules described above are included as examples of the types of virtualization services that can be provided by the NFM, and the present invention is not limited to these types of rules nor to any particular rule syntax. Rules are discussed further below.

3.2. Basic NFM Functions

Operation of the NFM and its ancillary components is based on the following system functions:

Storage Service (SS). This function amounts to storing and retrieving the user data written to user files, such as file fragments that compose a client files, under the coordination of the Storage Virtualization Service. The file servers that provide access to such data are referred to herein as Storage Servers. A Storage Server may be a file server or a NAS server. File fragments may be distributed across multiple storage servers to provide a storage level (e.g., mirroring or striping) chosen for a particular class of files. Each member of the Extended Mode Volume Set stores the data in a Fragment File. The latter collects the individual stripe fragments of a stripe laid across the Volume Set. The union of Fragment Files for a given user file stores the entire content of the file.

Storage Virtualization Service. This function amounts to aggregating the storage available in a single name space and to performing the gathering or scattering of file data from or to Fragment Files. This is performed through interactions with the Storage Service, according to the layout the appropriate File Rule applied to each file. This function is performed within the NFM itself through custom software referred to herein as the Aggregated File System (AFS). The AFS makes use of the Metadata Service to support the view of a hierarchical namespace and to retrieve the layout information and the target Volume Set for each file.

Metadata Service (MDS). This function implements the hierarchical namespace that AFS exposes to the client world. This function leverages the hierarchical nature of the host file system. The name space hierarchy is implemented via metadata files allocated within a file system tree that matches the layout of the aggregated file system the clients perceive. This function can be run within any Windows server, including the NFM itself. However, it is a component logically independent from the Storage Virtualization Service.

Generally speaking, all three services must be available for the NFM to operate. However, special cases may arise when either all the volumes in use joined the NFM system in Native Mode, or all the volumes joined in Extended Mode.

If all volumes joined in Native Mode, then apart from a small root hierarchy implemented by the MDS, processing is performed by the filers that provide access to the Native Mode Volumes. In this case, the NFM architecture supports a "dual-path architecture" providing the ability to access the same file both via direct interactions with the server that hosts the Native Mode Volume (FIG. 3) and via the NFM (FIG. 4).

For Native Mode Volumes, in addition to creating the mount point within the global name space, the NFM insures proper semantics for file locking and oplocks, regardless of the path that the clients use. For the rest, the NFM acts as a pure pass-through.

The three components described above interact in the following way. Each NFM hosts a Storage Virtualization Service. This is implemented in terms of a file system driver and gives access to the abstraction of the global name space for its clients. All the NFMs in an NFM system provide exactly the same view of the name space. Depending on whether the data is stored on a Native Volume or on an Extended Volume Set, the requests would be handled by the server hosting the volume or by the Storage Virtualization Service, respectively. When a file is opened, the Storage Virtualization Service fetches the metadata information from the MDS and accesses the file blocks on the basis of the mappings the metadata information provides. This metadata is cached and an oplock-like protocol insures that contention across multiple NFM devices is handled appropriately.

FIGS. 3, 4 and 5 show various ways in which clients can access files stored within the volumes that joined the NFM system. These pictures are simplified in that remote access should be performed via shares available to the remote clients, rather than directly to the letter drives. However, for simplicity, such detail is omitted.

The interactions among the services can be described by breaking up a typical client request to open, read or write and then close a file with respect to the way the file is stored in the NFM system.

Access to files in a Native Mode volume could be performed without involving the NFM. In this case, all the interactions would occur directly between client and Storage Server (see FIG. 3), so such interactions would be handled in a totally out-of-band fashion, since it would not involve the NFM at all.

On the other hand, client requests to the NFM addressing files stored in a Native Mode Volume would generally go through the following steps (see FIG. 4):

1. The NFM receiving the open request would detect the fact that the request addresses a file stored on a Native Mode Volume. The NFM would then strip the pathname of the prefix corresponding to the "mount point" for the Native Mode Volume in the global name space and would forward the request to the Storage Server that manages the volume.
2. The Storage Server would open the file and return a handle to the client via the NFM.
3. From then on, all the requests that use that handle would be forwarded to the Storage Server, without further NFM processing. Likewise, the replies would be sent back to the client via the NFM.
4. A close would be executed on the Storage Server and would stop the redirection the NFM was performing on behalf of client and Storage Server.

The above would occur in an in-band fashion. The advantage of proceeding this way with respect to the previous scheme is that the same file would be seen as part of the global name space.

Finally, files stored on Extended Mode Volumes are broken down into individual stripes stored within Fragment Files on each volume member of the Extended Mode Volume Set. Requests to perform reads or writes from or to such files would generally go through the following steps (see FIG. 5):
1. The open request would cause the NFM receiving the request to open the associated metadata file on the MDS and to fetch the metadata file content.
2. The content of the metadata file would show the file layout in terms of striping and mirroring and of the volumes where the actual data is stored.
3. Subsequent read or write requests, depending on the offset, would cause the Virtualization Service to open the appropriate fragment file(s) on the appropriate volume (s), if not already open, and to read or write the data at the appropriate offset.
4. A close would close the metadata file on the MDS as well as any open fragment files on the appropriate volumes.

This last class of operations would be in-band, as well.

3.2.1. Storage Servers, Volumes and Volume Sets

The NFM treats each volume as an independent entity, even when the volume is co-hosted with other volumes in the same storage server. Each individual volume can join the global name space using a Join Mode different from those used by other volumes hosted by the same server.

The Storage Service is implemented by filers and file servers whose volumes are joined to the NFM system in one of the possible Join Modes (discussed below). Particularly for volumes that are joined in Extended Mode, the NFM needs to interact with the Storage Service. Such interactions are preferably carried out through a standard backend storage protocol such as CIFS or NFS. The backend storage protocol preferably supports aggressive caching and optimized data transfers. The "oplock" mechanism available in CIFS provides these functions. NFS v4 provides facilities that are somewhat similar, but NFS v4 is not supported on many filers and NAS devices. Therefore, in an exemplary embodiment, CIFS is used as the backend storage protocol. It should be noted that other backend storage protocols may be supported by the NFM, and, in fact, the NFM may be configured to interact with different types of backend file servers using different file storage protocols.

For volumes in Native Mode, the processing of data and metadata is performed by the host server. Thus, clients can have direct access to the files on the Native Volumes (see FIG. 3). It is also possible to access the same files via the NFM, which in this case acts as a pass-through (see FIG. 4) such that incoming client requests are essentially forwarded to the target server.

Because of this, the protocols natively available on the target server are used. This means that servers that provide the CIFS service will allow CIFS access to their native volumes and servers supporting NFS will provide NFS access to the native volumes. In an exemplary embodiment, the latter is the only case in which the NFM interacts with a storage server via NFS.

In an exemplary embodiment, all of the storage servers whose volumes join the system in Extended Mode must talk CIFS, although, as discussed above, the present invention is not limited to CIFS. Note that, in general, because of the ability to stripe and mirror files across volumes that belong to the same Volume Set, incoming client requests to the NFM are often mapped to multiple requests to the storage servers (see FIG. 5).

In an exemplary embodiment, filers that support both CIFS and NFS would use CIFS for the Extended Join Mode; NFS would only be used for Native Join Mode. Thus, in this embodiment, NFS access to Native Mode Volumes on CIFS-only filers would not be supported, just like CIFS access to Native Mode Volumes on NFS-only filers would not be supported. It should be noted that CIFS client access to NFS Native Mode Volumes and NFS client access to CIFS Native Mode Volumes may be provided in alternative embodiments, for example, by providing NFS-to-CIFS or CIFS-to-NFS translation or spoofing (e.g., implementing CIFS or NFS using the native file system, without any actual protocol translation).

Direct client access to Extended Mode Volumes should always be disallowed, since only the NFM should be permitted to deal with such volumes (only the Storage Virtualization Service of the NFM understands the layout of such volumes). On the other hand, direct access to Native Mode Volumes should always be allowed.

A Storage Volume Set (also known as a Volume Set) groups together a number of volumes that have some common property. In an exemplary embodiment, a given volume may belong to one and only one Volume Set. The aggregation of volumes into Volume Sets is typically a management operation performed by the system administrator so as to group together volumes with similar characteristics. Therefore, the system administrator should be able to create such groups on the basis of common properties that can be captured in the Set description. Examples of such Sets could be the following: a set of fast file servers, a set of highly available servers, a set of low-cost/high-capacity servers, a set of servers operating in the same office or geographical location, and so on. Among other things, this allows the grouping of volumes in sets that may represent different storage tiers.

As discussed above, Volume Sets may be characterized by type, of which two are defined herein, namely Extended and Native. A volume that is the one and only member of a Native Volume Set can be referred to as a Native Volume, for brevity. Likewise, volumes that are members of an Extended Mode Volume Set can be referred to as Extended Volumes. As discussed above, the difference between the two types of Volume Sets can be summarized as follows:

Extended: These Volume Sets take full advantage of the NFM facilities and allow the striping and mirroring of files across the Volume Set. Volume Sets of this nature only group volumes joining the Volume Set in Extended Join Mode.

Native: These Volume Sets contain only one member. In the case of Native Volumes, the restriction whereby a volume can be member of only a single Volume Set is removed. In case a Native Volume has multiple shares and more than one share needs to be made visible in the global name space, a Native Volume Set can be created and associated to each of the shares. In an exemplary embodiment, no share in a Native Volume can join any Extended Volume Set because the space in such Native Volumes is managed by the storage server that owns it rather than by the NFM system.

In an exemplary embodiment, the files contained in Native Volumes after they join a Native Volume Set are never striped or mirrored across multiple volumes, so that making them join and then unjoin a Volume Set can be done in a fairly simple and transparent fashion. File Rules are used to link Volume Sets to the way files are stored (file layout), as briefly shown in a previous section. File Rules essentially define the way certain classes of files should be laid out and specify on which Volume Sets the physical content of files should be stored.

The System Management component that manages Volume Sets preferably cooperates with the File Rule engine so as to make sure that changes in the composition of Volume Sets are compatible with the rules being applied. Likewise changes to File Rules must be performed in such a way that they do not create inconsistencies in Volume Sets.

3.2.2. Volume Join Modes

This subsection provides additional details on Volume Join Modes and on the way Join Modes affect the way clients access files.

A file server may provide access to a number of volumes and only some of these may be set up to join an NFM system. Each joining volume could join in a different mode. Therefore, the granularity of the join is preferably that of a volume.

A volume with pre-existing data that must be available after joining an NFM system may have multiple shares/exports configured. A different behavior is allowed for Native Mode Volumes compared to Extended Mode Volumes:

For Extended Mode volumes, after the migration, all the original shares may be exported by the NFM system so that access to the pre-existing data is still possible. However, only one share will be used to allow the NFM system to interact with the volume. In principle, this could either be the share that points to the higher level directory available in the volume hierarchy, or a new share to be created that points to the most appropriate directory in the volume. This avoids potential aliasing of volumes that could cause the NFM system to count the storage space in a volume multiple times. The single share used by the NFM system to interact with the volume should provide administrative privileges for the NFM that give the NFM full control over the entire volume.

This restriction whereby a single share per Extended Mode Volume is available to the NFM system to access the volume does not apply to Native Volumes. The reason is that since the space management of the volume is entirely delegated to the server that hosts the volume, multiple existing shares from the same volume can be made available through individual "mount points."

Another reason why the use of multiple shares in a volume is allowed for Native Volumes but not for Extended Volumes is that, if this restriction were lifted, it could be possible to use some share in a volume in Native Mode, whereas other shares in the same volume could be used in Extended Mode. This would cause a volume containing pre-existing data to also host file fragments created by the NFM. This is undesirable because customers may want to deploy the NFM to clearly partitioned storage areas with no chance of affecting any pre-existing highly valuable data. Allowing the use of multiple shares in Extended Mode would violate this principle.

The next subsections discuss the above points. The issue of join modes is very important because the choice of a mode affects the capabilities of the file server that joins an NFM system and the procedures needed to perform the join and unjoin operations.

3.2.2.1. The Extended Join Mode

Depending on the join mode applied to a file server volume, the volume has different behavior and capabilities within an NFM system.

File server volumes operating in the Extended Join Mode are allowed to fully partake of the functionality supported by an NFM system. This implies the ability to store fragment files for stripes belonging to files spread across multiple Storage Volumes.

One special case is how to handle pre-existing content when a file server volume joins an NFM system in Extended Mode. In such case, the NFM could simply leave the existing content as is or could copy the entire file system hierarchy so that files are re-configured according to the applicable File Rules. The former approach would involve added complexity, as the NFM would generally need to maintain additional information about the content of the volume in order to be able to distinguish and handle pre-existing content that was not stored according to the rules and new content that was stored according to the rules. The latter approach, which is preferred in an exemplary embodiment, would convert the pre-existing content into new content that is stored according to the rules.

Likewise, file server volumes operating in this fashion cannot simply unjoin the NFM system and be used with their content as they would only contain portions of the files whose file fragments they store. Moreover, the file system hierarchy in use would not be meaningful. Therefore they need to restore the subset of the file system hierarchy that must be in the file server volume.

These two procedures can be simply undertaken by copying the entire hierarchy of interest (including all the attributes and file ownership information) from the joining server to the aggregated file system for the join operation and in the other direction for the unjoin operation. Such procedures can be carried out by running an appropriate program within one of the NFMs that are part of the NFM system.

This procedure may be performed by executing a recursive copy of the existing file system hierarchy of the filer to the drive that gives access to the global name space (the so-called "Z drive"), deleting files and directories, as they get transferred. The procedure is executed on an NFM and also entails copying all the file attributes, security settings, and so on. Since the File Rules set up within the NFM system specify the file layouts, in the process of copying the files to the Z drive, they are laid out according to the applicable File Rules. In case the procedure is interrupted, it can be resumed later, since removing each of the files and directories after they are transferred should automatically keep track of the operations remaining to be performed. Since the source of the data is the filer and the destination Storage Volumes may include the filer itself, the NFM should ensure that there is sufficient free space available on the filer before the join procedure is executed (this could be a fixed free space requirement, e.g., at least 20% of storage capacity still available, or could be computed based on the actual amount of storage that will be needed, e.g., based on the cumulative size of files to be mirrored).

The import would consist of walking the tree of the file system volume to be joined, creating directories within the metadata storage of the NFM array, and copying the files from the volume to the drive that covers the global name space. The files and directories would be deleted as the recursive copy is progressing. This would automatically copy the original files to the NFM system on the basis of the desired striping layout.

The reverse approach would be followed by the unjoin utility, in order to restore the content of the file server volumes to what was originally, by performing the reverse copy from the relevant subtrees of the aggregated file systems mapped onto the original file server volume hierarchies to the individual volumes, and migrating back filer names and shares. At the end of this cycle, the filer to be unjoined could still contain fragment files belonging to striped files that are not part of the file system hierarchy of the filer. These should be migrated elsewhere.

Also, shares and filer names can be migrated back, in case they were overtaken by the NFM system.

Thus, when a volume including existing files is joined in extended mode, the file server volume can fully participate in file striping and mirroring, selective File Rules can be applied to files and directories, the free space on the volume becomes part of the global storage pool and managing it becomes easier and more cost-effective, files are not constrained by the space available within any one volume, and pathnames become fully independent of the actual storage locations and allow the transparent migration of individual files or of file system trees to storage with different characteristics. Because the file system of the volume cannot be joined as is, however, the join procedure is likely to be time-consuming, an aborted joins leave the volume in an intermediate state that requires either the completion of the join or the partial operation to be undone, and the removal of the file server volume from the NFM system is more painful and time-consuming. There may also be some concern by the user due to the movement of the original volume contents.

It should be noted that the volume should be made part of one (or more) of the available Storage Volume Sets known to the NFM system prior to the join operation. Also, during the join operation, direct client access to the volume whose file system hierarchy is being imported should be disabled because all accesses to the volume will be done via the NFM.

3.2.2.2. The Native Join Mode

Existing Storage Volumes can be also integrated into NFM systems as "Native Volumes." Native Volumes are Storage Volumes to which no form of file-based striping or mirroring, nor any of the advanced features supported by the NFM, are applied, so that all files are entirely contained within the volumes themselves. As mentioned earlier, all existing shares within the same volume can independently join an NFM system in Native Mode.

For volumes joining in Native Join Mode, the NFM essentially acts as a pass-through, so that access to files on the volume would not occur through the mediation of the NFM Metadata Service. In this mode, the volume can also continue to be directly accessible by external clients.

In reality, for the Native Join Mode, each share a volume makes available can be independently treated as a real volume. In other words, if the NFM administrator wishes to export all of the shares the Native Volume makes available through the NFM, each such share would be effectively treated as an independent Native Volume and would have a corresponding File Rule (e.g., similar to rules 1 and 2 in FIG. 2).

A volume joins an NFM system in the Native Join Mode as follows:

1. The "mount point" for the file system hierarchy originally in the volume is defined within the aggregated file system. This mount point is the pathname of the directory under which the files in the joining volume will be accessible. There is a default for this mount point placed in the root directory of the aggregated file system and its name is the concatenation of the name of the server containing the Native Volume with the volume name.

2. When the mount point is in place, any request containing a pathname pointing to any directory below the "mount point" of the native volume is stripped of the pathname of the mount point. The remaining pathname is handed to the server that hosts the Native Volume, that will deal with it.

Consequently, although the Native Volume is fully part of the aggregated hierarchy, all the operations in that portion of the hierarchy only affect the Native Volume. This also means that a volume can join the NFM system, without any need to run special utilities to import the existing file system hierarchy into the metadata store.

Note that the join operation according to this scheme may not need client access to the file server to be blocked.

Likewise, the unjoin operation should be just as simple, since the Native Volume is completely self-contained and will continue to be directly accessible even if the connection to the NFM system is severed.

In order to keep the file system of the server entirely self-contained, functionality that relates to the global file system should be disabled, such as hard links across servers, striping and mirroring of files across volumes, etc. However, this is in line with the idea of making such volumes part of the aggregated file system, still retaining their original content and not creating dependencies on other servers.

Having a volume join the NFM system in the Native Join Mode implies configuring the NFM system by creating a Storage Volume Set, associating the volume to it, choosing the pathname of the directory where the root of the native file system being joined would appear and setting the appropriate native rule (see below). No need to migrate names, shares or files would exist as direct access to the filer would still be possible. Likewise, the unjoin would simply reconfigure the NFM system. Thus in both cases, a special utility to perform this kind of operations is not needed and the volume continues to remain accessible throughout the process.

3.2.2.3. The Extended Join Mode vs. the Native Join Mode

Table 1, shown in FIG. 6, summarizes the relative capabilities of the Extended Join Mode versus the Native Join Mode. The following things should be noted:

In item 3, the time needed to perform the join or unjoin of a volume in an Extended Join is variable and depends on the amount of pre-existing data that the volume originally contained and that the customer wishes to migrate to the NFM system. If no pre-existing data needs to be migrated, then the time needed to join/unjoin will be comparable for the two Join Modes.

Item 5 reflects the fact that whereas volumes operating in Native Join Mode can be accessed both directly (see FIG. 3) and via the NFM (see FIG. 4), volumes operating in Extended Join Mode can only be accessed through the NFM (see FIG. 5).

Item 7 shows that for volumes operating in Extended Mode, pathnames are decoupled from the location where the file data is kept. In Native Mode this is not true.

Item 8 highlights that Extended Mode volumes are pooled together into Volume Sets. These can grow arbitrarily, without affecting the data stored in the Volume Set they belong to. This is not true of Native volumes.

Items 9 and 10 highlight the fact that that the allow/deny rule is available to Native Volumes as well as to Extended Volume. However, for Native Volumes, only the native rule that identifies it applies (e.g., rules 1 and 2 in FIG. 2), whereas all the layout rules that specify striping, mirroring, etc. only apply to Extended Mode Volumes.

Item 11 highlights the fact that hard links to any non-native file in the system are available for Extended Mode. Not so for Native Mode.

3.2.3. Remote Client Access to Files

The ways in which the clients can access files depends on the Join Mode, on the impact in terms of potential dangers, and on the desired transparency with respect to the client themselves before and after the join.

Volumes that join in the Extended Mode essentially are pooled and lose their individual identity (apart from their being members of a Storage Volume Set that may be the target of appropriate File Rules). After the join, these volumes should not be accessible directly by the clients. On the other hand, volumes operating in Native Mode retain their identity and can be accessed directly by the clients.

For Native Joins, the access to the global hierarchy would be provided by shares that point to the root of the hierarchy or to some directory above the "mount point" for the Native Volume.

If clients need total transparency with respect to the fact that a volume with pre-existing content has joined an NFM system and client access to the volume is desired (or only possible) through the NFM after the join, then the server name should be migrated to the NFM and shares that point to the directories to which the original shares pointed before the volume joined the NFM system should be created.

3.2.4. More on File Rules

This section provides more detailed information on File Rules. As mentioned, File Rules provide user-defined templates that specify the layout and the storage to be used for the files to which they apply. Every time a file is created, the AFS invokes a function that matches the file being created to the appropriate layout template.

There are generally two categories of File Rules: Global File Rules that apply to the entire global file system and Layout File Rules that apply to a subset of the global file system and describe the way certain classes of files should be laid out across Volume Sets.

3.2.4.1. Global File Rules

In an exemplary embodiment, there are two members of the set of Global File Rules:

1. One type of global rule allows administrators to specify the types of files that either are expressly allowed to be created in the system or expressly denied from being created in the system. In an exemplary embodiment, the file allow/deny criteria is based on the suffix of the file name, although other criteria could be additionally or alternatively used (e.g., deny all files having file size greater than some threshold). The "allow" form explicitly lists the file suffixes of files that can be created through the NFM (e.g., allow files with .txt or .doc suffixes); all other file suffixes would be denied. The "deny" form explicitly lists the suffixes of files that cannot be created within the NFM system (e.g., deny files with .mp3 suffix); all other file suffixes would be allowed. Suffixes are preferably specified in a case-insensitive fashion because Windows platforms treat suffixes as case-insensitive. The NFM system applies the allow/deny filter File Rule any time a file is created or renamed. In an exemplary embodiment, this is the only rule that performs such a filtering function for files. In case the suffix of the file to be created, or that of the target name for a rename, is not in the allow list or is within the deny list, the request will be rejected. The allow/deny rule applies to both Native and Extended Mode Volumes. In an exemplary embodiment, at most one allow/deny rule can be present.

2. A second global rule allows administrators to specify the threshold for defining small files, which may be handled in a special way in some embodiments, as discussed in detail below. In an exemplary embodiment, the threshold applies globally, but can be overridden within individual Layout File Rules. A threshold of zero implies that small files do not receive special treatment. In case this rule is absent, this is preferably treated as being equivalent to a threshold set to zero. This rule only applies to Extended Mode Volumes.

Figure 11:
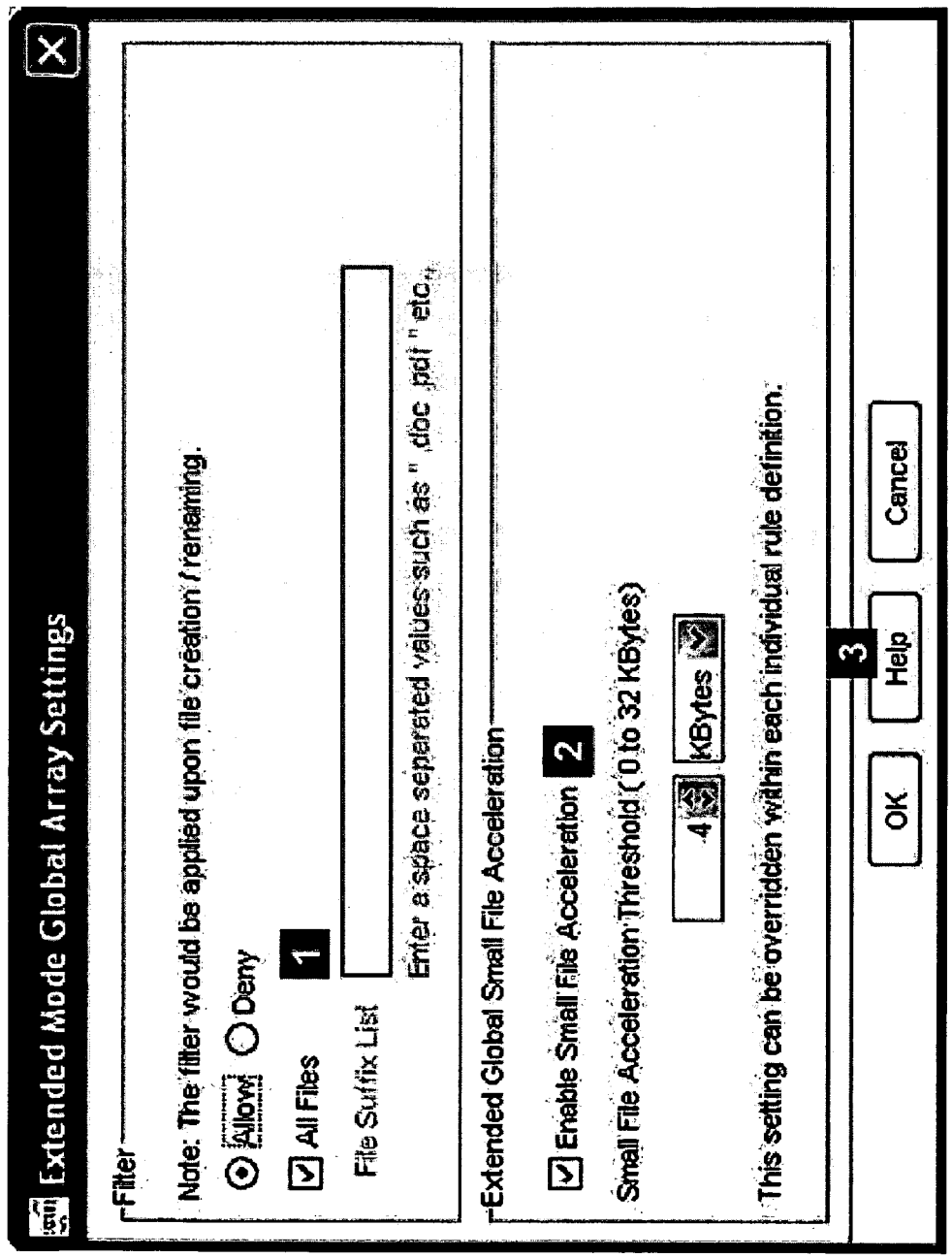
FIG. 11 shows the extended mode global array settings dialog box, in accordance with an exemplary embodiment of the present invention.

FIG. 11 shows a dialog box for configuring global rules, in accordance with an exemplary embodiment of the present invention.

In FIG. 11, field number 1, the user can configure the allow/deny file filter rule settings. The user can choose the Allow radio button to allow files access to the MFS, or choose the Deny radio button to deny files access to the MFS. To allow/deny all files access to the MFS, the user clicks the All Files check-box so that it is selected. To allow/deny certain files containing specified suffixes access to the MFS, the user clicks the All Files check-box so that it is not selected and enters a space-separated list of appropriate file extensions into the "File Suffix List" field. It should be noted that, in this embodiment, each suffix must start with a period ( ) character. The string "." specifies files without suffixes, and the string ".." specifies files with a suffix that is a single period.

In FIG. 11, field number 2, the user can configure the global small file acceleration threshold settings. To disable global small file acceleration, the user clicks the Enable Small File Acceleration check-box so that it is not selected. To enable global small file acceleration and set the threshold, the user clicks the Enable Small File Acceleration check-box so that it is selected, then selects the desired global small file acceleration threshold using the "Small File Acceleration Threshold (0 to 32 KBytes)" spin box and associated units drop-down list.

In FIG. 11, field number 3, the user can click the OK button to accept the global array setting modifications and closes the dialog box. Alternatively, the user can click the Cancel button closes the dialog box without making any changes or can click the Help button to open a Web browser containing help information on the dialog box.

3.2.4.2. Layout File Rules

In an exemplary embodiment, there are two classes of Layout File Rules:

i. Native rules that apply to volumes operating in the Native Join Mode (they cannot make use of striping or mirroring). Note that in this special case, pathnames and storage locations coincide. Each Native Mode Volume share has a single layout rule that applies to it and it is a native rule.

ii. Extended Mode rules that apply to volumes operating in Extended Join Mode. These specify the full layout of files, including striping and/or mirroring, and the target Volume Set that must store the file data.

If the file or directory specified within a rule does not exist, the rule would never be applied until the time when such a directory comes into existence. The existence of a rule that specifies a non-existent pathname is not, by itself, an error.

Layout File Rules are not expected to define which files should or should not be stored within the aggregated file system, since this filtering function is uniquely assigned to the allow/deny global rule. However, to prevent the possibility that the layout rules may not cover the totality of pathnames and/or suffixes usable within the aggregated file system, the File Rule subsystem should provide a "catch-all" rule that will be applied to any file that is not matched by any other File Rule. This rule will be automatically created when the first volume joins a Volume Set and should not be deleted. The rule preferably will be automatically removed when the last Volume Set becomes empty. The rule preferably can be edited only with respect to the chosen layout and the target Volume Set, but not with respect to the files to which the rule will apply.

There is a single rule in class i. structured in terms of the following items:

Directory description. The absolute pathname of the directory under which the Volume Set file system hierarchy will be accessible in the aggregated file system (i.e., "mount point"). This piece of information is mandatory.

Storage Volume Set. This is the name of the native Volume Set that contains the volume share. Only a single volume share can be member of a native Volume Set.

Rules in class ii are structured in terms of the following items:

File description. The files to which a certain rule should apply. These should be specified through:

(a) The absolute pathname of the file or directory to which the File Rule applies (in the case of a directory, if so specified, this may recursively include the contained subdirectories). This piece of information is mandatory. Note that the file/directory may not exist, in which case the rule would never be applied until the time when such a directory comes into existence. A special flag is used to specify whether the pathname to which the File Rule applies should be interpreted in a case-insensitive or in a case-sensitive fashion. Note that this applies to the pathname, but not to the suffixes that are always case-insensitive.

(b) The types of files to which the File Rule should apply, specified on the basis of the file suffix. This item restricts the set described via the previous item and is optional. Note that if the previous name is the pathname of a file, the rule applies only to the files that have the specified pathname and file name and a suffix included in the suffix list. If the pathname is that of a file and the suffix list is missing, the File Rule applies only to the specified file. Finally, in case the pathname is that of a directory, the File Rule applies to all the files under the directory (and possibly to those files within its subdirectories) that have a suffix in the suffix list (or any file if the suffix list is missing). Suffixes are always specified in a case-insensitive fashion because their interpretation is only meaningful on Windows platforms that treat the suffixes as case-insensitive.

Overriding small file threshold. This is an optional small file threshold that overrides the global one. When present, all the files to which the rule applies are subject to this threshold rather than to the global one. A threshold of zero disables the small file threshold for the files to which the rule applies.

Storage scheme. The storage scheme (e.g., striping criteria) to be employed. This specifies whether the class of files described by the File Rule should be simply striped (and with which stripe cardinality and stripe fragment size). Also it should be possible to specify whether the files described by the File Rule should be mirrored (with how many mirrors) or set up as RAID-5 files. Files can also be made of a single stripe, in which case they are not striped across the Volume Set. Other types of storage schemes may be supported and specified through this item.

Target Extended Volume Set. This is the Volume Set where the file stripes will be stored.

Figure 12:
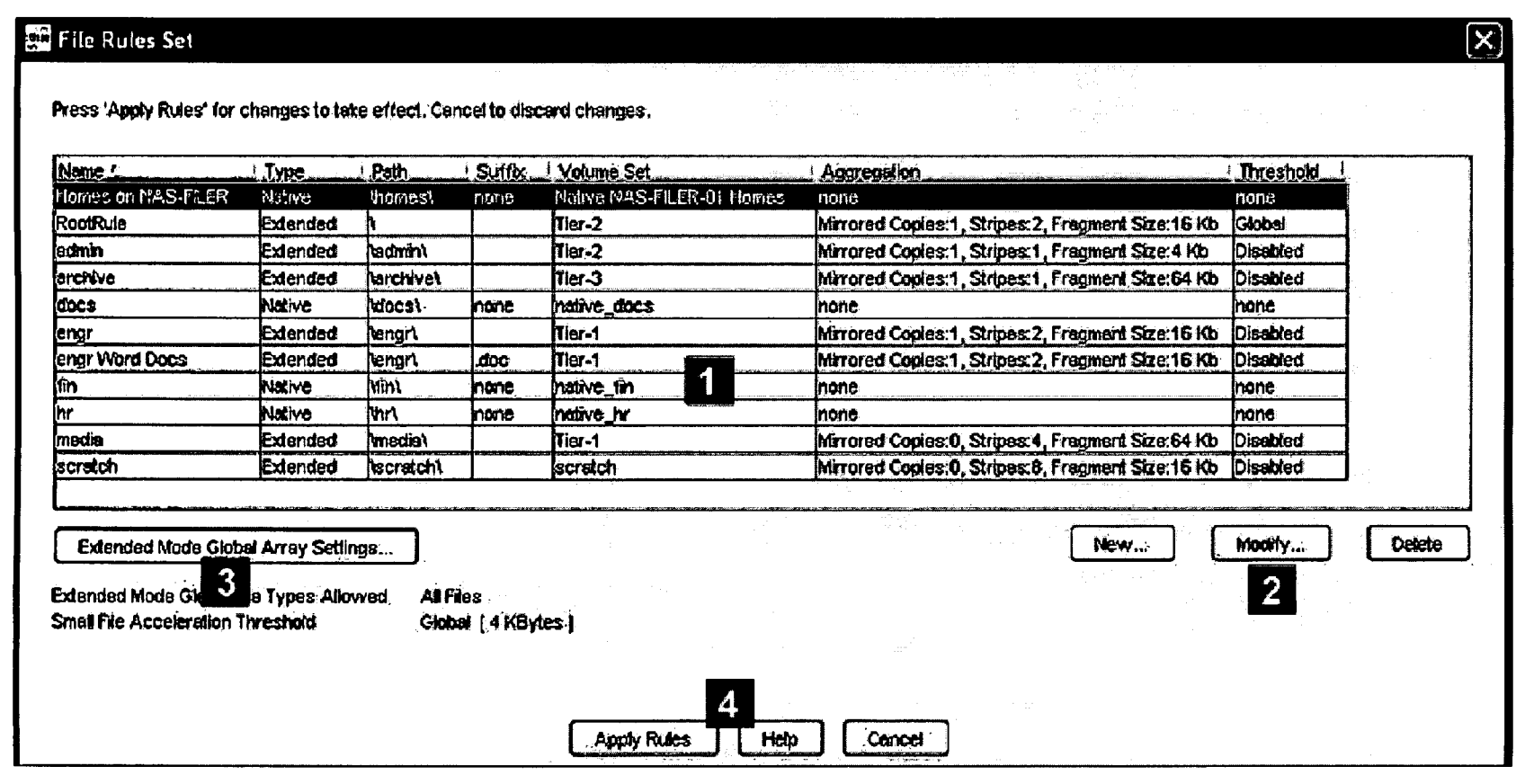

FIG. 12 shows the file rules set dialog box, in accordance with an exemplary embodiment of the present invention.

In FIG. 12, field number 1 displays information for all of the existing layout rules. The following information is displayed for each layout rule:

Name—The name of the layout rule to which the remainder of the information in the row pertains.

Type—The type of rule. This will be "Native," "Directory," or "File."

Path—The directory and file name in the Maestro file system (MFS) to which the rule applies. For extended mode rules, data that is written to this path and file name by clients is formatted according to the rule. For native rules, this is the exported directory.

Suffix—The file extensions to which the rule applies. If extensions appear in this field, the rule applies only to files that have one of the file extensions listed. If no extensions appear in this field, then extensions are not considered when the rule is applied. If none appears, the rule is a native rule.

Volume Set—The name of the extended mode storage volume set to which the rule applies.

Aggregation—The aggregation settings for the rule, in the format Mirrored Copies:< >, Stripes:< >, Fragment Size:< >

Mirrored Copies—The number of data mirrors that is currently set.

Stripes—The number of fragments currently being used for data striping.

Fragment Size—The stripe fragment size that is currently set.

Threshold—The currently set small file threshold limit, which determines the size limit under which files to which the rule applies are cached in metadata, rather than stored as a data file.

In FIG. 12, field number 2, these three buttons are used to perform various actions on the set of layout rules. Specifically, the user can click the "New . . . " button to invoke the New Rule Definition dialog box (discussed below), which is used to add a new layout rule to the set of layout rules. After selecting an existing rule from the list of rules displayed in area 1, the user can click the "Modify . . . " button to invoke the Modify Rule Definition dialog box (discussed below), which is used to modify the selected layout rule. After selecting an existing rule from the list of rules displayed in area 1, the user can click the "Delete" button to delete the selected rule.

In FIG. 12, field number 3, the user can click this button to invoke the Extended Mode Global Array Settings dialog box, which is used to view and modify the global array settings. The Extended Mode Global Array Settings dialog box is discussed above.

In FIG. 12, field number 4, the user can click the "Apply Rules" button to apply changes, additions, and deletions that have been made to the rule set to the active set of layout rules. Clicking the Cancel button closes the dialog box without making any changes, and clicking the Help button opens a Web browser containing help information on the dialog box.

Figure 13:
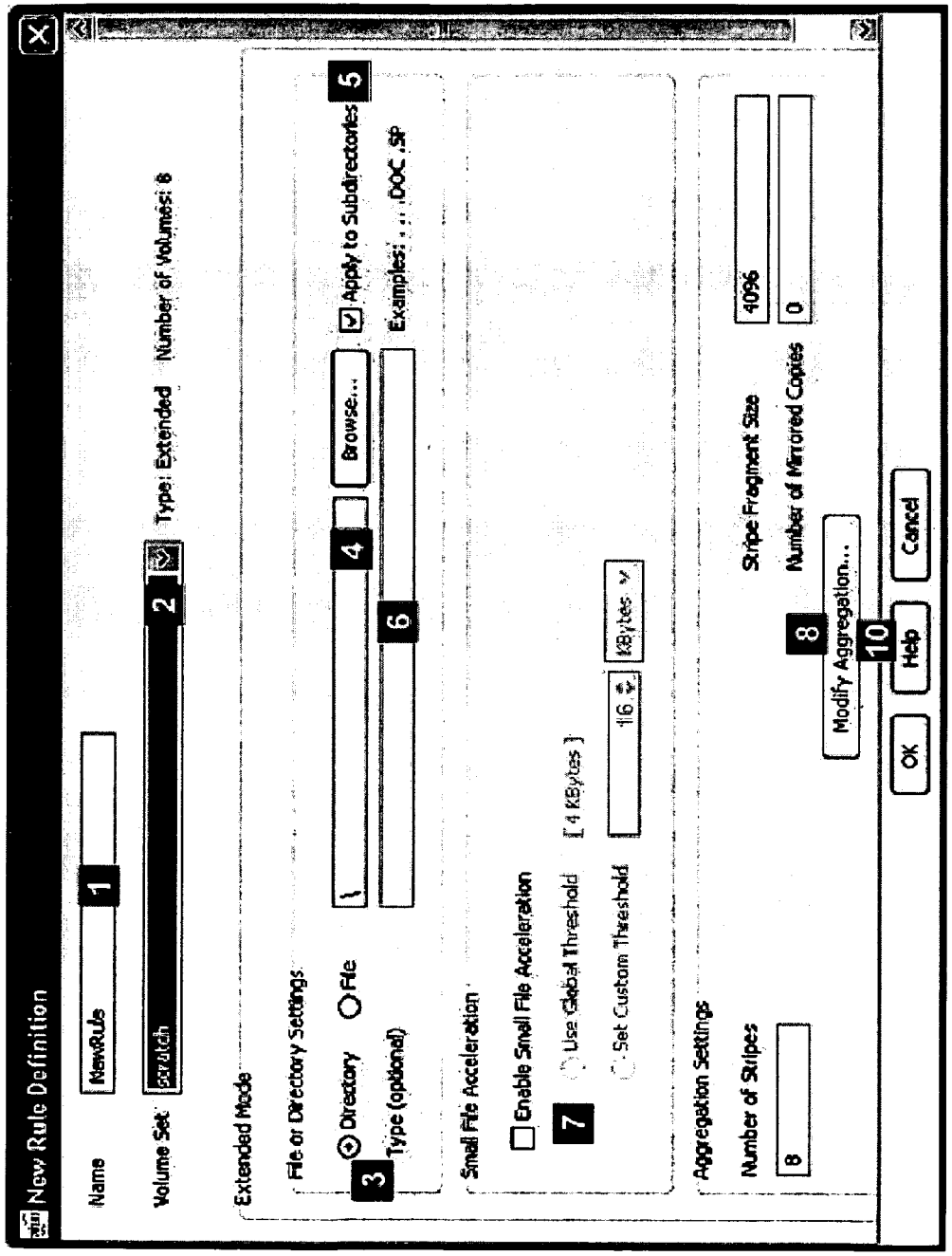
FIG. 13 shows the new rule definition dialog box for extended mode volume sets, in accordance with an exemplary embodiment of the present invention.

The "New Rule Definition" dialog box is a sub-dialog of the File Rules Set dialog box. The "New Rule Definition" dialog box is used to create new layout rules. The actual dialog box that is displayed depends on the type of storage volume set that is selected in the "Volume Set" field. If an extended mode storage volume set is selected in the "Volume Set" field, the dialog box shown in FIG. 13 is invoked. If a native mode storage volume set is selected in the "Volume Set" field, the dialog box shown in Figure FIG. 14 is invoked.

Figure 14:
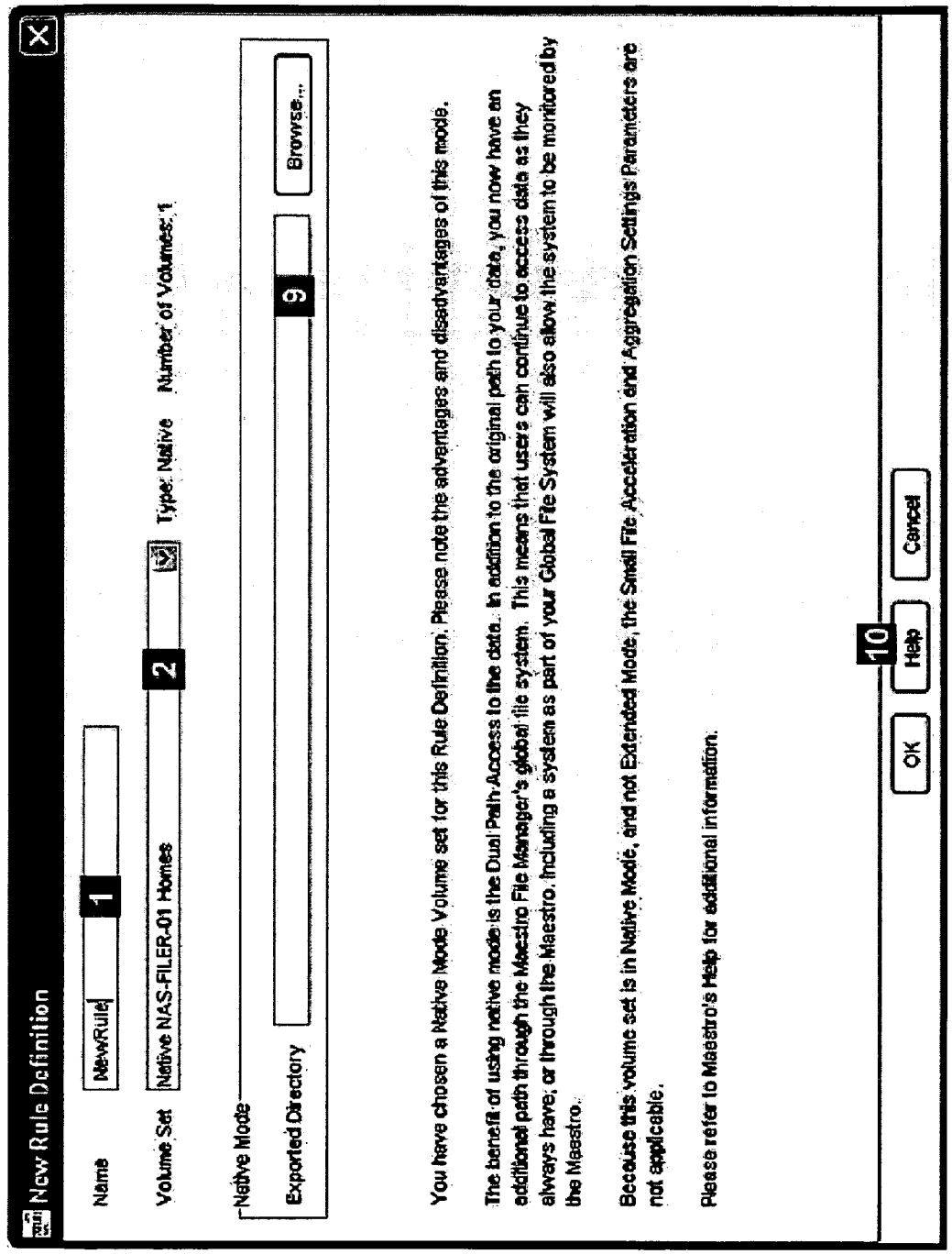
FIG. 14 shows the new rule definition dialog box for native mode volume sets, in accordance with an exemplary embodiment of the present invention.

In FIGS. 13 and 14, field number 1, the user can enter the name of the layout rule to be created.

In FIG. 13 and FIG. 14, field number 2, the user selects from a drop-down menu the name of the storage volume set to which data will be stored that matches the new rule's conditions is selected in this drop-down field. The selection made in this field determines the fields that will be displayed in the remainder of the dialog box.

In FIG. 13, field number 3, the user can use the radio buttons to indicate the type of extended mode rule that is to be created.

In FIG. 13, field number 4, the user can enter the MFS directory (for directory rules) or path and file name (for file rules) to which the rule will apply. The information can either be directly entered, or the user can click the "Browse . . . " button, which invokes a browser in which the user can navigate to and select the desired directory or file. It should be noted that the directory or path/file name must exist in the MFS for extended mode rules. Wildcard characters cannot be used in the field that is adjacent to the "Directory" and "File" radio buttons. If an extended mode file rule is being added, if the MFS directory path and file name including the file's extension is included in this field, the file's extension should not also be included in the "Type (optional)" field, unless the intent is that the rule match against files having that double extension. For example, if myFile.txt is specified in this field, and .txt is specified in the "Type (optional)" field, then the rule will apply only to the file having the name myFile.txt.txt, not myFile.txt.

In FIG. 13, field number 5, the user can select the check-box to cause the extended mode directory rule to recursively apply to the specified directory as well as to all directories under it. The rule will apply only to the specified directory if this check-box is not selected. The check-box will be deactivated if the rule being created is an extended mode file rule.

In FIG. 13, field number 6, the user can specify file extensions that files in the specified path must have in order for the extended mode layout rule to apply. If the field is filled in, the rule will apply only to files that have one of the file extensions included in the field. Extensions should be specified as in the following example: .txt .doc .pdf. If the field is not filled in, extensions are not considered when the rule is applied. It should be noted that if an extended mode file rule is being added, if the MFS directory path and file name including the file's extension is included in the above field, the file's extension should not also be included in this field, unless the intent is that the rule match against files having that double extension. For example, if myFile.txt is specified in the above field, and .txt is specified in this field, then the rule will apply only to the file having the name myFile.txt.txt, not myFile.txt. Also, wildcard characters cannot be used in the "Type (optional) field.

In FIG. 13, field number 7, the user can specify how small files are to be stored. The user can choose to employ small file acceleration, in which files that are smaller than a specified size are cached in metadata rather than the MFS, or choose not to use it, in which case all files to which the rule applies are stored to the MFS. The small file behavior is determined by the following settings:

Enable Small File Acceleration—Small file acceleration is enabled when this check-box is selected. Small file acceleration is disabled when this check-box is not selected.

Use Global Threshold [X KBytes]—If this radio button is selected, the global small file acceleration settings will be used for files to which the rule applies. X shows the current global small file acceleration threshold setting. The global small file acceleration settings are set in the Extended Mode Global Array Settings dialog box.

Set Custom Threshold—If this radio button is selected, files that are smaller than the size that is set in the associated spin-box and drop-down field are cached in metadata rather than the MFS for files to which the rule applies.

In FIG. 13, field number 8, the user can click the "Modify Aggregation . . . " button to invoke the Modify Aggregation dialog box (discussed below), which is used to display and modify the file aggregation settings that are related to the extended mode layout rule being created.

In FIGS. 13 and 14, field number 9, the user can enter the MFS directory under which the native directory structure will be available. The information can either be directly entered, or the user can click the "Browse . . . " button, which invokes a browser in which the user can navigate to and select the desired directory. If the path that is specified in this field does not already exist in the MFS, a message will appear asking if the user wants to create it when the rule is applied. Click the Yes button to create the directory.

In FIGS. 13 and 14, field number 10, the user can click the OK button to create the layout rule and closes the dialog box. Clicking the Cancel button closes the dialog box without making any changes, and clicking the Help button opens a Web browser containing help information on the dialog box.

Figure 15:
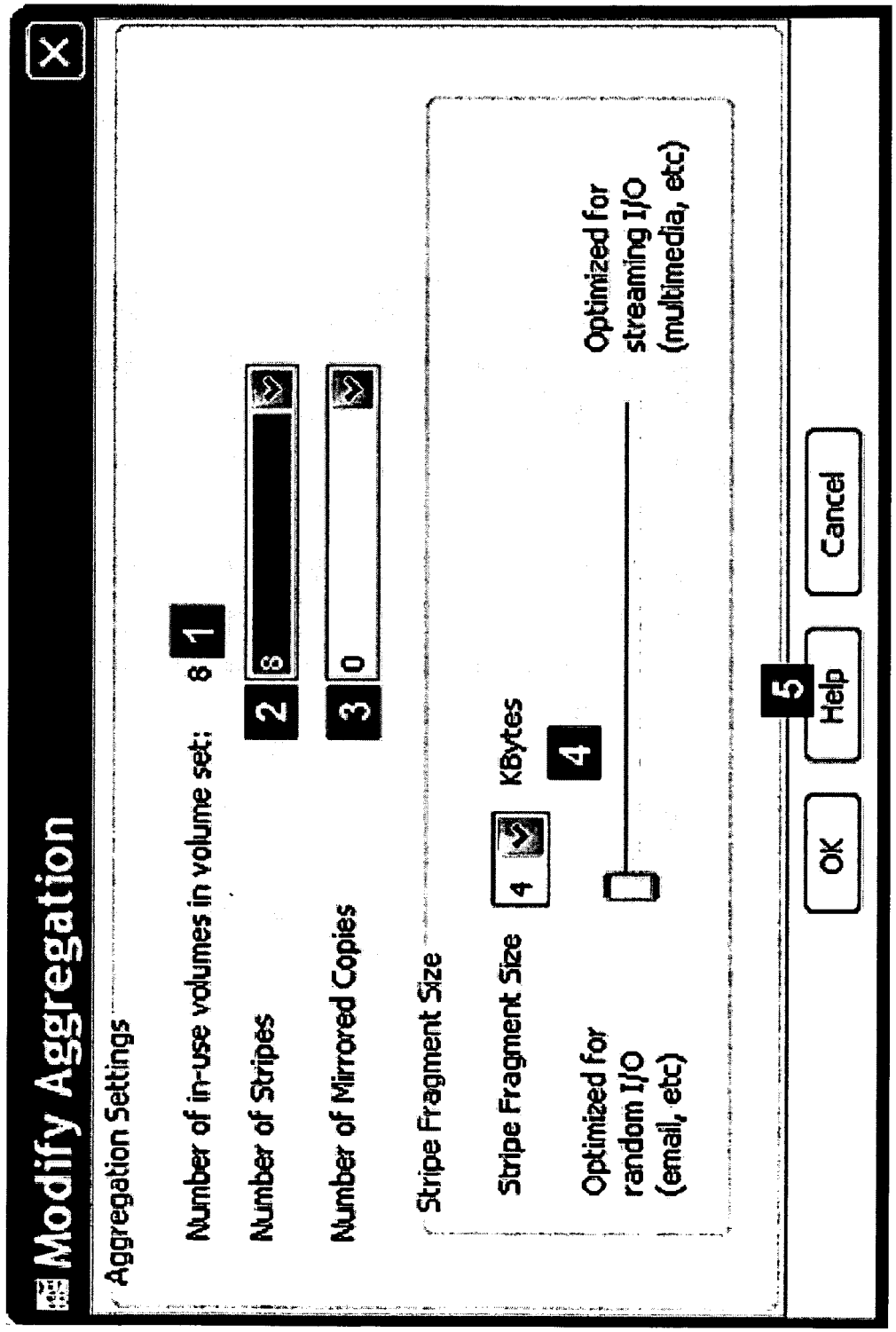
FIG. 15 shows the Modify Aggregation dialog box, in accordance with an exemplary embodiment of the present invention.

FIG. 15 shows the Modify Aggregation dialog box, in accordance with an exemplary embodiment of the present invention. The Modify Aggregation dialog box is a sub-dialog of the New Rule Definition dialog box and Modify Rule Definition dialog box. The Modify Aggregation dialog box is used to set the aggregation settings that determine how data that matches a given rule is stored to the MFS.

In FIG. 15, field number 1 displays the number of storage volumes that is currently joined to the storage volume set that was selected in the New Rule Definition dialog box or Modify Rule Definition dialog box when this dialog box was invoked.

In FIG. 15, field number 2, the user can choose from this drop-down list the number of stripe fragments that will comprise each stripe of data. The range for the number of stripes is 1 to 8. It should be noted that the storage volume set to which the data is to be striped must contain a number of storage volumes at least equal to the value set in the "Number of Mirrored Copies" field plus 1 multiplied by the value set in this field.

IN FIG. 15, field number 3, the user can choose from this drop-down list the number of mirrored copies of data to be created. The range for the number of mirrored copies is 0 to 3. It should be noted that the storage volume set to which the data is to be striped must contain a number of storage volumes at least equal to the value set in the "Number of Stripes" field multiplied by the value set in this field plus 1.

In FIG. 15, field number 4, the user can choose from the drop-down list the stripe fragment size to be used. The possible choices for the Stripe Fragment Size are 4, 8, 16, 32, or 64 Kilobytes. Alternatively, the slider bar can be moved either to the right or to the left to change the stripe fragment size.

IN FIG. 15, field number 5, clicking the OK button accepts the aggregation setting modifications and closes the dialog box. Clicking the Cancel button closes the dialog box without making any changes, and clicking the Help button opens a Web browser containing help information on the dialog box.

In alternative embodiments, rules may be used to specify other data handling and storage criteria, such as, for example, encoding schemes to be applied to files (e.g., data compression and/or encryption). Thus, for example, data compression and/or encryption could be specified on a file-by-file basis using rules (e.g., files of pathname X should be striped by three, with data compression enabled). Data compression may be applied to files that are being archived, are of low priority, or are expected to be accessed infrequently (since compression and decompression are generally considered to be expensive operations that should be performed infrequently if possible). Encryption may be required in certain applications or may be selectively applied to certain types of files.

An NFM administrator may modify, add or delete File Rules over time. The modification or the deletion of a layout File Rule does not automatically imply the reconfiguration of the files whose layout was based on that rule when they were created. Likewise, renaming a file does not imply that the layout associated with the new name is applied. The NFM system preferably makes available utilities that can apply a new layout to files (if different from the one in use).

File Rules tie the set of files and directories they describe to the Volume Sets where they are stored. This implies that certain mutual constraints exist between them. For example, a File Rule that implies striping by 4 can only work if the Volume Set it uses contains at least 4 volumes. If this is not the case when the File Rule is defined, the rule will be rejected as invalid.

It is also possible that when a rule is already set up, a system administrator might want to reduce the cardinality of the Volume Set to which the rule applies, by removing a volume (cardinality is described below). This could take the Volume Set below the striping level the rule requires. In this case, such an operation should be rejected, unless the affected File Rules are edited first.

Note that the reduction of the cardinality of a Volume Set does not occur because a volume member of the Volume Set becomes unavailable. This situation is (hopefully) a transient error situation that requires fixing and does not really reduce the cardinality of the Volume Set, but rather makes one of the Volume Sets unavailable. However, in case the administrator wants to remove a volume from a Volume Set, the system administrator must first modify the affected rules and migrate the fragment files stored in the volume to be removed.

Every time File Rules or Volume Sets are modified, the consistency of the new rule set against the new structure of the Volume Sets is checked. If the check fails, the new configuration is rejected.

3.3. NFM Arrays

The architecture of the NFM is such that if the bandwidth that one NFM device makes available is not sufficient for the expected client load, higher bandwidth in accessing the global name space can be obtained by associating additional NFMs to the system. This is referred to as an NFM array.

These devices operate in parallel and provide exactly the same view of the file system to any of the clients. Thus, an NFM system could include an array of NFMs. This provides a lot of scalability and can also help in supporting High Availability (discussed below).

Since the array must be seen as a single entity from the clients, the NFM preferably makes available a DNS service (Secondary DNS, or SDNS, in the following). This SDNS hooks up into the customer's DNS by becoming responsible for a specific subdomain that pertains to the NFM system. Thus, when the lookup of the name of the NFM array is performed, the main DNS delegates this to the NFM service. This has two main effects:

The NFM DNS can return different IP addresses for each name lookup. This allows the SDNS to distribute the incoming requests across all the members of the NFM array. Even when the system includes a single NFM, the network interfaces of the NFM may not be teamed together. In this case, the SNDS can round-robin the IP address returned by the name lookup across all the individual network interfaces, so that traffic is appropriately load-balanced across all of the NICs.

Since the SDNS is aware of the state of the individual NICs (and host NFMs), it is able to limit the round-robin to just the active units. This effectively provides a certain degree of resiliency to the failure of NICs even in systems that cannot be classified as Highly Available (see below).

3.4. Snapshots

NAS systems often have fairly extensive capabilities. Snapshots are among the most useful capabilities and allow the freezing of a point-in-time view of the file system, so that the frozen view is self-consistent, can be obtained delaying service only for a negligible amount of time, and the use of storage is minimized by sharing all the unmodified data with the live file system.

Snapshots are now standard functionality for most file servers. Inserting the NFM in the data path should not make the snapshot functionality unavailable. For this reason, the NFM architecture is designed to support snapshots.

Supporting system-wide snapshots is not a trivial undertaking. Whereas supporting snapshots on a local file system may be part of the file system design, doing so in a global name space is potentially much more complex. However, the NFM architecture takes care of this by centrally coordinating the triggering as well as the deletion of parallel snapshots across all the Extended Mode Volumes.

Snapshots on Native Mode Volumes can be handled natively by the host server itself and there is no purpose in involving the NFM system on this. This means that a snapshot of the global name space will not contain snapshots of any Native Mode Volumes. However, it is possible to create mount points for snapshots created in Native Mode Volumes. These Mount Points will allow such snapshots to be accessible via the global name space.

However, supporting snapshots on Extended Volume Sets means that:

All of the storage servers in use must support snapshots. If this is not the case, then the global name space snapshots would be incomplete.

Since the NFM architecture supports storage servers based on different hardware/software platforms, global snapshots will be possible across such heterogeneous systems, as long as they provide some level of commonality, such as:

(a) The ability of keeping at least 64 snapshots at a time. This is done so that all the systems involved can keep as many snapshots as Windows 2003 servers.

(b) The ability of executing snapshots on the basis of a "copy-on-write" mechanism. This ensures that snapshot will be virtually instantaneous. If this were not the case, the time needed to take snapshots would be incompatible with the proper continuous operation of the system.

(c) The availability of remote access to APIs capable of:

i. Triggering and deleting snapshots.

ii. Creating and deleting shares and exports that provide access to the snapshots.

It is also important to keep in mind the following:

1. The removal of volumes containing snapshots from the system would cause the deletion of the snapshots that include such volumes.

2. The joining of new volumes that do not support snapshot capabilities will still allow access to the existing snapshots, but will make it impossible to create new ones, as new snapshots would be incomplete.

3. Finally, the joining of new volumes that are snapshot-capable will not have any effect on existing snapshots.

3.5. Backup, Restore and Replication

The NFM provides its own backup/restore facility. It is based on an implementation of the NDMP engine running within the NFM. This implies that standard third party backup/restore applications like the EMC Legato® Net-Worker, VERITAS® NetBackup™ and others can drive backups and restores from NFM systems to other NFM systems or completely different filers and vice versa. As usual, the backup/restore operations are driven by a Data Management Application (DMA) running on a client workstation.

Note that regardless of where the data actually resides, the image of the data being backed up or restored is not affected by the format it takes on Extended Mode Volume Sets.

Also notice that the availability of an NDMP engine in the NFM system implies that such engines are not needed within the storage servers. This may result in a reduction of software licensing costs for the customers.

In addition, the NFM is capable of performing replication between NFM systems. This allows the entire global name space or subsets of the name space to be replicated remotely to other NFM systems. Note that future versions of the facility will be able to perform the streaming to remote NFM systems via compressed and/or encrypted data streams.

All of the capabilities described in this section rely on the distributed snapshot capability described in the previous subsection.

3.6. Management Automation and Performance Monitoring

The NFM system preferably includes a subsystem that supports a number of advanced capabilities to automate management tasks, monitor system performance, and suggest or take special actions to overcome potential problems before they become critical.

Such capabilities are rooted around the following features of the NFM:

- A global name space that groups several tiers of storage in a seamless fashion and allows treating all such storage in a uniform fashion, so that operations on all of these storage tiers can be performed within a unifying framework.
- Files stored in Extended Mode Volume Sets have their pathnames totally decoupled from their physical location. Therefore, it is possible to move the data around without affecting the way clients reference such files.
- In most cases, the NFM acts as an in-band device and is capable of examining access patterns to files and to gather statistics and other meaningful indicators.
- Mechanisms such as File Rules allow attaching attributes to files independently of standard storage protocols.

Not all management automation and performance monitoring capabilities are available for Native Mode Volumes because the last three features are only available for Extended Mode Volume Sets.

The management automation and performance monitoring capabilities are preferably based on events and actions. Events can be triggered by such things as the expiration of time-outs, the reaching of pre-established thresholds in system resources, the detection of abnormal situations, or combinations of such situations. Actions are simply steps to be executed when such events occur; for example, actions can be implemented as executable programs, scripts, or other constructs. Actions may amount to automatic operations (e.g., the automatic addition of a free volume from a storage pool to a given Volume Set) or simply result in appropriate warnings and alerts to system administrators suggesting the undertaking of certain operations (e.g., the addition of an additional NFM, the analysis of a certain subsystem whose performance appears to have degraded, etc.).

Note however, that both event and action lists are essentially open-ended, and can take care of many other circumstances.

In an exemplary embodiment, this subsystem focuses on three application areas, as follows:

1. Capacity management. This allows the system to monitor the amount of free space, to make sure space usage does not go beyond thresholds sets by the system administrator with regard to overall storage capacity, headroom and balanced use of storage. The software may also advise the administrators on such things as when more storage volumes should be added, when certain files and/or directories should be moved to Volume Sets with additional capacity, if or when to change file layout to save storage space, when certain Volume Sets should be rebalanced or whether rebalancing across Volume Set is necessary, and trends in storage consumption.

2. Performance management. This is a very sensitive and extremely important area for system administrators. An NFM system tends to be quite complex since it can span many file servers, networks, switches and so on. Often, the suboptimal behavior of a single component may significantly reduce the overall efficiency and performance of the system. Therefore, the NFM preferably offers the ability to track the overall performance of subsystems and send alerts when their performance starts to be suboptimal. This allows the system administrator to fix the problems well before they become critical. Various thresholds the administrator can set help in defining the conditions that identify potentially troublesome conditions.

3. ILM. In an exemplary embodiment, ILM applications address the need to identify the most frequently used files and largest files and provide the ability of performing migration of files from one storage tier to another automatically or under the administrator's control, etc.

Since the NFM sits in the data path for most operations, it has the ability to gather statistics and observe access patterns to files and directories. This, in addition to the powerful event/action model, constitutes a very powerful platform on which many more ILM facilities can be provided.

3.7. System Setup and Management

The NFM system typically includes a comprehensive System Management user interface n order for configuring and managing the entire NFM system. This supports both a GUI (Graphical User Interface) and a CLI (Command Line Interface). In general, the CLI capabilities are a bit more extensive, in that they support special operations that are expected not to be used frequently, if at all.

In an exemplary embodiment, System Management is written mostly in Java, which allows it to be executed on a multiplicity of different platforms. It operates across entire NFM arrays, in a distributed fashion, and makes available a powerful GUI for the setup of the NFM system and access to the main system functions.

Among other functions, it allows the discovery of servers and storage volumes on a given subnet, the creation of Volume Sets of both types, the addition of volumes to a Volume Set, and the setup or modification of both Global, Layout and Native File Rules.

The System Management components are preferably architected to provide a good degree of layering. This would facilitate use of the UI in its standard version by OEMs and would allow for the integration of the System Management functions into existing UIs, by having the OEM's existing UI make use of one of the underlying System Management layers.

3.8. Performance and Scalability

Performance is an important consideration for NFM systems. Despite the fact that NFM nodes may reside within the data path (either physically or logically), there are ways in which good performance can be achieved. Apart from scalability, which was discussed above, additional considerations include throughput and latency. These are discussed below.

The topic of performance is very critical for a system that is capable of exploiting parallel I/O to multiple storage servers, in order to guarantee both high overall system throughput and high performance for individual clients.

Performance is strongly tied to scalability in an NFM system because, not only should the performance in smaller configurations be good, but also performance should continue to scale with increasing numbers of clients, volumes and files. Scalability is also important with respect to the storage capacity that an NFM system can reach.

The following subsections look at the metrics through which performance can be characterized and to the results achievable both at a system level and for the individual client application.

3.8.1. Latency

Latency is particularly important for the subjective perception of the end user, for the proper operation of some applications, and somewhat less for overall system performance.

All I/O through the NFM could potentially increase the latency perceived by a client, compared to a direct connection. However, the NFM can be designed to reduce or eliminate problems in this area, as follows:

When not using write-through mode (which is typically only used by applications that need to do some form of checkpointing and is not expected to represent a primary area of deployment for the NFM), write requests can be cached and acknowledged immediately to the clients. In this way, client writes would exhibit latency that is substantially the same as latency achievable with direct connections to storage servers.

Parallel I/O, aggressive caching, data pre-fetching, and other well known techniques can be used to decrease latency for large reads. Also, per-file mirroring can be used to improve latency by allowing the load balancing of reads across the available mirrors.

Since latency may have a major impact on the I/O performance perceived in accessing small files, and this latency may be critical for some clients, small files (e.g., 32 Kbytes or less—this threshold could be a configurable parameter of the NFM) may be stored in the metadata file rather than in the file system. Specifically, because of the way the AFS works, a file open on behalf of a client involves opening the metadata file that represents the client file in the file system hierarchy, extracting the information that describes the locations of the streams composing the file, and opening the streams to allow subsequent access the data. For relatively large files, the time to perform the multiple opens may be negligible compared to the I/O time, but this may not be so for small files. Therefore, if the file length is below a certain threshold, the actual data may be embedded within the relevant metadata file, e.g, appended after the metadata information. Among other things, this would tend to reduce the time needed to access small files, as only the metadata file needs to be opened, and so it avoids the indirection between a metadata file and the file fragments it points to. Also, since the AFS (the Storage Virtualization Service) needs to access the content of the metadata file, it can fetch the data appended to the metadata in the same read operation and cache the data before a client-requested read or a write comes in, further reducing latency. Storage of small files is discussed in greater detail below.

3.8.2. Throughput

There are essentially two dimensions of relevance to throughput, namely throughput achievable by the individual client and overall system-wide throughput.

Throughput for the individual client is generally limited by the ability of the client to generate requests. The NFM should be capable of satisfying the needs clients have in this respect.

With respect to overall system throughput, it should be possible to saturate the network pipes in an NFM and to avoid bottlenecks that may make it impossible for the system to scale. This mainly relates to scalability, as discussed below.

3.8.3. Scalability

In an NFM system, scalability should be supported in all the basic services that the system carries out.

Scalability of the Storage Service may be provided by increasing the number of storage servers and volumes available to store data. Increasing the number of volumes allows the system to scale both in terms of capacity and performance, whereas increasing the number of storage servers has useful impact on performance.

Just increasing volumes, without increasing the storage servers, may not be sufficient to increase performance in some situations, particularly when the storage servers themselves experience such a high load that they cannot serve more requests.

In a system that balances the number of storage servers with that of volumes, overall throughput can be considerably improved by striping files across multiple volumes. This is especially true when the volumes are hosted within separate storage servers.

However, whereas the addition of Native Mode Volumes increases the overall throughput without increasing the performance perceived by the individual client, the addition of new Extended Mode Volumes, especially if belonging to separate servers, may have a very positive effect even on the performance perceived by the individual client.

Scalability of the Storage Virtualization Service addresses mainly the performance dimension, as capacity issues are generally confined to the Storage Service and to the Metadata Service. One challenge to performance can arise when a single NFM provides insufficient throughput. Therefore, the system preferably allows additional NFMs to be added in parallel when a single unit no longer provides adequate bandwidth. These units offer the same view of the global file system and they generally need to interact only to carry out certain administrative functions, whereas, during normal operations (i.e., those that are performance-critical), they should only interact with the MDS and with the storage servers but not among themselves. So, as long as the MDS architecture is scalable, they should work completely in parallel and performance should scale linearly with the number of units deployed.

Scalability of the MDS is desirable as well because, among other things, the MDS can have a major impact on the scalability of the Storage Virtualization Service. Reliance on a single metadata server may be acceptable as long as the single metadata server is not the bottleneck for the whole system, the single metadata server is capable of supporting the amount of storage needed for the system, and use of a single metadata server is compatible with the availability required for the product in certain environments, as the MDS could be a single point of failure. If one or more of these conditions are not met, then a single metadata server may be inadequate.

In order to address situations in which one or more of these conditions are not met, an exemplary embodiment allows the MDS to be partitioned. Generally speaking, partitioning the MDS across multiple metadata servers increases complexity. The MDS partitioning scheme could rely on a Distributed Lock Manager (DLM), but the resulting complexity would likely be very high because a DLM is generally hard to design, develop and debug. Besides, there are two characteristics that are difficult to achieve at the same time: performance and correctness. Finally, recovery after crashes becomes very complex and time-consuming. Therefore, in an exemplary embodiment, the MDS can be distributed across multiple servers through a dynamic partitioning scheme that avoids the above limitations and achieves high performance. MDS partitioning is described in greater detail below.

3.9. Resiliency, High Availability and Crash Recovery

The NFM system should ensure that user data cannot be corrupted or lost. This is particularly true when considering that an NFM device may sit in front of a large portion of a customer's data, so the safety and integrity of the data should be provided. For some customers, availability is just as important. These issues are discussed in this section.

Generally speaking, resiliency is the ability of the system to prevent data loss, even in the case of major hardware failures, (as long as the failure does not involve multiple system components). Resiliency does not imply that the data should continue to be available in the case of a crash. Rather, it implies the need to make access to the data possible after the defective component is repaired or replaced, making sure the system reflects the state of all committed transactions. Note that redundancy is generally a pre-requisite for resiliency, i.e., some system information must be stored in such a way that, even if some data should become unavailable, that particular data can be reconstructed through the redundancy of the available information.

Generally speaking, High Availability (HA) is the ability a system has to withstand failures, limiting the unavailability of some function to predefined (and bounded) amounts of time. HA is different from Fault Tolerance. Whereas Fault Tolerance (often fully realized only with major hardware redundancy) implies that interruption of the service is not possible and is never perceived by the applications, HA only guarantees that the interruption of service is limited but does not guarantee that the interruption remains invisible to the applications. In practice for a storage system, this means that the probability the stored data is available in the case of a single failure and taking into account the mean time required for the hardware to be repaired or replaced is very high. HA also depends on redundancy both with respect to the hardware configuration itself, as well as with respect to the way the data is stored.

Crash Recovery relates to the ability of a system to promptly restore operation after the crash of a critical component.

3.9.1. Storage Service

The Storage Service should be resilient with respect to the data it stores. For example, the drives that store the data should provide some intrinsic degree of redundancy (RAID-1, RAID-5, . . . ), so that the loss of one individual drive would not cause the data in given volume to be lost.

In the absence of adequate resiliency of the storage servers, although integrity of the system information and the system data structures that implement the global file system generally can be ensured, the user data may not be protected in the same way. However the per-file redundancy made selectively possible by the NFM (e.g., through File Rules) may provide additional protection for the most valuable data even in this case.

In an exemplary embodiment, the Storage Service is not intrinsically HA-ready, as it may largely depend on the equipment and setups the customer is willing to integrate into the NFM system. However, when HA configurations are needed, it would be highly desirable to deploy storage servers with the following characteristics:

The actual data repositories, rather than being integrated within the servers themselves in the form of DAS, should be shared repositories (i.e., they should be accessible to multiple servers, although just one server should own the repository or portions of it at any one time). Examples of such repositories are LUNs in a SAN or accessible via shared enclosures, like SCSI storage racks.

The servers that are able to access the same data repositories should be clustered together in a shared-nothing fashion. This would allow a crashed member of the cluster to fail over to another member without losing access to the data the failed member was managing.

A storage server having just one of the above characteristics generally would not fully satisfy the HA requirement for the user data. If the first attribute is missing, even in the case of a failover, the server taking over would be unable to access the storage the failed server managed. If the second attribute is missing, even if the data managed by the failed server were still be available via shared storage, no automatic failover would occur and the data would remain unavailable.

In any case, the above is not always possible or convenient. When this is the case, the High Availability of the system is limited to the system (including the global name space) and to the content of those data files that are laid out in a redundant fashion. The rest of the user data generally only has resilient behavior.

3.9.2. Storage Virtualization Service

In an exemplary embodiment, with respect to the Storage Virtualization Service, the resiliency only applies to the configuration data because the Storage Virtualization Service components do not store persistent state. The MDS stores this persistent information. Therefore, the resiliency of the configuration data depends in large part on the resiliency of the MDS.

HA presents a slightly different twist. In this case, HA for the clients means being able to resume service in a quasi-transparent fashion in case of a crash. This is preferably obtained by deploying clustered NFM devices in an Active/Active configuration. This means that in case one of the clustered NFMs fails, another member of the cluster takes over, presenting the same interface to the external world, including the IP addresses. This implies that on a failover event, the IP addresses assigned to the failed unit will be migrated by the cluster infrastructure to the unit taking over, so that this will be largely transparent to clients.

3.9.3. Metadata Service

In an exemplary embodiment, resiliency of the MDS is made possible by the way the metadata is stored. Even in non-HA configurations, metadata is preferably stored in a redundant fashion by making use of storage arrays configured as RAID-5 volumes.

For HA, the metadata servers store their metadata within LUNs made available by either dedicated storage enclosures that are themselves fully HA or by existing SANs. In addition, the service runs on clustered units operating in Active/Active fashion. The fact that the metadata repository is shared across the clustered units, coupled with the fact that the units themselves are clustered guarantees the possibility that if a unit hosting a metadata server crashes, another cluster member will promptly take over its functions.

Besides dedicated Fibre Channel enclosures, the metadata servers can also make use of existing SANs. The NFM system may also support iSCSI metadata repositories as well.

3.9.4. Crash Recovery

In some architectures, crashes involving very large file systems may become extremely critical because of the complexity and the time required for a full integrity scan of the entire file system. In an exemplary embodiment, the NFM global file system infrastructure provides prompt crash recovery. The system preferably keeps track (on stable storage) of all the files being actively modified at any point in time. In the unlikely event of a crash, the list of such files is available and the integrity checks can be performed in a targeted way. This makes crash recovery fast and safe. Crash recovery is discussed in greater detail below.

4. NFM Summary

The NFM addresses a whole new category of functionality that couples file virtualization with the ability of pooling storage resources, thus simplifying system management tasks.

In an exemplary embodiment, the NFM is:

Capable of selectively operating as an in-band or an out-band device, in order to provide the most efficient access to the storage resources.

Implementing a global name space across multiple heterogeneous file servers.

Making use of standard storage protocols without requiring special software components to be installed and run on clients or on servers.

Allowing the use of file servers, NAS devices or NAS-to-SAN gateways as intelligent data repositories.

Minimizing or completely avoiding any disruption to clients when the Attune™ NFM is deployed as a front end to existing file servers.

Scaling performance, as needed without being artificially constrained by bottlenecks introduced by the NFM.

Supporting High Availability and resiliency in both the services offered and in the stored data.

Creating a platform capable of extensive capacity and performance monitoring, as well as reporting, plus support for ILM.

Allowing the integration of existing servers in the namespace without imposing special formats, nor requiring the running of special agents in the servers while providing those existing services with a subset of the benefits available to servers operating in Extended Mode.

Providing a single locus of control to support management of the global name space and of the storage behind it.

Providing centralized facilities that allow dumps, restores and remote replications of the entire global name space or of portions of it in full or in incremental fashion via an industry-standard NDMP engine.

Providing extensive new capabilities in Extended Mode, such as:

Decoupling pathnames form the actual location where data is stored and allowing the transparent migration of data without altering pathnames.

Supporting the configuration of different storage tiers.

Allowing the dynamic growth of storage pools, without the need of performing expensive reconfigurations or reformatting.

Performing striping of files across file servers to optimize the parallelism of I/O across multiple filers, much as RAID does across disk drives.

Providing rules that allow one to specify the layout and the desired redundancy at the file level, thus avoiding wasting redundant storage for unimportant data.

Balancing free space across the members of storage pools.

Load balancing the backend filers.

Because of all these benefits, the Maestro File Manager™ offers a completely new solution that enhances the capabilities of existing file servers in terms of great benefits for the end users as well as for system administrators.

5. File-Based Raid-5 for the NFM

5.1 Introduction

There are two aspects to data redundancy: one has to do with the fact that data should be redundant in such a way that even in the case of a failure it would not be permanently lost; this is normally accomplished by making use of storage redundancy in the form of RAID-1 (mirroring) or RAID-5 (striping). The other aspect relates to having this data always accessible (or accessible with a minimal amount of downtime); this is normally obtained through the use of High-Availability clustering.

Mirroring imposes a significant penalty in the use of storage, since it effectively reduces by at least half (and perhaps more than half if multi-way mirroring is used) the amount of storage available. Generally speaking, file-level mirroring cannot be simply replaced by using RAID-5 in the storage volumes, because this scheme provides redundancy among the disks of a single NAS device, yet it is incapable of coping with the failure of an entire NAS unit.

A better scheme is one in which the storage servers that provide access to the storage volumes members of some Extended Mode Volume Set are in fact NAS gateways and make use of a SAN as their storage component. If such servers are clustered together and the SAN storage makes use of RAID-5, then the clustering would satisfy the availability constraint, in that another cluster member could take over when any other cluster member fails. It would also satisfy the redundancy of the storage. However, this solution, which is cost- and storage-efficient, can only be implemented on higher-end configurations and would work globally on the entire set of user files, rather than on a per-file basis.

Therefore, in exemplary embodiments of the present invention, RAID-5 may be applied at a file-level rather than at a volume level, as in standard RAID-5 schemes (reference [1]). File-level RAID-5 is meant to be selectively applied to the files. The design should provide for minimal performance impact during normal I/O and should provide storage efficiency consistent with RAID-5 as opposed to mirroring.

5.2 Issues with RAID-5

Generally speaking, a RAID-5 (reference [1]) set is the aggregation of N disk drives (which may be physical disk drives or logical volumes, e.g., obtained by aggregating physical volumes or LUNs in a SAN) that have the same characteristics in terms of performance and capacity and that can operate in parallel, wherein N is at least three. A RAID-5 set is made of the concatenation of equally-sized "stripes". Each stripe is itself made of N−1 equally-sized "data stripe fragments" and one "parity fragment" of the same size. These N fragments are equally distributed across the various drives. The drive that does not store a data stripe fragment stores the parity fragment for the entire stripe, which has the same length as any other data stripe fragment. In RAID-5, the parity is equally distributed across all the drives, to balance the load across the drives. Calling $F_i$ the i-th data stripe fragment and P the parity fragment, the latter is computed as the exclusive-or of the content of all the data stripe fragments, as follows:

$$P = F_1 \oplus F_2 \oplus \ldots \oplus F_{N-1}$$

A read of an entire stripe is performed by executing N−1 data stripe fragment reads, in parallel from N−1 drives. If a single data stripe fragment is to be read, this can be done directly.

In the presence of the failure of one drive in a RAID-5 set, the parity allows reconstruction of the missing information. For example, assuming the i-th drive fails, the content of data stripe fragment $F_i$ can be reconstructed as follows:

$$F_i = P \oplus F_1 \oplus \ldots \oplus F_{i-1} \oplus F_{i+1} \oplus \ldots \oplus F_{N-1}$$

This also applies to reconstructing the parity from all the good data stripe fragments if the inaccessible fragment is the parity fragment. Obviously, this is more expensive than reading a single stripe fragment, as N−1 reads become necessary to reconstruct the missing information, instead of one. This impacts performance, but still allows the information to be available. So the failure of one drive causes only a reduction in performance when the missing drive should be accessed. This stage (when a drive has failed and has not been replaced yet) is critical in that unless the failed drive is replaced, a second drive failing would make the stripe fragments on the failed drives completely inaccessible. Therefore, RAID-5 enclosures normally have provisions for extra drives that are pulled into the RAID-5 set automatically when another drive fails. Note that as the new drive is started, its content must be reconstructed as discussed above. So, the degraded performance continues on all the stripe fragments that follow the stripe fragment being reconstructed.

For writes, things are a bit different and more expensive. Any write requires the update of the parity. If the write of an entire stripe is needed, then the parity needs to be computed and then all the stripe fragments and the parity are written in parallel. Note, however, that the write is completed only when all stripe fragments and the parity are written out. The actual cost of a RAID-5 write with respect to the normal write of as much data in a non-RAID-5 fashion is equal to N writes versus N−1 writes. So the increment in I/O in percentage is 1/(N−1). When just a subset of the stripe needs to be written, the parity must be updated as well. So, in the typical case of the write of a single stripe fragment, it is necessary to:

(a) Read the current stripe fragment.
(b) Read the current parity.
(c) Perform the exclusive-or between the current parity and the current stripe fragment.
(d) Modify the stripe fragment,
(e) Compute the new parity from the exclusive-or computed in step c and the new stripe fragment data.
(f) Write the new stripe fragment.
(g) Write the new parity.

So, whereas for a non RAID-5 write, simply one read and one write would suffice, in the case of RAID-5, the number of I/O operations needed is: 1 (step a)+1 (step b)+1 (step f)+1 (step g)=4 versus 2, with a 100% increment.

To obviate or reduce this impact, slightly different designs can be used (see reference [2], for example), and they may or may not be combined with the use of NVRAM. One issue to address here is that of minimizing the number of parity writes needed, while preventing the RAID-5 array from containing invalid parity. In one possible solution, the parity could be cached in a write-back cache and the number of parity writes would become a fraction of the number actually needed. However, if NVRAM is used, even in case of crashes that make it impossible to update the parity, the parity would be retained within the NVRAM and would be still available after the crash to restore the integrity of the RAID-5 array before the RAID-5 volume is brought back on line.

In embodiments lacking appropriate NVRAM, the absence of NVRAM makes it hard to smooth the additional impact of writes. Note that the kind of NVRAM that would be needed to support this should be such that access from other NFMs that are members of the same array should be possible to the NVRAM of crashed NFMs, so as to avoid the case in which the failure or crash of a single NFM might compromise the integrity of the file for all the NFMs.

Another issue is that, in the case of an NFM array, it should be possible to control NVRAM caching so that a single valid copy of the parity per stripe per file should exist throughout the array. Apart from the inherent complexity of this, an even more troublesome problem is the fact that proper handling of this would require communication among all the NFMs. The amount of communication becomes combinatorial with the number of NFMs in the array and would negatively impact scalability of the NFM.

Another issue is that, in the NFM architecture, since a parity fragment and data fragments are typically stored within separate files on different servers, a per-file RAID-5 implementation would create a temporal window between the time a data fragment is on disk and the time the relevant parity fragment is on disk, within which the redundancy for the entire stripe of the user file may be temporarily lost, in the absence of a failure. Here, a single failure could make the stripe unavailable.

The above considerations clearly indicate that use of a standard RAID-5 algorithm for file-based RAID-5 support in the NFM architecture would have major impact on NFM performance.

5.3 Combined Mirroring and RAID-5

One solution, which does not require synchronized parity caches and eliminates the temporal window in which redundancy is lost, uses a mirror volume as a cache for files being modified and, when the files are no longer being updated (e.g., after a suitable amount of time that would support a hysteretic behavior), migrating the files asynchronously to more efficient RAID-5 volume. One example is the AutoRAID design (see reference [3]) developed within Hewlett-Packard and made available as a commercial hardware product. Such solutions attempt to combine mirroring, which is more efficient than RAID-5 for writing (i.e., because it minimizes the I/O compared to RAID-5 and is quite efficient even for rather small writes), and RAID-5, which is more efficient than mirroring for longer term storage. It should be noted that redundancy is always present in both formats and that the migration to the RAID-5 store is just a copy, since it is the configuration of the volume that causes the appropriate format to be used.

5.4 File-Level RAID-5 for the NFM

In exemplary embodiments of the present invention, the RAID-5 configuration can be applied selectively on a file-by-file basis in a software-based implementation. In these embodiments, there will not be a mirrored volume used as a cache and another one that makes use of RAID-5, although the RAID-5 files will be initially mirrored individually and then transformed into RAID-5 files when they exit the "working set" (i.e., the set of files being actively accessed within a given timeframe; the expression "working set" is borrowed from Virtual Memory terminology). The RAID-5 attribute will be selectable according to the Z-rules. A RAID-5 metadata file will contain the information needed to set up the file in the initial mirrored format and then to migrate it to the RAID-5 format.

More specifically, a new RAID-5 file is created in its mirrored format. After the file is closed and has moved out of the working set, the file is modified to the RAID-5 format. This conversion could be done by an appropriate daemon in charge of this task (referred to herein as the "Consolidator"). This daemon would operate on the basis of time-outs that would allow enumerating the files that are and those that are no longer part of the working set. It would also be triggered when the amount of storage devoted to the mirrored files would exceed a certain configurable threshold.

When a RAID-5 file in its final format is opened for reading, there is no need to modify its format in any way. Reads can in fact proceed at full speed directly from the RAID-5 stripes.

In case a stream containing a set of stripe fragments becomes unavailable, the parity will be read in, in order for the missing stripe fragments to be reconstructed. In such conditions, the system should reconstruct the missing information as soon as it detects its absence.

When a RAID-5 file in its final format is opened for writing, nothing needs to change until the time of the first write. At that point, the original stripe or stripe fragment affected is fetched and the content of the appropriate stripe fragment(s) is modified and is then stored in the mirrored format. A special data structure (preferably a bit map, but alternatively a run-list or other data structure) is used to keep track of the file streams that are in the mirrored format (a run-list may be more compact, but checking where the latest copy of a stripe fragment is stored would not be handled as easily as indexing into a bitmap). The data structure could be stored within an NTFS stream with an appropriate name (which would allow the bitmap to be extended as needed without affecting the file offset of any other information in the metadata files) or could be stored as a completely separate file (much like a fragment file), which could simplify the design if the data structure is stored on a resilient volume (which could be a storage volume or a metadata volume; the metadata volume might be simpler but would tend to increase the traffic, the load, and the use of the metadata server, although use of partitioned metadata would likely eliminate most of these concerns). Note that it is not practical to simply replace the RAID-5 stripe/stripe fragment with the new content because, to retain the appropriate invariants, it would be also necessary to update and write out the parity, which is the main issue that these embodiments are trying to avoid.

It is important to understand that there is a predefined sequence in which the updates should occur, as follows:
1) The two mirrored data stripe fragments are written in parallel to the appropriate storage servers.
2) The portion of the bit map (or other data structure) that stores the bit representing the updated data stripe fragment or otherwise identifies such data stripe fragment is written out to the metadata server only after the mirrored data stripe fragment is on disk on both storage servers.

This ensures that the relevant bit in the bitmap is flipped to "mirrored" only when the mirrored data is indeed available. So the mirrored data is valid only after the bitmap is updated.

The acknowledgement to the client need not wait until the data and the bitmap are written to disk if the client's write is performed in write-back mode. This is generally only required when the write-through mode is chosen (which is expected to occur relatively infrequently, in practice).

As a consequence of the above, it is not strictly true that a RAID-5 file would either be in its mirrored or in its final format: a file that was already in its RAID-5 format and has been updated may have some stripes or stripe fragments stored in the mirrored fashion. Therefore:

a. When such a hybrid file exits the working set, it has to be processed by the Consolidator, which would selectively copy the mirrored stripes or stripe fragments to the RAID-5 format, would reset the appropriate bitmap entries, and would delete the mirror fragments (in that order).
b. Obviously, reads on a file with such a hybrid format should take the bitmap in consideration, in order to decide whether the most recent data to be read resides in the mirrored or in the RAID-5 stripe fragments and should act accordingly. Note that when a certain stripe/stripe fragment is mirrored, it takes precedence over its RAID-5 counterpart, since it is necessarily more recent.

The actual format of the metadata for files of this nature could implement some optimizations. For example, a RAID-5 file could always be mirrored by two, for its mirrored stripes/stripe fragments. Also the striping scheme for the RAID-5 could be exactly replicated for its mirrored components. In this embodiment, since the mirrored version has no need for the parity, the number of stripe fragments in a stripe would be lower than that of the RAID-5 variant, exactly by one.

The selective recovery scheme the NFM uses in case of crashes is based on update lists that identify all the files undergoing updates at any given time. So, the rebuild of the parity for RAID-5 files (or the restoration of the consistency between the mirror copies of mirrored data stripe fragments) after a crash can be performed for the files that are in the update list at the time of the system recovery.

Overall, this scheme is expected to provide the needed benefits at the cost of additional complexity in the AFS to manage the transition between formats.

6. Metadata Service 6.1. The MDS Functionality

The MDS functionality is discussed in this section. Unless the context relates to implementations based on multiple metadata servers, the term "the metadata service" will refer to the functionality, rather than to the specific server incarnation that supports this functionality. It should be noted that systems that need to meet performance and high availability goals will generally employ multiple metadata servers and multiple storage servers.

The following are some of the criteria that can impact design and implementation of the MDS:
1. The MDS should be scalable
2. The MDS architecture should be suited to environments where small files prevail.
3. The MDS architecture should take into account its effect on cost and availability.
4. The MDS should provide efficient and resilient metadata operations.

6.1.1. Scaling the Metadata Server Function

An architecture that relies on a single metadata server provides the obvious benefit of simplicity. As long as it does not create bottlenecks, the scheme should be acceptable and is likely the most effective way to avoid any partitioning issues among multiple metadata servers, which could lead to metadata hot spots. Note however that hot spots in a metadata server are in general a great deal less likely to be a major problem than hot spots in storage servers. In the NFM, the latter is typically addressed by load balancing among the storage servers.

When the metadata server becomes the bottleneck (which is more likely to be the case where small files are a significant portion of the working set, especially if access to small files is sped up as discussed in the section entitled "Metadata and Small Files" below), however, the practical solution involves support for multiple metadata servers.

One way to support multiple metadata servers is to support a pool of servers that coordinate their operation through the use of a well-designed Distributed Lock Manager (DLM). A scheme that relies on a DLM is in principle very flexible, but very complex. Based on multiple experiences of this nature (see reference [7], for example), the time needed to design, implement, debug and turn it into a stable, robust, well performing product could be substantial (e.g., on the order of years).

Another way to support multiple metadata servers is to utilize a scheme that partitions the metadata across the metadata server. On the surface, this solution is simpler than the DLM solution. Multiple ways to do this exist, although most cannot provide a simple partitioning of the namespace hierarchy that also guarantees good balancing among the metadata servers and that will not break down when a file or directory is renamed. Hashing schemes that could potentially achieve the best load balancing properties are disrupted when pathname renaming enters the picture.

Therefore, in an exemplary embodiment of the present invention, multiple metadata servers each offer a view of a portion of the global file system tree. This can be done, for example, by having an appropriate metadata entity (i.e., "mount entry", or ME) placed within the namespace hierarchy where a cross-over to a separate portion of the namespace hosted within a different metadata server is needed. As the NFM encounters such an ME during a pathname lookup, the NFM recognizes the ME as being a reference to a directory handled by another server and switches to the appropriate server. This is somewhat similar to the way separate file systems are "mounted" within a single root file system on a Unix system.

In theory, attempts to perform backwards traversals of the server boundary implemented this way (e.g., through the ".." pathname components) should be detected by the NFM and should cause it to go back to the original server, similar to how Unix mount points are handled, when moving from a file system to the one that contains the directory on which its root node is mounted. In embodiments of the present invention, however, the AFS does not need such backwards transversals since internally the AFS deals with files and directories in terms of absolute, rather than relative pathnames.

The solution described above can be applied particularly well to the handling of NFS requests (where pathname translations are performed via incremental lookups) but may not be as applicable to CIFS pathname translation, which is normally carried out with a coarser granularity (i.e., using pathnames made of multiple components). If such CIFS requests had to be broken down, e.g., by having the NFM carry out incremental lookups, performance could be heavily affected. Therefore, a valid solution to this should satisfy the following principles:
1. It should be efficient, i.e., it should not cause multiple interactions with the metadata servers.
2. It should be able to cope with both NFS-style incremental lookups and with coarser granularity CIFS-style lookup.
3. The mapping to the appropriate server should be stable, meaning that it should not be affected by changes to any of the previous components in a pathname, nor as the result of the addition of metadata servers (unless explicit directory relocation is performed).
4. The scheme should be capable of allowing the contents of a directory to be listed.

An exemplary embodiment addresses the above principles as follows:
Creating a single file system hierarchy, starting with a root metadata server and branching out to secondary servers through MEs.
Handling the incremental NFS-style lookups by simply taking care of the mount entries and of the switching from one metadata server to another one.
Creating a cache within the NFM (the ME Cache or MEC) that would essentially capture the mount entries and would allow incoming file/directory references to be matched against the MEs they should make use of, so that the actual requests could be entirely handled within the appropriate metadata server. This cache should be properly updated as new mount entries are added or deleted, and the cost of a lookup should be marginal with respect to the time it takes to open a metadata file. This cache should also be the one that handles CIFS-style lookups.

In such embodiments, it would also be useful to partition the entire file system hierarchy automatically, so that there would be no need to have human intervention (unless desired). On the other hand, it must be always possible to override the automatic splitting or the choice of the server for a given subtree so as to ensure that specific knowledge can always be exploited in the best possible way. Thus, the algorithm for splitting the file system hierarchy across two metadata servers should make use of a pseudo-randomizing component, in order to split the load across metadata servers as much as possible.

Regardless of how well such an algorithm is devised and also because of possibly changing access patterns, it would be highly desirable to provide the ability to migrate subtrees as necessary to enhance performance. This should be possible either automatically or through the intervention of a system administrator. In fact, the automatic migration facility could be bundled in a performance package that monitors the access patterns, creates reports and performs the migration and could be supplied as an add-on component charged separately.

It should be noted that the ability to partition the file system hierarchy on various servers at "mount points" does not imply the need to do so. For example, the default configuration can still rely on a single metadata server, unless other criteria advise otherwise.

The use of multiple metadata servers may be particularly appropriate in configurations where higher load is expected and higher availability is sought. Such configurations are typically based on clustering technologies. In this context, individual metadata volumes will be managed by Virtual Servers (VS, in the following), one or more of which can be hosted on each of the available physical metadata servers. By using the concept of VS's, availability can be enhanced and metadata hot spots can be reduced by migrating the VS's that handle the most frequently accessed volumes to physical nodes with lower load.

In an exemplary embodiment, the aggregation of multiple metadata volumes into a single file system hierarchy is done via the MEs. These are metadata files that resemble symbolic links, sit in a directory, and act as a reference to the root of another volume. The reference may be in the form of an IP address or name for the VS that will be responsible for the management of the volume and a Volume ID that should be unique across the entire system. When an ME is traversed in the global file system hierarchy, the NFM sends requests for operations on pathnames below that ME to the server that owns that volume. In the case in which there are no MEs, the file system hierarchy is generally contained within a volume. When an ME references a volume, the name of the ME effectively replaces that of the root of the client-visible portion of the referenced volume, which is similar to the way in which the root directory of a mounted file system is addressed by the name of the directory on which it is mounted in a Unix file system.

A volume can contain multiple MEs that link it to other volumes. On the other hand, only one ME references a given volume, i.e., an ME maps the root of the target volume into the host volume and no other ME can reference the same target volume. This means that the total number of MEs that must be handled is equal to the number of metadata volumes.

To take full advantage of this scheme, it makes sense to structure the storage devoted to the metadata servers as a pool of metadata volumes. By doing this, it is fairly easy to avoid metadata hot spots by letting appropriate components of the metadata management machinery to do the following:

1. Identifying individual sets of FSOs which are most frequently accessed.
2. Migrating some of them to other volumes (which typically entails copying the file system tree(s) being migrated to a new volume, which could be performed as an administrative function when the client load is null, since performing such tasks on a live file system may either require client traffic to be block or require replication mechanisms to be implemented). The migration operation typically involves the creation of the directory hierarchy and the copy of a number of relatively small metadata files (some of which may also contain user data, if they are in the HMF state, as discussed herein).
3. Transparently fixing the references via MEs It is desirable that the overall number of metadata volumes be relatively small. There are somewhat conflicting concerns here, related to the number of volumes, to their size and to the number of volumes managed by each VS. Smaller volumes per VS imply:

Finer granularity in distributing the load across physical servers, which is generally desirable.

More bookkeeping, more volume traversals (i.e., switching from one server to another one), and an increase in the amount of caching needed for MEs, which is less desirable, but should have a limited impact.

So, metadata volumes should be smaller, yet their proliferation should be bounded, to avoid negative side effects. A practical bound to the number of metadata volumes (and MEs) could be in the neighborhood of 1024 in an exemplary embodiment.

Each time an ME is created or removed, this has impact on the volume of the parent directory where the new ME is created/removed (referencing volume) and on the volume to which the ME points (referenced volume). Within the referencing volume, an appropriate metadata file is created within/ removed from its parent directory. Such a metadata file is a place holder that points to the target volume. Also a metadata file that lists all the MEs in the volume (the "MElist") is updated (see The ME Cache Manager, below).

Within the referenced volume's root directory, a special type of metadata file (referred to herein as the "MErevmapper") may be used to provide the reverse mapping of the referencing ME, e.g., to ease recovery in case of crashes. Such a file would identify the pathname of the ME referencing the volume and is created when the ME is created. It should be noted that the MErevmapper may be considered optional because the MElist is really the ultimate reference in deciding which MEs should exist and what they should reference. Therefore, automatic recovery from crashes will generally make use of the MElists to reconnect the volumes as necessary, but the MErevmappers would aid system administrators in manual recovery operations if ever needed or in the case of catastrophic crashes involving multiple nodes. These metadata files are also useful in that they allow creation of a list of all the existing MEs throughout the MDS, simply by looking at a fixed location in the roots of all the volumes.

In an exemplary embodiment, creation of an ME would typically involve the following:

First, the MErevmapper file is created within the referenced volume, with a content that identifies the absolute pathname of the referencing ME.

Then, the ME is created within the appropriate directory of the referencing volume, to point to the root directory of the referenced volume.

Finally, the MElist in the referencing volume is updated.

Removal of an existing ME would typically involve the following:

First, the MElist in the referencing volume is updated.

Then, the ME is removed from the parent directory of the referencing volume.

Finally, the MErevmapper file is removed from the referenced volume.

Renaming an existing ME would typically involve a remove and a create.

For efficient operation, the NFM should be able to cache such MEs. This way, when a client tries to open a file, the file name could be forwarded to the ME Cache Manager and checked against the existing MEs. As a result, the ME Cache Manager could output the ID of the volume where the FSO is located, along with the pathname the volume server should act upon. This would allow the NFM to directly interact with the metadata server that is ultimately responsible for the FSO of interest ("leaf server").

In an exemplary embodiment, the partitioning scheme involves the following NFM components:

The ME Cache Manager (MECM, for short): the manager of the ME Cache (MEC). This is a component that, given an absolute pathname in the file system hierarchy, will translate it into a server/volume ID and a residual pathname that will be used to request the server access to the FSO.

The Allocation Manager (AM, for short): a facility that will manage a pool of available metadata volumes and will automatically decide where directories and metadata files should be allocated across the metadata servers, once metadata partitioning is enabled. Additionally, this component could be augmented with an optional facility capable of detecting usage/access patterns for files and of performing the necessary migrations of directories to insure the best performance, avoiding the presence of metadata hotspots.

A further component, the ID Manager (IM, for short) is included to properly handle accesses to FSOs via IDs, i.e., for NFS operations.

In general, each physical metadata server will host a number of VS's, each responsible for one or more file system volumes. This allows the transparent migration of VS's to healthy nodes in case of crashes and provides a facility capable of distributing the load to avoid the presence of metadata hot spots. This means that in the case in which a metadata hot spot is caused by having multiple busy volumes served by the same metadata server, the load can be reduced by moving some of the VS's to physical servers that are not as busy. It should be noted that in situations where the backend storage is shared, "moving" the VS's would not entail physical copying of the data, which can remain untouched. In this respect, it is desirable for each VS to be the designated server for a single volume, although it is certainly possible for a VS to serve more than one volume.

The file system is typically laid out on the basis of multiple metadata volumes. One metadata volume is the root volume. It should be noted that, although a single server will act as the server for the root volume, that server will typically be backed up by a failover unit according to the redundancy scheme chosen for a given configuration. When a new directory is to be created, the AM must decide which server it should reside on. In case the directory should not reside within the same file system volume as its parent directory, the AM will pick a suitable volume from its pool of available metadata volumes and will make that the destination volume. It will also create an appropriate ME within the metadata volume that hosts the parent directory. The ME will store all the information needed to cross the volume boundary.

6.1.1.1. The ME Cache Manager

In essence, the MECM is the entity that implements the fast lookup facility capable of mapping a pathname to the metadata server volume to be used to gain access to the FSO. In an exemplary embodiment, the MECM operates as follows:

1. Initialization, structure and set-up:
  a. The MECM initializes itself by reading the MEList file from the root metadata volume and filling the MEC with those entries. Then, on the basis of the MEs now in the cache, it reads the MEList files from the target volumes the existing MEs point to, recursively.
  b. The MEC is populated with all the existing MEs, which will increase and decrease (slowly) as mount entries are created and deleted. However all the MEs that exist at any point in time are always in the MEC.
  c. A canonical representation for cached entries is used, so that references of any kind to FSOs can be unambiguously mapped to MEs, regardless of what the original reference looks like. The canonical representation for an ME in the cache is based on its absolute pathname within the aggregated file system. However, two types of pathnames may be supplied: 8-bit ones and Unicode ones. The MEC maintains its internal format, in order to cope with both kinds and to perform the correct matches regardless of the input format.
  d. The MECM does not require ad hoc software components to be placed on the metadata servers.
  e. This embodiment has some interesting attributes:
    i. Despite the fact that the hierarchy of volumes is tree-structured, since the resolution of the ME mapping only occurs through the ME cache, each server that owns a volume operates independently and no overloading of the upper volumes in the hierarchy results. Therefore, the tree-structured hierarchy effectively imposes a logical organization, but in practice, each volume owner acts in a totally parallel fashion from any other.
    ii. If a subtree in the metadata tree is migrated to a different volume, through the insertion of an ME pointing to the new volume, the pathnames known to the clients do not change, so the clients are completely unaffected. This can be exploited to properly handle metadata hotspots. It should be noted that, whereas the proper handling of an ME creation is the responsibility of the ME software, the more general issue of performing the migration of a subtree involves well understood, albeit fairly complex, techniques that involve the management of distributed file systems and generally entail the proper handling of locks over multiple volumes. This in turn generally requires at least intrinsic ordering of the volumes (for example based on volume IDs) so as to ensure that deadlocks do not occur.
    iii. Volumes that compose the file system hierarchy can be checked individually and in parallel. This is not only true of NFM integrity checks (which can be done incrementally), but also applies to the underlying file system checks carried out by the host storage servers on the file systems that implement such volumes.

2. Pathname lookup:
  a. Given an absolute pathname in the aggregated file system hierarchy, the MECM recursively matches all of the MEs in its cache and it translates the input pathname into a (Volume ID, Residual pathname) pair that identifies the FSO in which the requesting client is interested. This pair is used to access the actual FSO.
  b. When a pathname lookup is performed, a pathname that does not match any MEC entry simply maps to the same pathname relative to the root directory of the root metadata volume. In case no MEs exist, the root metadata volume is also the only volume.
  c. During a lookup, the MECM does not need to perform inquiries to the metadata servers that manage the intermediate volumes. Only the leaf volume needs to be accessed in order to open the target FSO.
  d. The lookup is entirely performed in RAM within the ME cache. The data structures in use typically allow fast matching of the input pathnames to the relevant MEs. The ME hierarchy is set up as a tree in which the matching of the pathname components is done via incremental hashing so as to yield the exact match needed.

The following is an example of how the above mechanism works. FIG. 7 shows a hierarchy of metadata volumes glued together via MEs. The corresponding content of the MEC is shown in FIG. 8. The MEC contents in FIG. 8 drive the translation of absolute pathnames supplied in input.

In practice, when an FSO is to be opened, the following sequence of events occurs:

AFS asks the MECM to translate the pathname of the FSO it wishes to open (column 1 in FIG. 9).

The MECM returns a (Volume ID, Residual Path) pair.

Then AFS requests the server that owns volume Volume ID (column 2 in FIG. 9) to open the FSO identified by Residual Path (column 3 in FIG. 9).

Note the following:

1. The first pathname supplied ("\x\y\z") does not match any MEC entry. Therefore it translates to the same pathname relative to the root of the root volume (V1).
2. The second pathname ("\a\b\c") has an exact match with a MEC entry. Therefore it translates to the null pathname (root directory) of the volume the ME points to (V2, first entry in FIG. 8).
3. The third pathname ("\a\b\c\a\b\c\x") is initially matched by the first entry in FIG. 8. This outputs a (V2, "a\b\c\x") pair that has a match with the third MEC entry. Therefore it translates to the pathname "x" relative to the root of the volume the latter ME points to (V4).
4. The fourth pathname ("\a\b\c\z\7\a\b\c") is initially matched by the first entry in FIG. 8. This outputs a (V2, "z\7\a\b\c") pair that has a match with the second MEC entry. Therefore it translates to the pathname "a\b\c" relative to the root of the volume the latter ME points to (V3).
5. The fifth pathname ("\a\b\c\a\b\c\xxx\w") is initially matched by the first entry in FIG. 8. This outputs a (V2, "a\b\c\xxx\w") pair that has a match with the second MEC entry. The result is the pair (V4, "xxx\w") that has a match with the last MEC entry. Therefore it translates to the pathname "w" relative to the root of the volume the latter ME points to (V5).
6. The sixth pathname ("\a\b\1234") has a common prefix with the first MEC entry. However, it is not matched. Therefore it translates to the same pathname relative to the root of the root volume (V1).

7. Finally, the last pathname ("\a\b\c\z\7\xxx\w") is initially matched by the first entry in FIG. 8. This outputs a (V2, "z\7\xxx\w") pair that has a match with the second MEC entry. Therefore it translates to the pathname "xxx\w" relative to the root of the volume the latter ME points to (V3).

The MECM properly handles MEs in pathname translations both going forwards and backwards (i.e., through ".." pathname components). However ".." entries mostly make sense where relative pathnames are in use. Since the AFS deals in terms of absolute pathnames, this should not be an issue (Preprocessing of the absolute pathnames should be able to properly replace the ".." components within absolute pathnames).

Modification and deletion of MEs is relatively straightforward when a single NFM is involved. However, where multiple NFM's are part of the same array, their MECs must be kept in sync. Doing this should not be a serious problem since ME updates should be quite infrequent events. In such cases, the NFM that is carrying out the modification should broadcast the update to the other NFM's in the array. The amount of information to be transferred typically includes the ME identity along with the indication of the change to be performed on it.

An ME change implies an update of the MElist for the volume where the ME is to be added, changed or removed. This file should contain a checksum that guarantees that the data is consistent and should contain a version number. When an MElist file is modified, it should be updated by renaming the current copy and creating the new updated copy with the original name. This would ensure access to one valid version even if a crash occurs that prevents the file from being fully updated. The MElist files can be used by the file system maintenance utility to verify that the appropriate MEs do indeed exist and are properly set up and to reconcile possible differences.

In systems that base the MDS functionality on clustered servers, the storage may be subdivided into relatively small volumes, with each volume assigned to a different VS. Some of the volumes might be initially unused. In this way, the active volumes could be connected together via MEs. Initially, the VS's could be distributed across a pair of active/active physical servers. As the metadata load increases, additional physical servers could be added and assigned some of the volumes previously handled by the preexisting servers. As storage needs increase, additional volumes could be connected via MEs and assigned to VS's. This solution allows the overall throughput supported by the MDS facility to be increased and in ways that are transparent to the clients, while supporting full-fledge high availability.

6.1.1.2. Physical and Virtual Volumes: A Generalized ME Scheme

In some situations, it may be desirable for the overall global file system to be based on the availability of a large number of file system volumes, which should provide additional flexibility. Generally speaking, it would be desirable to have access to a pool of volumes so that every time a new ME is needed, a volume is available to make the reference possible. Such a solution should have little or no practical impact on the size of file system objects. On the other hand, since the creation of file system volumes is an administrative function, such a solution would not be very dynamic. Besides, partitioning the storage into too many volumes would create more overhead in terms of actual storage areas available to the end user and administrative complexity.

Therefore, in an alternative embodiment, physical volumes (PVs) and virtual volumes (VVs) are used to provide a generalized ME scheme. A PV is logically contiguous portion of storage that is managed by the file system as an independent entity, with regard to space allocation and integrity checking. A PV may be implemented, for example, through aggregation of underlying physically contiguous storage segments available on separate storage units or as a contiguous area of storage within a single storage device. On the other hand, a VV could be described as an independent logical storage entity hosted within a PV and that potentially shares this same storage with other VVs. In practice, a VV may or may not have additional attributes attached to it, such as limitations on the maximum storage it may actually use and so on. However, for the purpose of the following discussion, the existence and the use of such attributes is largely irrelevant. Unless the context suggests otherwise, references to "Volume" in the following discussion, without further qualifications, it is meant to apply to either PVs or VVs.

A VV has a root directory. Therefore, the discussion above relating to MEs, volumes, and volume root directories can be similarly applied to MEs, VVs, and VV root directories.

In practical terms, to support metadata partitioning across multiple VVs, the implementation of a VV may in fact just consist of a top level directory within each PV that contains directories, each of which is the root of a VV. Each VV ID could be an ordered pair, for example, comprised of the unique ID of the containing PV and a 64-bit numeric value that is unique within a given PV. In an exemplary embodiment, the VVs within the same PV will be numbered sequentially starting with one. Such IDs are not expected to be reused, to avoid the danger of ambiguity and stale references within MEs.

Volume ID references within MEs will therefore be generalized as described. The name of the top directory for a VV will be the hexadecimal string that encodes the unique ID within the volume. The creation of a new VV involves the creation of a new directory with an appropriate name within the top level directory of the PV that is to host it.

This approach has a number of potential advantages, including removing usage of a large number of relatively small PVs; pooling together storage resources and thus avoiding forms of partitioning that in the end result in additional constraints, overhead, complexity or inefficiency; and providing the ability to create new MEs much more dynamically, as it does not have to rely on the creation of new PVs or the preexistence of PV pools. However, its greatest potential advantage may be that, in most cases, it simplifies the logical move of entire trees. Since renames are pathname operations and MEs effectively virtualize pathnames, rename or move operations could be handled very efficiently by moving the subtree corresponding to the directory to the top level of the volume itself, thus creating a new VV and creating an ME from its new parent directory (wherever it resides) to the new root of the VV just created, with the new name chosen for it. This would avoid cross-volume copies, multi-volume locking, and all the associated problems, while giving the client the same appearance and attributes. It should be noted that the new parent directory to which the subtree is moved may or may not be within one of the Virtual Volumes that share the physical volume where the new Virtual Volume was just created.

In the case of a rename of a single file or of directory that is empty or whose subtree is small, it may make sense to just move the file or the directory, as needed. This would save the need for a new VV and a new ME.

The following example shows how a move or rename of a non-empty directory may benefit from the use of VVs and MEs. Assuming a starting configuration like the one shown in FIG. 7 and FIG. 8 but with V1-V5 now VVs rather than PVs, renaming the existing non-empty directory "\a\b\c\a\b\c\aaa\bbb" to "\a\b\c\z\7\qqq" would involve the following steps taken within the NFM:

> First, a new VV would be created (e.g., V6). This preferably would be created within the same PV that hosts V4 because moving the "\a\b\c\a\b\c\aaa\bbb" to a new VV within the same PV would avoid the need to copy the subtree elsewhere. The creation of the VV would in fact amount to renaming the directory the original pathname points to, so that it would become the root of V6.
>
> Then an MErevmapper file should be created that points to the ME to be set up.
>
> Finally an ME would be created within V3 (reachable via the "\a\b\c\z\7" pathname) with the name "qqq". This would point to V6. The appropriate MElist file for the referencing VV should be updated accordingly.

The result is a pathname of "\a\b\c\z\7\qqq" that points to the original subtree, which is no longer accessible via its original pathname and that is perceived from the client side as having been moved, without any need to perform physical copies.

In the process of renaming/moving a subtree through the above scheme, MEs that are part of the subtree would become hosted within a different VV. This implies that the MElist files of the source and the target VV need to be updated accordingly. This is not an issue because the data structures in the MEC that deal with such an operation are capable of supporting this efficiently (i.e., no exhaustive searches are needed).

6.1.1.3. Volume Layout

Based on the above considerations regarding VVs and the desire to keep system data associated to volumes within files and directories that are not visible to the clients, a PV should have the following layout:

> The root directory for a PV should contain entries that are not directly accessible to the clients.
>
> A "System" directory, where system files and directories global to the PV and that are not to be accessible to clients should be kept. For example, this is the area where the NFM array configuration could be kept when the PV is the one containing the MDS root.
>
> A "VirtualVolumes" directory, where the VVs would be hosted.
>
> For each VV, a directory within the "VirtualVolumes" directory, whose name would be a hexadecimal string representing the VV ID local to the PV. Each such directory would contain:
>
> A "System" directory that would contain all the VV-specific information that should not be directly visible to clients. For example, the MElist and the MErevmapper for the VV would be stored here.
>
> An "Exported" directory. This would be the root of all the files and directories visible to clients. Effectively, each ME would point to one of these directories. The ME itself would have the user-defined directory name and FSOs under the ME would in fact be MEs in the "Exported" directory to which the ME points.

Based on the above, an ME whose pathname is "\abc\def\ghi", that references VV "af3244" within PV X, would allow the content of the VV to be made available to the clients via its own pathname. Thus, file "xyz" within the client visible portion of the VV would be seen by the clients as: "\abc\def\ghi\xyz", whereas the actual pathname used by the AFS after the MEC resolution would be "\VirtualVolumes\af3244\exported\xyz" within PV X. The MElist for the VV would be stored in "\VirtualVolumes\af3244\system\MElist" within PV X. FIG. 10 provides a view of the layout.

6.1.1.4. The Allocation Manager

The AM's function is that of choosing where new directories and the associated metadata files should be placed and to create the appropriate MEs to keep the desired connectivity. The choice of the metadata server/volume should be balanced, yet should not impose unneeded overhead in the pathname traversals and nor should it alter the NAS paradigms. The AM might also be used to perform the relocation of such objects in order to optimize the performance, based on actual file access patterns.

The default choice for the metadata server/volume should be that of the metadata server/volume where the parent directory for the directory being created resides. Thus, in the general case, the AM is not expected to perform any explicit action apart from monitoring the vital statistics of the available metadata servers. Of course, in the cases in which a single metadata server exists, the role of the AM becomes somewhat moot in that it provides no meaningful functionality. When multiple metadata servers are deployed, however, the AM should:

1. Monitor the load, the number of accesses (e.g., the MEC is capable of keeping track of the number of references to each leaf ME, so this could provide an indication of how many file opens target a given metadata server), and the percentage of free space on each of the metadata servers.
2. When the percentage of free space is below a specified threshold in the metadata server where the default location for the new directory should be (or if any other configuration criterion is not met on the default metadata server), the AM should take explicit action and:

> Choose a more suitable metadata server where the directory should be created.
>
> Create a VV there to host the new directory.
>
> Create a new ME that links the parent directory to the new directory within the new VV.

In a specific embodiment, MEs are created in such a way that at all levels of nesting they are always addressed via pathnames with the same number of components (this number would only have to be the same for all the MEs that have a common ME as their parent). This way, for each parent ME, all of its child MEs would be addressed through the same LE. If this is done, and assuming that there is a limited degree of nesting for MEs, the computational complexity would approach that of a theoretical best case. Reducing the nesting level among MEs is also advantageous.

In a situation like the one described in the previous paragraph, if the lookup of a pathname takes time T for paths under the root ME, at the second nesting level, this would generally take 2·T, and so on.

Therefore, it would be sensible to define a default value to be used to automatically translate directory creations to the creation of new MEs for new directories that would have a pathname with that number of components. Under this assumption, the computational complexity of the lookup algorithm is O(1), which translates to performance of the lookups largely independent of the number of MEC entries.

In principle, various criteria could be used to decide when new MEs should be created automatically. Possible criteria to be considered (which may be set through tunable parameters) may include:

> The average load (over a certain interval) of the metadata server that contains the parent directory exceeds a predefined threshold.
>
> The percentage of free space in the volume that contains the parent directory goes below a predefined threshold.
>
> The depth of the pathname of the target directory exceeds a predefined threshold.

Additional criteria to be included in the decision should be:
1. Needless proliferations of MEs and VVs should be avoided. This may end up having impact on complexity and on performance and, unless clear advantages stem from it, it should not be considered.
2. Deep logical nesting of volumes should be avoided to prevent performance impact in the lookup phase.
3. An ME should only reference the root directory of another VV.
4. The root directory of a VV can be referenced by a single ME. Consequently, the total number of MEs would not exceed the number of VVs managed by the metadata servers and thus it has impact on numeral 1 above and on the overall complexity of the mount graph.

6.1.1.5. The ID Manager

NFS accesses to files are performed in two steps. Initially, lookups are performed to get a file ID that will be used subsequently. The initial lookup goes through the MEC. The subsequent accesses are done via the file ID. At that point, it is fundamental that the access to the ID file be performed by directly interacting with the target server/volume.

However, a lookup of the file ID through the MEC generally would only work on the metadata server/volume pair where the corresponding ID file is stored (see below). In order to support this, an ID Manager (IM) may be used. The IM would manage a cache of file IDs (the ID Cache, or IDC) that will map them to the appropriate server/volume handling each ID file. So, NFS accesses via a file handle should always be performed through the IDC.

The IDC may be implemented as a simple lookup table that maps the unique file IDs to the appropriate server/volume pair and may be managed in an LRU (Least Recently Used) fashion.

When an NFM starts up, the cache would be empty. As new pathnames are looked up, the corresponding ID files referenced are entered into the cache. In case the attempt to access an ID file is unsuccessful, the IM would perform a parallel query of all the metadata servers, specifying the ID being sought. Once a metadata server provides a positive response, the ID is added to the cache. This should be quite efficient in that it can be done in parallel across all the metadata servers and because an exhaustive search on each server is not necessary.

Each active ID file entry in the cache would contain a sequence of fixed-length records that would include the following fields:
1. Unique file ID.
2. Server/volume identification.
3. Time of last reference.

The latter item is useful to perform the LRU management of the cache.

This facility works separately from the MEC. However, its operation in terms of modified entries is related to that of the MEC. If appropriate, the MEC could interact with the IM and have it update the location of the ID files that have been moved. However, this is essentially an optimization, since the failure to access an ID file would cause a parallel query to be issued. The desirability of this should be evaluated on the basis of the measured impact of the parallel queries on performance and of the induced incremental complexity.

When a single metadata server carries out the MDS function, the IM should not have to manage a cache at all.

6.1.1.6. Hard Links and MEs

From the previous discussion, it may be clear that by partitioning the MDS hierarchy into disjoint subtrees implemented as independent file system volumes, hard links cannot be implemented the same way as for monolithic volumes.

One possible solution involves implementation of references external to a volume (much in the style of MEs). This would likely involve a considerable amount of bookkeeping, which could become overwhelming. For example, for the case in which a hard link within a volume is broken when the file is migrated to another volume along with the subtree to which it belongs, it should be possible to reconstruct the link in some way. However, such reconstruction would generally require keeping track of all the hard links that exist and of their evolutions (pathname changes, deletions and the like).

Since unique IDs are associated with all FSOs, these behave globally. Thus, in an exemplary embodiment, a hard link could be implemented as a new type of metadata file (referred to hereinafter as a Secondary Hard Link or SHL) containing the unique ID for the file to which the hard link relates. This type of reference would be AFS-wide, so it would be valid regardless of the volume where the referenced file is moved. When the SHL is opened, the AFS would open the metadata file for the SHL to retrieve the file ID and would then open the ID file to access the data. Thus, once this scheme is applied, the only hard links that would exist to a file are one for the client-visible pathname and one for the ID associated to the file, so files in good standing will have a hard link count of two.

This scheme has slightly different attributes than standard hard links, as follows:

The connection between a file and the hard links referring to it is not symmetric among all the hard links. In this case, the original client-visible pathname and the ID pathname have a "preferred status" (and they could be referred to as Primary Hard Links or PHLs). A PHL generally would provide faster access, since it need not go through the indirection required by the SHLs to get to the file contents.

The ID file/metadata file that represents the FSO would keep track of the number of all the links to it (PHLs+ SHLs). The PHL count is kept within the metadata of the underlying file system and, in this embodiment, is always two. The SHL count would be kept in the metadata file. In the following, the term "link count" will apply to the reference count that includes both PHLs and SHLs. This is set to 1 when the FSO is created via its client-visible pathname, and goes to 2 when the ID file PHL is added. It is then incremented by one for each new SHL and decremented by one for each SHL deletion. The storage of the file would be reclaimed only when the link count goes to 1 (i.e., only the ID reference is left). In case the original client-visible pathname is removed, the file itself should not be removed if the link reference count does not become 1. This means that the client-visible PHL, rather than being removed altogether, should be renamed so as to move the metadata file to a client-invisible directory where it will remain until the file reaches the link count of 1.

In an exemplary embodiment, SHLs are files that only have the metadata component. This should contain the ID of the target file. As for all files, they should be also accessible via their ID.

In case of crashes during the addition/deletion of SHLs, there is the potential for inconsistencies between the actual number of SHLs and the link count. To provide enough redundant information to perform the recovery in such situations, the metadata file that represents the target file should be updated by increasing/decreasing the link count and adding/ deleting the ID of the SHL.

In addition to this, all changes should first update the metadata file for the target file and then add the ID to the new SHL or remove the SHL.

If this is done, SHL inconsistencies because of crashes would be no different from other metadata inconsistencies that might pop up. They should be properly handled through the subsequent directed, incremental file system scans and repairs.

In any case, the AFS should be capable of coping gracefully with dangling SHLs (i.e., SHLs that reference an ID that no longer exists). This generally would require that the requesting client be returned a "file not found" error and that the SHL itself be deleted by the AFS.

6.1.1.7. Cross-volume Operations

As discussed, cross-volume operations, such as moving file system subtrees from one volume to another are not strictly necessary to satisfy client requirements. In fact directory moves and renames can be fully dealt with through the use of VVs.

However, cross-volume operations may be useful for administrative reasons. For example, if there is a disproportionate amount of accesses to a PV with respect to others, it might make sense to better distribute the files and directories across multiple PVs. In this case, there may be no substitute to moving the files from one PV to another and creating a link via an ME. Of course, when the move is completed, this operation can be fully transparent with respect to the pathnames the clients perceive.

Before the move can be performed, all the open files within the subtree to be copied should be closed. This can be done in at least two ways:

Saving away the request, so that it can be performed when appropriate and locking the subtree to be moved, waiting for all the outstanding connections to die away. Since new connections could then not be initiated, the outstanding ones will slowly die away. This, however, may require an unpredictable amount of time, depending on the nature of the client-generated traffic. This solution avoids disruption, but it privileges the open connections by forcing all the new ones to be rejected until the operation is complete.

Locking the subtree to be moved and forcefully closing the open connections to files in the subtree to be moved. This approach may be more disruptive (although disruption could be mitigated by employing appropriate system administration policies, for example, to alert users that certain areas of the file system should not be touched during a certain time interval), but it is likely quicker, less discriminatory, and more deterministic. This second approach could be implemented as follows:

1. In order to better isolate the subtree to be moved, before the actual files are copied, the subtree could be moved to a temporary VV within the same PV. This would not involve copying files, would be nearly instantaneous and transparent to the clients, and would create an ME before the actual move is completed. By locking the ME, it would be easier to block any attempt to access any file within the VV through the relevant ME.
2. Locking the ME that points to the temporary VV, so no new accesses are allowed.
3. Performing the copy of the temporary VV to another PV, as a new VV.
4. Updating the ME so that points to the new VV.
5. Unlocking the ME.
6. Asynchronously removing the temporary VV.

This operation should not be extremely frequent. Appropriate statistics gathered in monitoring file access could identify the hot spots and suggest the subtrees to be moved to eliminate them.

6.1.2. Interactions Between the SVS and the MDS

The Storage Virtualization Service implemented by the AFS makes use of the MDS to give clients access to file data. In some situations, such as when the MDS is hosted within an NFM, all operations can be strictly local. In other situations, however, such as when the MDS is hosted within systems other than the NFM or when a metadata tree is partitioned across multiple NFMs (depending on the FSO involved, an NFM may access the file in the local MDS or across the network), operations may not be strictly local.

In an exemplary embodiment, MDS services may be made available via an abstraction layer so that access to non-local metadata servers can be effective and fast. This abstract layer has the following characteristics:

It hides whether the metadata server is hosted within the requesting NFM. This allows transparent access regardless of whether the MDS is partitioned or not.

It abstracts from the data structures and gives access to the metadata indirectly via the operations that can be performed over it. This allows the AFS to be largely independent of the actual metadata structures and performs semantic actions within the server, rather than requiring read-modify-write cycles across the network.

It performs remote operations via an ad hoc protocol (referred to herein as the Inter-SWitch Protocol, or ISWP) that minimizes the amount of data carried around and is capable of supporting both synchronous and asynchronous requests.

6.2. Redundancy in the NFM and in the Metadata Server

This section addresses some issues that concern the availability of the NFM and of the metadata, in the presence of failures and system crashes. This is an important issue for a system that sits in front of a customer's data and needs to be up and running for the customer's data to be available.

The MDS function can run within the NFM platform or on a dedicated machine. Running the MDS within an NFM has certain advantages, including: the cost of the solution is lowered, the complexity of the solution is reduced, and the latency caused by accesses to the MDS is minimized, since these accesses do not occur within a network connection, but are handled locally. On the other hand, running the MDS within the NFM platform also increases NFM load, which may be tolerable in certain systems but intolerable in others, depending on such things as the size of the system, the ratio between files and directories and that between small and large files and depending on the prevalent type of traffic.

However, the impact of the MDS on the NFM load can be reduced by splitting the MDS function across multiple switches, with appropriate partitioning of the metadata hierarchy. If HA support is desired, any single point of failure should be avoided so that service can continue in the presence of a single failure. Thus, the above functions should be preserved across a single NFM crash.

The loss of a storage server allows the data to survive because of the ability to provide mirror copies of the individual file fragments in a file. However, a customer may choose to have some non-redundant data sets. On the other hand, redundancy in the MDS is important as, otherwise, the entire aggregated file system tree or subsets of it (in case it is partitioned) could become unavailable.

For non-HA configurations, it generally would be acceptable for only the MDS storage to be redundant. In such configurations, it is still important to preserve the file system hierarchy. This can be obtained, for example, by storing the metadata within redundant storage implemented via SCSI RAID controllers and attached storage. Since there are no HA requirements, however, downtime to replace the faulty equipment (e.g., possibly moving the disks to an NFM that will replace the faulty one) should be acceptable.

For HA configurations, in addition to the above criteria, the MDS itself should be redundant. Thus, HA support typically involves:

Shared, redundant storage controllers, which should have no single point of failure, should support at least RAID-1 and RAID-5, should storage to be resilient in the presence of the failure of individual disks, and should allow storage to be shareable among multiple nodes. This does not imply that all the nodes would be able to use the same area of storage concurrently (the ability to do so is essentially an attribute of the file system software that runs in the nodes), but should allow different nodes to manage the same storage volumes in a mutually exclusive mode at different times, without any need to replicate the contents of the volumes themselves.

Clusters, which allow multiple nodes that are members of the same cluster to share resources (in the NFM case, storage resources) and to take over the role of cluster members that crash or fail automatically and without having impact on the clients.

As mentioned earlier, redundant storage controllers that implement RAID-1 and RAID-5 are also important for the non-HA configurations where pure redundancy of the storage is sought. In that case, the storage controllers need not be shareable, nor do they need to be hosted in standalone enclosures. For the non-HA systems, they can be hosted within the computer that hosts the metadata service (which might be an NFM itself).

In an exemplary embodiment, the operating system (OS) platform for the MDS in the NFM is Microsoft Windows. Given this, one solution to address the HA functionality described above could involve use of the clustering capabilities, and specifically Microsoft Custer Services, available through the Microsoft Windows Storage Server 2003. This architecture could rely on SCSI, iSCSI, or Fibre Channel (FC) storage controllers and could support active/active shared-nothing clustering, wherein "active/active" means that all the cluster members are capable of providing service at the same time (unlike "active/passive" or "active/stand-by" configurations in which some members provide no service at all until an active member becomes unavailable, in which case they take over their role) and "shared-nothing" means that each of the file system volumes to which the cluster members provide access is only available through a single cluster member at a time; should that member fail, the cluster would provide access to the same volume through another cluster member to which the IP address of the failed member will migrate.

In such a cluster, normally a virtual server is set up so that it has all the attributes of physical server machines. Each VS typically has its own IP address and a host name and is assigned file system volumes to serve. When a physical server crashes, this is detected by the cluster infrastructure and the VS's that were being hosted on the physical server that crashed are rehosted on another healthy node ("fail-over"). Clients will continue to address the VS's by the same IP address and name, although they will be interacting with VS's that will now run within a different physical server. Thus, apart from the very limited disruption lasting the time needed to perform the fail-over, the functionality will continue to be available (possibly with some performance degradation on the physical server that has to run other VS's, in addition to those it was already running). In this way, HA can be supported in the MDS. Similar technologies are available as off-the-shelf components for Linux platforms (e.g., Kimberlite (reference [6])).

In the following discussion, the number of members of a cluster will be referred to as the cluster "cardinality".

So, with the above attributes, all the members of the cluster perform actual work and provide access to disjoint file system volumes.

Microsoft Clustering Services is a general clustering framework, meaning that it is not only able to serve files, but it is also able to handle other kinds of services, like running applications on any of the cluster members (the same may be true for other similar active/active shared-nothing clustering services). In exemplary embodiments discussed above, Microsoft Clustering Services (or similar clustering services) may be used specifically for serving of file system volumes, this is only a subset of what a Microsoft Cluster can do. However, all members of the cluster that handle the failover of file system services should be able to access directly all the storage volumes, although only the active server for that server should do so at any one time (this does not apply to individual requests, but rather to major transitions caused by the member actively providing service crashing or stopping).

Given this, some observations are in order:

In the limited case in which a single volume is available to host the metadata, from the point of view of the metadata service, despite the fact that all nodes are active at the same time, the scheme behaves as an active/passive configuration, because only one server at a time would be able to provide the service.

When multiple file system volumes are available as metadata store, having a cluster with multiple active members allows the load to be distributed across the cluster members and to take advantage of failovers in the most effective way because this allows multiple levels of redundancy at the expense of increased load on the surviving cluster members. The maximum cardinality for such a cluster, apart from product limitations, is generally equal to the number of volumes to be served.

Since the MDS hierarchy can be split across multiple volumes (and servers), this partitioning can be tailored to the cluster cardinality that is available and can be changed dynamically to reflect increasing loads. However the MDS partitioning scheme is not limited to a single cluster. In fact, MDS partitioning can span multiple clusters, each potentially limited by the maximum cardinality the cluster supports. One consequence is that the failover of volumes may only be possible within the cluster that serves that set of volumes and independent clusters that can form a large and complex metadata hierarchy need not share the storage among themselves. This allows MDS services to be set up in a variety of configurations, such as:

A system that makes use of a single metadata server (possibly co-hosted within an NFM).

A system that provides higher availability on the basis of a single MDS hierarchy, i.e., a second MDS provider could be clustered with the first one and it could take over the MDS when the first one fails.

A system (similar to the preceding one) in which the MDS hierarchy is partitioned into two volumes, each served by one of the clustered machines. Once again, if one of the machines crashes, the missing portion of the MDS function is transferred to the surviving one.

A system that clusters more machines together in a single cluster, partitioning the MDS hierarchy in an appropriate fashion, up to the cardinality of the cluster.

A system in which the MDS hierarchy is partitioned across multiple clusters, such that the partitions of the MDS served by each cluster can be failed over within the cluster, yet the load is distributed across all the clusters.

The Microsoft Cluster Services support clusters with shared SCSI-based or FC-based storage. The maximum cardinality supported in such clusters amounts to two members for SCSI storage and FC Arbitrated Loops (FC-AL) and it goes up to eight for FC Switched Fabrics (FC-SF).

In terms of applicability of the various storage options, the following applies:

SCSI-based storage is typically the least expensive, but is also the least expandable of the possible storage configurations.

FC-ALs are typically more expensive, yet the cost is limited by the fact that the arbitrated loop does not require the use of expensive FC switches. FC hubs can be used to simplify connectivity. However, the basic infrastructure can be evolved to that of FC-SF systems.

FC-SFs are the generally more flexible and more expensive configurations. They include FC switches, which increase the cost.

From the point of view of cost and complexity, a natural hierarchy of storage solutions exists. SCSI storage is the starting point. FC-AL comes next, and it presents an upgrade path to FC-SF arrangements. In embodiments of the MDS architecture that utilize the NTFS file system, the underlying storage implementation is largely transparent to which of the above alternatives is in use.

By restricting the MDS to run within NFM nodes and by including the NFM nodes as members of a cluster, as in some embodiments, the server virtualization services can be applied to the storage virtualization component that implements the AFS, which can also solve the problem of handling failures and crashes of NFM nodes in an active-active fashion.

The configurations discussed above may support HA for the MDS and for the AFS. In case the selective file redundancy via multi-way mirroring is not satisfactory, it can be selectively complemented by applying the same techniques to storage servers. In this case, the DS functionality should be run on clustered storage servers that would make use of redundant, shared storage controllers or SAN's rather than of integrated disk drives.

6.3. Storage of Small Files

As discussed above, in some embodiments, small files may be stored in metadata files. In the following discussion, metadata files that embed user data are referred to as Hybrid Metadata Files (HMF). The use of HMFs may be enabled by default or may be selectable by the user either globally or on a file-by-file basis (e.g., using rules). Also, the small file threshold may have a default value or may be selectable by the user either globally or on a file-by-file basis (e.g., using rules). For example, simple rules could allow the user to enable/disable HMF use (e.g., HMF=enable/disable) and allow the user to set the small file size threshold (e.g., HMF size=32K), or more complex rules could allow the user to configure HMF usage on a file-by-file basis (e.g., if filetype=X and filesize<=32K then HMF=enable).

As long as a metadata file is in the HMF status, the MDS handles data read/write requests in addition to metadata requests. So, in environments where small files make a significant portion of the working set, some additional load on the MDS may result. This may be mitigated by distributing the MDS functionality across multiple physical servers.

Generally speaking, all files come into being as zero-length files. Therefore, a new (empty) file could be stored as an HMF by default and could remain stored within the metadata file as long as its size remains within the established threshold. When such a threshold is exceeded, the file could be migrated to full striping/mirroring such that the data would be stored according to the chosen striping/mirroring scheme and associated to the metadata file.

Before writing a short file into the metadata file, the relevant metadata region should be locked (for example, length and modify time would have to change). User-level locks may be used to selectively lock data portions of the file. In any case, if the file is being extended to go beyond the threshold, then the fact that the metadata region is locked should be sufficient. After the file graduates to the standard format, the file can be handled as discussed generally above.

The case where a large file (stored separately from the metadata file) is truncated or otherwise reduced in size to qualify as a small file according to the established threshold can be handled in at least two different ways.

In one embodiment, the file could be integrated into the metadata file (i.e., to form an HMF) and the original file could be deleted from the file system. In this way, all small files would migrate to HMF status over time. One risk with this approach is that some files may "flip-flop" between HMF and non-HMF status as the files grow and shrink over time.

In a preferred approach, the file could simply remain in the file system without converting it to HMF status, which will avoid "flip-flopping" between HMF and non-HMF status (e.g., if a file has been extended and later shrunk, this is a hint that the file has a fairly dynamic behavior and is likely to grow again). In this way, the cost of "graduation" would be paid only once in the life of a file (i.e., when a file begins as a small file and changes to a large file), while files that start and remain as short files will be handled efficiently.

One consideration for HMF files is that the metadata redundancy scheme provided for the underlying metadata store, implemented via its RAID controller, could exceed the level of redundancy specified for some files (e.g., non-mirrored files) and could provide a lower level of redundancy than that specified for other files (e.g., files intended for multi-way mirroring). In the redundancy scheme offered by the metadata store, there is typically no redundant copy of the data directly accessible by the client, which would prevent the redundant copy from being accessed in parallel. Given the size of the files, however, the small amount of file data should be cached directly and all clients should be able to read from the cache. At the time an HMF file graduates to become a regular file, file would be converted from the singly-redundant stream to the redundancy scheme specified by the client.

Consequently, the user data in an HMF is as redundant as the metadata store on which it resides. Depending on how HMFs are implemented and the types of rules configured by the user, it may be possible for HMFs to have data redundancy that is different than that specified by the rules that apply to regular files. However, HMFs should not experience redundancy below that of the MDS, which should be sufficient, since if the MDS fails, the fact that the data might be replicated multiple times is essentially moot.

If the client chooses to have no redundancy (either globally or for a particular class of files), then when an HFS is converted to a regular file, the redundancy inherent in the metadata store will be lost. This should be the only case in which the level of redundancy decreases. If the initial redundancy reached a level that the client had not specified, there should be no commitment on the NFM to continue with the initial redundancy.

It should be noted that inclusion of the MDS function within the NFM should further help in reducing both the time it takes to open a file and the latency experienced.

6.4. Reapply

As discussed above, when global, file, and directory rules are modified, data that has already been stored to the MFS in accordance with those rules are not automatically relaid out in accordance with the rule modifications. However the NFM preferably includes a utility to allow the user to "reapply" modified rules to existing data.

In an exemplary embodiment, a modified set of rules is reapplied to existing data by scheduling a reapply rule job. A reapply rule job can perform either of the following two functions, depending on how the job is set up:

Balancing Volume Sets—When the reapply rule job is set up to balance a given storage volume set, it redistributes the data in the storage volume set so that the data is distributed evenly amongst the storage volumes in the set. This function is useful in instances when some storage volumes within a storage volume set contain significantly more data than others in the set, as when a new storage volume is joined to a storage volume set on which much data has already been stored.

Reapplying Rules on Files—When the reapply rule job is set up to reapply rules on files, it reapplies modified rules to selected portions of the MFS, the entire MFS, or to certain file types in the MFS. In cases where the reapply rule job is set up to reapply rules on files, it can take as its input the output file produced by a File Filter utility, or the user can specify a directory path and list of wildcard specifiers to specify the files to which the reapply rule job will apply.

Figure 16:
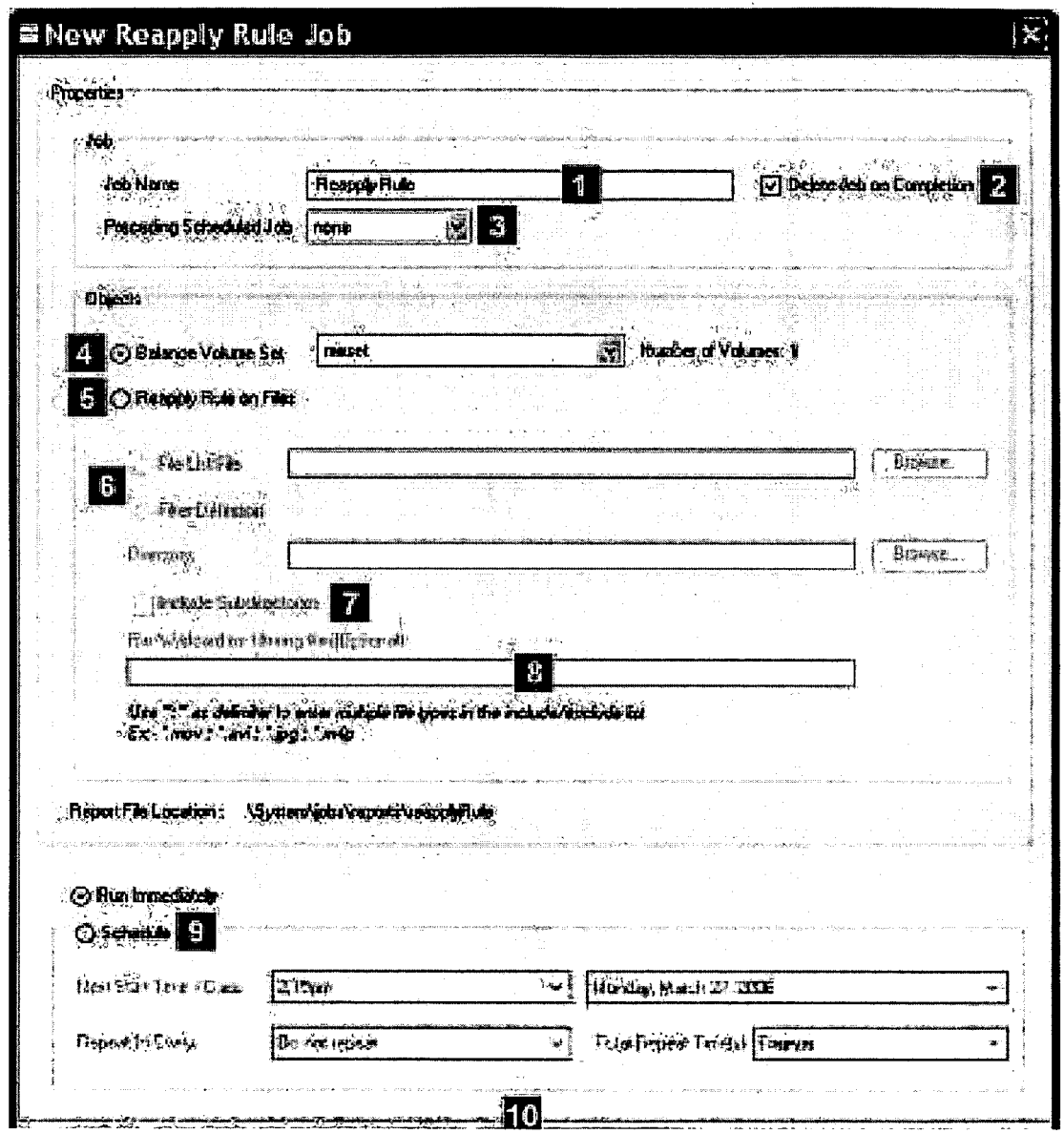
FIG. 16 shows the New Reapply Rule Job dialog box, in accordance with an exemplary embodiment of the present invention.

Reapply rule jobs are specified through a New Reapply Rule Job dialog box. FIG. 16 shows the New Reapply Rule Job dialog box, in accordance with an exemplary embodiment of the present invention.

In FIG. 16, field number 1, the user can enter the name of the reapply rule job to be created. When the dialog box is first invoked, the default name Reapply Rule is included in this field.

In FIG. 16, field number 2, the user can select whether the job will be deleted after it completes running (when this check-box is selected) or whether it will not be deleted (if this check-box is not selected).

In FIG. 16, field number 3, if a job name is selected in this drop-down list, the reapply rule job being created will begin running immediately after the selected preceding job finishes running. Choose none if the job is not to begin after a preceding job finishes running. Note: Only jobs that have been scheduled will appear in this field and can be selected.

In FIG. 16, field number 4, the user can select this radio button to set up the reapply rule job to balance a given storage volume set. Select the storage volume set to be balanced in the adjacent drop-down list box.

In FIG. 16, field number 5, the user can select this radio button to set up the reapply rule job to reapply modified rules to selected portions of the MFS, the entire MFS, or to certain file types in the MFS. The associated MFS settings are made in fields 7, 8, and 9.

In FIG. 16, field number 6, the user can specify settings in the "Objects" area of the dialog box to determine the file set that is input to the reapply rule job when it runs. The following choices are available:

File List File—Select this radio button to specify a file list file (e.g., in Unicode format) as input to the reapply rule job. To specify the file, click the radio button, then enter the full path and file name in the adjacent text entry field. Alternatively, the user can click the Browse . . . button that is adjacent to the field to invoke the "Directory" dialog box, browse to and select the file list file, and then click the OK button in the "Directory" dialog box.

Filter Definition—Select this radio button to specify a given MFS directory path as input to the reapply rule job. To specify the path, click the radio button, then enter the directory path into the "Directory" field. Alternatively, you can click the Browse . . . button that is adjacent to the field to invoke the "Directory" dialog box, browse to and select the desired directory path, then click the OK button in the "Directory" dialog box.

In FIG. 16, field number 7, if the Filter Definition radio button is selected, the Include Subdirectories check-box can be selected to include sub-directories of the directory specified in the "Directory" field as input to the reapply rule job. If the check-box is not selected, only the directory specified in the "Directory" field will be provided as input to the reapply rule job.

In FIG. 16, field number 8, if the Filter Definition radio button is selected, enter a wild card string into this field to include only files having certain patterns as input to the reapply rule job. A wild card string is a search pattern or a series of search patterns that are separated by colons. The following is an example wild card string: r*.*:Sales??.xls. For example, including the wild card string shown above in the field will include the following files as input to the reapply rule job: files having names that begin with "r"; and files prefixed with 'sales' having any two [but only and exactly two] characters in position 6 and 7 of the file name, and an extension of .xls. An asterisk (*) used in a pattern specifies that any number of characters in place of the asterisk will result in a match. One or more question marks (?) used in a pattern specifies that any single character at the position of a given question mark will result in a match. By default, the field contains the characters *.*, which includes all files as input to the reapply rule job.

In FIG. 16, field number 9, if the job is to run immediately when the OK button is clicked, select the Run Immediately radio button. To schedule the job to run at a later time, select the Schedule radio button, then select the desired start time for the job by selecting the appropriate time and date in the "Next Start Time/Date" drop-down fields. The user can also set the job to run a certain number of times at a specified interval by making appropriate selections in the "Repeat Every" and "Total Repeat Time(s)" drop-down fields.

In FIG. 16, field number 10, clicking the OK button creates the reapply rule job and closes the dialog box. Clicking the Cancel button closes the dialog box without creating the job, and clicking the Help button opens a Web browser containing help information on the dialog box.

It should be noted that jobs are aborted during certain failover events and must be restarted after the failover is complete.

The reapply rule job preferably produces an XML file in the \system\jobs\reports\reapplyRule directory in the MFS that indicates whether or not the reapply rule function was successful for each file to which it was applied. The name of the report file that is produced by the job is the same as the name given to the job, appended by the .xml extension.

6.5. Relayout

The NFM preferably includes a utility to allow the user to re-layout files from one location within the storage system, such as a given storage volume set, to another location, without the need to modify the MFS path seen by clients. This utility provides a useful information lifecycle management (ILM) function, namely that of allowing the Storage Administrator to identify, isolate, and move files having certain attributes, such as files that have not been accessed for a certain amount of time, to another section of the storage system without changing the paths of the files as perceived by storage clients. Relayout can also be performed to specify that all files on a specified storage volume be relaid out per the settings of the job. This is especially useful to off-load files from the last storage volume that is joined to a storage volume set before that storage volume is unjoined from the set.

Figure 17:
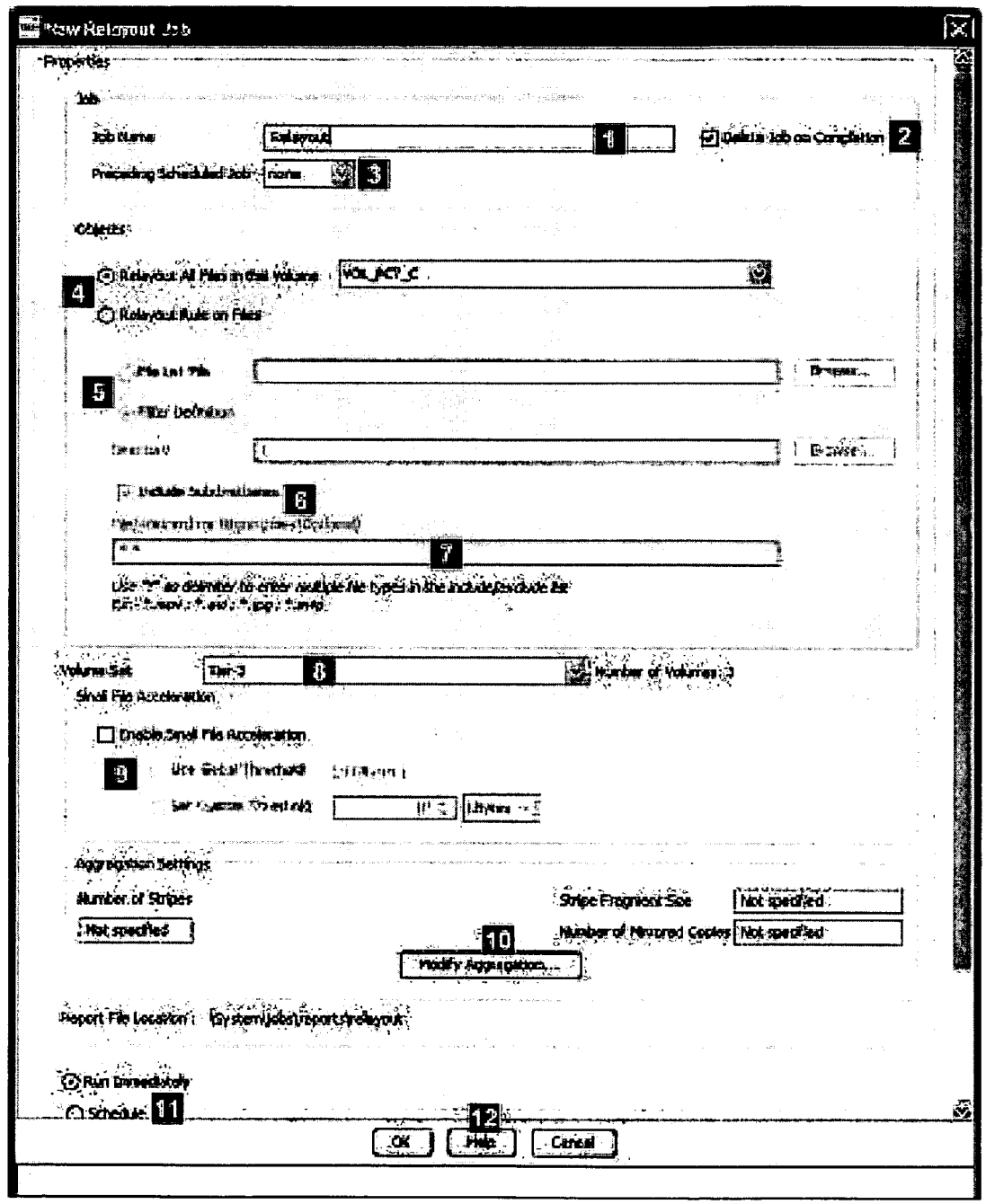
FIG. 17 shows the New Relayout Job dialog box, in accordance with an exemplary embodiment of the present invention.

In an exemplary embodiment, a relayout is performed by scheduling a relayout job. Relayout jobs are specified through a New Relayout Job dialog box. FIG. 17 shows the New Relayout Job dialog box, in accordance with an exemplary embodiment of the present invention.

In FIG. 17, field number 1, the user inters the name of the file relayout job to be created. When the dialog box is first invoked, the default name ReLayout is included in this field.

In FIG. 17, field number 2, the user can specify whether the job will be deleted after it completes running (when this check-box is selected) or whether it will not be deleted (if this check-box is not selected).

In FIG. 17, field number 3, if a job name is selected in this drop-down list, the file relayout job being created will begin running immediately after the selected preceding job finishes running. Choose none to not start the file relayout job after a preceding job finishes running. Note: Only jobs that have been scheduled will appear in this field and can be selected.

In FIG. 17, field number 4, these radio buttons determine the object to which the file relayout job is applied. The following choices are available: Relayout All Files in This Volume—Select this radio button if to specify that the files on a specified storage volume be relaid out per the settings of the file relayout job. The storage volume that is to serve as the source of the file relayout operation is chosen from the adjacent drop-down list. This selection is especially useful when setting up a file relayout job to off-load files from the last storage volume that is joined to a storage volume set before that storage volume is unjoined from the set.

Relayout Rule on Files—Select this radio button to specify a file set as input to the file relayout job. This selection is useful for tasks such as information lifecycle management (ILM).

In FIG. 17, field number 5, these settings are active when the Relayout Rule on Files radio button is selected. These settings determine the file set that is input to the file relayout job when it runs. These are the files that will be relaid out to the specified storage volume set per the settings in the "Small File Acceleration" and "Aggregation Settings" areas of the dialog box. The following choices are available:

File List File—Select this radio button to specify a file list file as input to the file relayout job. To specify the file, click the radio button, then enter the full path and file name in the adjacent text entry field. Alternatively, the user can click the Browse . . . button that is adjacent to the field to invoke the "Directory" dialog box, browse to and select the file list file, then click the OK button in the "Directory" dialog box.

Filter Definition—Select this radio button to specify a given MFS directory path as input to the file relayout job. To specify the path, click the radio button, then enter the directory path into the "Directory" field. Alternatively, the user can click the Browse . . . button that is adjacent to the field to invoke the "Directory" dialog box, browse to and select the desired directory path, then click the OK button in the "Directory" dialog box.

In FIG. 17, field number 6, if the Filter Definition radio button is selected, the Include Subdirectories check-box can be selected to include sub-directories of the directory specified in the "Directory" field as input to the file relayout job. If the check-box is not selected, only the directory specified in the "Directory" field will be provided as input to the file relayout job.

In FIG. 17, field number 7, if the Filter Definition radio button is selected, enter a wild card string into this field to include only files having certain patterns as input to the file relayout job. A wild card string is a search pattern or a series of search patterns that are separated by colons. By default, the field contains the characters *.*, which includes all files as input to the file relayout job.

In FIG. 17, field number 8, in this drop-down field, choose the storage volume set to where files matching the above "File Filter" settings will be relaid out. Only extended mode storage volume sets are available as destinations for file relayout operations.

In FIG. 17, field number 9, this group of settings determines how small files will be relaid out. The user can choose to employ small file acceleration, in which files that are smaller than a specified size are relaid out in metadata rather than the MFS, or choose not to use it, in which case all files to which the rule applies are relaid out as specified by the aggregation settings. The small file behavior is determined by the following settings:

Enable Small File Acceleration—Small file acceleration is enabled when this check-box is selected. Small file acceleration is disabled when this check-box is not selected.

Use Global Threshold [X KBytes]—If this radio button is selected, the global small file acceleration settings will be used for files being relaid out. X shows the current global small file acceleration threshold setting. The global small file acceleration settings are set in the Extended Mode Global Array Settings dialog box.

Set Custom Threshold—If this radio button is selected, files that are smaller than the size that is set in the associated spin-box and drop-down field are relaid out to metadata rather than the MFS.

In FIG. 17, field number 10, click the Modify Aggregation . . . button to invoke the Modify Aggregation dialog box, which is used to display and modify the file aggregation settings that are related to the files being relaid out. Note: When the "New Relayout Job" dialog box is invoked, the aggregation settings are not specified, and must be explicitly set in the Modify Aggregation dialog box. If they are not explicitly set, the message "Modify the aggregation settings to proceed. Aggregation settings are mandatory" pops up when the user attempts to close the dialog box.

In FIG. 17, field number 11, to run the job immediately when the OK button is clicked, select the Run Immediately radio button. To run at a later time, select the Schedule radio button, then select the desired start time for the job by selecting the appropriate time and date in the "Next Start Time/Date" drop-down fields. The user can also set the job to run a certain number of times at a specified interval by making appropriate selections in the "Repeat Every" and "Total Repeat Time(s)" drop-down fields.

In FIG. 17, field number 12, clicking the OK button creates the file relayout job and closes the dialog box. Clicking the Cancel button closes the dialog box without creating the job, and clicking the Help button opens a Web browser containing help information on the dialog box.

It should be noted that jobs are aborted during certain failover events and must be restarted after the failover is complete.

The relayout job preferably produces an XML report file that has the same name as the name given to the job, appended by the .xml extension, which is stored in the \System\jobs\reports\relayout directory in the MFS.

6.6. Discover and Integrate Storage Volumes

The NFM preferably includes a utility to automatically discover storage volumes and add them to the system's pool of available storage. The process of discovery generally must be performed before storage volumes can be incorporated into the storage system.

Figure 18:
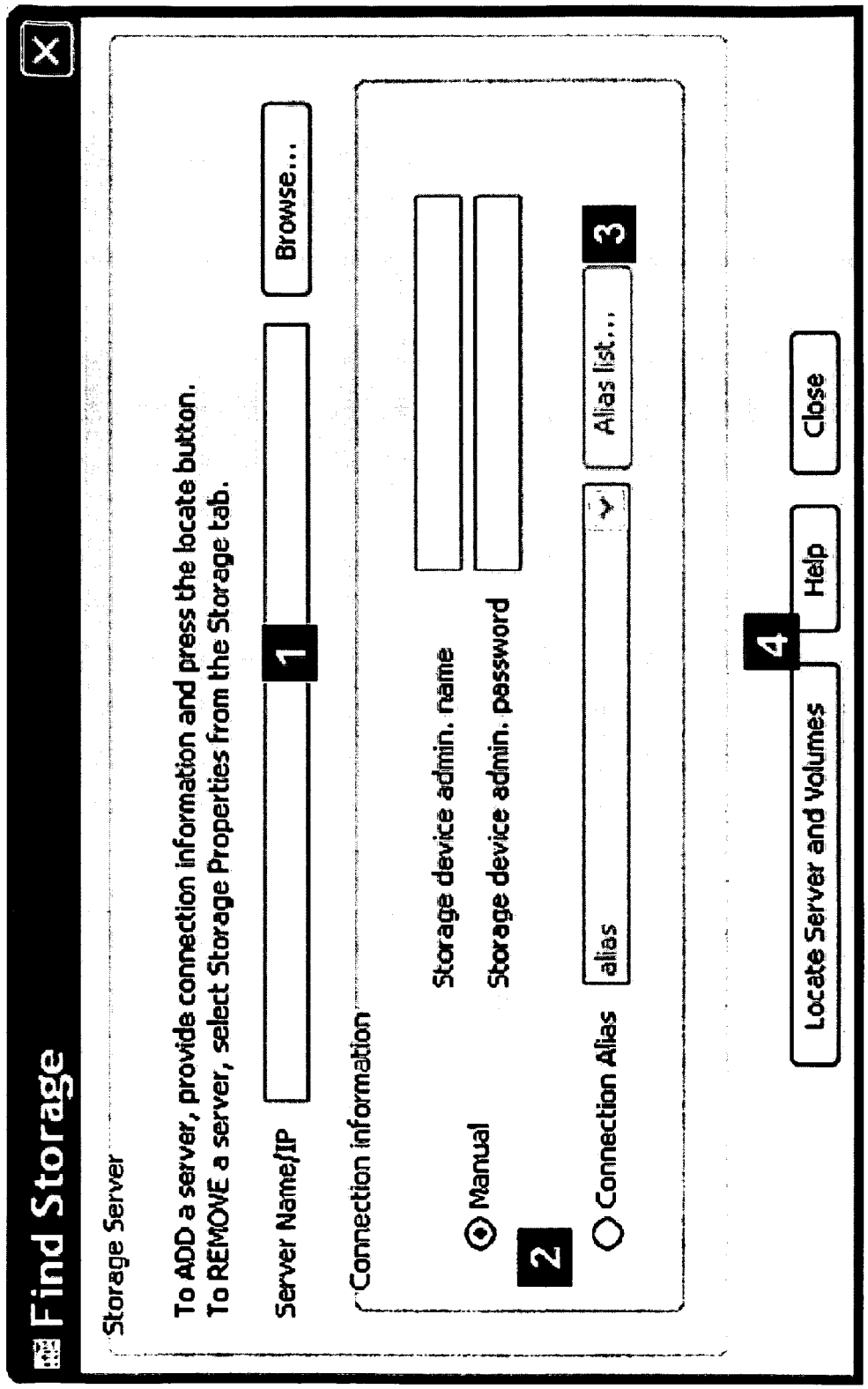
FIG. 18 shows the Find Storage dialog box, in accordance with an exemplary embodiment of the present invention.

FIG. 18 shows the Find Storage dialog box, in accordance with an exemplary embodiment of the present invention.

In FIG. 18, field number 1, the user can enter the IP address or host name of the data server that contains the storage volumes to be discovered, by either directly entering (typing) the information into the text entry field or by clicking the Browse . . . button to invoke the "DataServer Browse" dialog box, browse to and select the data server that contains the storage volumes to be discovered, then click the OK button in the "DataServer Browse" dialog box.

In FIG. 18, field number 2, the user can choose a method of supplying connection information to the specified data server, and supply the necessary information, using these radio buttons and associated fields. The following methods are available:

Connection Alias—If a connection alias exists that contains the correct administrative user logon and password for the data server being discovered, select the Connection Alias radio button, then select the desired connection alias in the adjacent drop-down field.

Manual—If an appropriate connection alias does not exist or the user is not sure, select the Manual radio button, then enter the appropriate administrative user logon and password for the data server being discovered into the "Administrator Name" and "Administrator Password" fields. Note: If domain credentials are used for user authentication, <domain>\<user_name> must be entered into the "Administrator name" field, where <domain> is the domain to which the data server belongs. Note that when discovering storage volumes on Network Appliance filers, do not use domain credentials. Use the filer's local administrator credentials instead.

In FIG. 18, field number 3, click the Alias List . . . button to invoke the Connection Reference dialog box, which is used to add new connection aliases or delete existing connection aliases.

In FIG. 18, field number 4, click the Locate Server and Volumes button to initiate the discovery sequence. Once the storage volumes have been discovered, they are listed toward the bottom of the dialog box. Clicking the Close button closes the dialog box, and clicking the Help button opens a Web browser containing help information on the dialog box.

7. File System Checking and Maintenance

The NFM system may include a File System maintenance utility (referred to herein as the FSCK) for diagnosing and correcting any inconsistencies in the system data structures that pertain to files and directories.

In most file systems, a crash entails a full scan of the file system in order to restore system invariants and to make the system data structures consistent again. Most file systems are unable to restore the consistency of the user data, so this is often left to the application.

Verifying and restoring the integrity of the global file system is a different problem than restoring the integrity of the file system within each individual storage server. Generally speaking, restoring the integrity of the file system with the individual storage server(s) is both a logical and temporal prerequisite to restoring the integrity of the global file system. In the following discussion, it is assumed that each storage server will be capable of restoring its own file system depending on the file system technology it is based on (for example, journaling file systems generally provide better support for this and can provide fast recovery), so only checking and restoring the consistency and integrity of the global file system is addressed.

In the case of the NFM system and of its global name space, the aggregated file system can be very large. Thus, a crash of a storage server, of an NFM node, or of certain other components would generally require a full file system scan that could disrupt system operations for a substantial amount of time. For this reason, it should be possible to perform incremental scans only in the specific portions of the global file system that might have been affected by a crash. Such functionality should be coupled with active prevention and soft recovery to be performed within the NFM. The latter item (soft recovery) implies that when the file system stumbles into any type of file system inconsistency, it should temporarily block client access to the offending file system object, trigger corrective actions aimed at the inconsistent object, and resume client access to the access after everything is back to normal.

The intrinsic redundancy built into the aggregated file system allows such recovery actions. So, once a few global invariants and constraints are satisfied (e.g., including most of the data structures that are client-invisible and that build the hierarchy, for example, as shown in FIG. 10), the higher level structures needed to support the global name space abstraction are in place and the focus on consistency can be on individual file system objects.

The structure of the global file system is distributed across metadata volumes and storage volumes and these data structures must be consistent, but typically only with regard to individual file system objects. In other words, the inconsistency of one specific file system object should not affect any other object. This implies that all the metadata structures associated with a given file system object should to be consistent, and this may include ancillary objects such as SHLs. This "local consistency" property is extremely beneficial because, unlike what happens in other systems, it allows file system objects to be repaired while the system is active, without blocking client access to the file being repaired as long as the repair operation is going on.

Because the special metadata objects such as the Mount Entries, the MElist, the MErevmapper cross-reference metadata objects of relevance, the FSCK should be capable of checking and restoring the integrity of such references, as follows:

MEs and MElists. Within each volume, after the integrity of a volume is checked, it should be possible to verify that the MEs in the volume and those in the MElist match. This could be done by looking at the appropriate MElist and checking that the corresponding ME exist; if the ME does not exist, then it should be recreated. This approach would not detect MEs that are present but should no longer exist (a situation that could occur due to a software error). Therefore, additionally or alternatively, each ME could be checked to determine whether or not it should exist (which would generally require an exhaustive scan of the volume); any MEs that should no longer exist should be removed by the AFS.

MErevmappers and MEs. Within the root directory of each VV, after the integrity of a volume is checked, the MErevmapper should be examined to verify that the item it points to as the parent ME indeed exists. If it does not, the MElist in the referencing volume should be checked.

SHLs. If the ID of an SHL or of a file with one or more SHLs appears in the update list, the cross-checking of all the references between SHLs and the file and vice versa should be performed and any broken links should be repaired as needed.

Checking and recovering the integrity of individual file system objects should be performed when operations resume after an NFM or metadata server crash. A crash of the NFM or of the metadata server may result in incomplete updates. Since the NFM metadata files are actually regular user-level files in the metadata server, there is generally no way to guarantee that their integrity constraints are still valid across crashes. So, in cases such as these, the metadata files should be checked to ensure that any metadata files that were being modified at the time of the crash are indeed in a consistent state and, should this not be the case, their consistency should be restored.

Thus, aggregated FSOs that are undergoing modifications at any given time should be tracked, for example, by keeping a list of such FSOs (the "update list"). The update list identifies files to be scanned after a crash so that only the files contained in the list and the associated metadata would have to be examined to verify and restore their integrity and consistency. Files for which modifications have been completed can be removed from the update list in real time or in the background, for example, using a lazy deletion scheme.

As much as possible, such a list can contain file IDs rather than pathnames (although certain operations, such as file creates, may in fact need a pathname rather than a file ID). The use of file IDs allows for a more compact format for the records in the update list. Also, since the streams that compose a file and that are stored within the storage servers have names that include the file ID as a common stem, it should be sufficient to keep track only of the ID file, rather than of the names of the individual streams.

If the update lists are stored locally to the metadata volumes they relate to, the advantage of associating the update list to the metadata (e.g., stored on resilient and fast storage devices) is coupled with that of having the target metadata server in charge of adding entries to the update list before it performs any operations that modifies a file. The issue of synchronicity of operation with respect to the above arises, since the addition of new files to the list should occur (and be committed to disk) BEFORE the first change to the actual FSO is performed. On the other hand, the deletion from the list may be asynchronous, as a delayed deletion would only imply that a few extra files are needlessly checked.

However, the performance impact of this scheme should be minimal, since:

Additions to the update list should be done only for files being updated (only once, as they are opened for writing) or for pathname operations (such as rename, create, etc.), so they are not likely to be on the performance path.

The synchronous I/O to the NFM disk can be overlapped with the open of the metadata file. The I/O should be completed before the first update operation is posted (this would typically require some form of interlocking logic).

The Update List mechanism need not be used with metadata files and fragment files that are related to user-level files only. It can be used with system files, as well. This would typically involve hard links with file ID names to be associated to such files. Since this is somewhat cumbersome, it generally would be easier to have a prefix or something to that effect in each entry of the Update List, that qualifies the name space to which the file refers. So, in principle, it could be possible to use one namespace for client-related files and another one, say, for system-only files, or the latter could be further subdivided, as necessary.

In some cases, a storage server crash may be catastrophic in that the server cannot recover nor its data can be retrieved. This may be handled by means of a special file for each storage server, referred to herein as a "file-by-volume file." The file-by-volume file is stored among the metadata files within the MDS. Each such file typically contains the list of the unique file IDs for the files that have fragment files residing within the storage server. Such list is typically updated before a fragment file is created on the storage server and after a fragment file is removed. The basic Update List mechanism is sufficient to keep the file-by-volume file always accurate. The reason is that the Update List keeps track of the files being created, deleted or modified. If, by any chance, a crash occurs before a file has been added to the file-by-volume list or before it has been removed, the entry in the Update List should allow the existence or non-existence check in the file-by-volume list to be performed and the correction to be carried out as necessary. This also means that there is no need to append one item to (or to delete one item from) the file-by-volume in a synchronous fashion. The Update List is the ultimate log and that is all that should be needed. This implies that one of the checks to be performed by the FSCK on a file in the Update List is that the file is either in or out of the relevant file-by-volume files, depending on whether the operation that was being carried out when the crash occurred was a create or a delete and on whether it is being rolled back or forward.

In case of an unrecoverable crash of a storage server, a scan of the appropriate file-by-volume file yields the list of the affected files. The files that have redundancy can be reconstructed from the redundant fragment files. Those that are not redundant might have segments unavailable. However, this generally would be considered as acceptable for files that do not have redundancy.

Relying on RAID-5 storage in the storage servers can reduce such risks. Downtime may not be avoided, but in the presence of single failures, the data can generally be recovered. In this respect, a foundation for the storage array based on high-availability clusters may provide additional, significant benefits to this class of problems.

8. The Maestro File Manager (™)

Some or all of the functionality described above may be embodied in one or more products from Attune Systems, Inc. referred to as Maestro File Manager (MFM). The MFM may be provided in at least two different versions, specifically a standard version referred to as the FM5500 and a high-availability version referred to as the FM5500-HA.

The MFM may be used in combination with storage array modules from Engenio Information Technologies, Inc. referred to as the E3900 Array Module and the E2600 Array Module.

9. Conclusion

It should be noted that terms such as "client" and "server" are used herein to describe various communication devices that may be used in a communication system, and should not be construed to limit the present invention to any particular communication device type. Thus, a communication device may include, without limitation, a bridge, router, bridge-router (brouter), switch, node, server, computer, or other communication device.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the NFM logic is implemented as a set of computer program instructions that is converted into a computer executable form, stored as such in a computer readable medium, and executed by a microprocessor within the NFM under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A method for managing files by a file switch in a file storage system, each file associated with a file type, the method comprising:
    aggregating, by the file switch, a plurality of storage volumes including at least one native mode volume and at least one extended mode volume into a global namespace;
    allowing, by the file switch, client access to files in the at least one native mode volume indirectly via the aggregated global namespace;
    maintaining, by the file switch, a set of rules for storing files in a plurality of file servers including at least a metadata server and a storage server, the rules defining at least one file type to be stored in the metadata server; and
    storing, by the file switch, a file based at least in part on the file type associated with the file according to the set of rules, whereby the file is stored in the metadata server only if the file type associated with the file is a file type to be stored in the metadata server.

2. A method according to claim 1, further comprising:
    allowing, by the file switch, client access to files in the at least one native mode volume directly.

3. method according to claim 1, further comprising:
    selectively migrating, by the file switch, files from at least one of the at least one native mode volume into at least one of the at least one extended mode volume.

4. A method according to claim 3, wherein such selective migrating comprises:
    converting, by the file switch, a native mode file to an extended mode file stored in a fragmented form over a plurality of file servers.

5. A method according to claim 3, wherein selectively migrating comprises:
    converting, by the file switch, a native mode file to an extended mode file stored redundantly over a plurality of file servers.

6. A method according to claim 1, wherein aggregating comprises:
    creating, by the file switch, a mount point for the native mode volume within the global namespace, the mount point associated with a pathname prefix.

7. A method according to claim 6, wherein allowing client access to files in the at least one native mode volume indirectly via the aggregated global namespace comprises:
    receiving, by the file switch, a first request for access to a native mode file, the first request including a pathname for the native mode file in the global namespace including the pathname prefix; and
    transmitting, by the file switch, a second request to a file server hosting the native mode file, the second request including a pathname for the native mode file in the native mode volume without the pathname prefix.

8. A method according to claim 7, further comprising:
    receiving, by the file switch, a handle from the native mode volume in response to the second request; and transmitting, by the file switch, the handle to the client as a response to the first request.

9. A method according to claim 8, further comprising:
receiving, by the file switch, from the client a third request including the handle; and
transmitting, by the file switch, the third request to the native mode volume.

10. A method according to claim 9, further comprising:
receiving, by the file switch, a reply from the native mode volume in response to the third request; and
transmitting, by the file switch, the reply to the client.

11. A method according to claim 7, wherein transmitting the second request comprises:
spoofing, by the file switch, between a first network file protocol used by the client and a second network file protocol used by the file server.

12. A method according to claim 7, wherein transmitting the second request comprises:
protocol translation, by the file switch, between a first network file protocol used by the client and a second network file protocol used by the file server.

13. A method according to claim 1, further comprising:
managing, by the file switch, file storage operations according to the set of rules,
wherein the rules further define criteria for storing files using the at least one native mode volume and the at least one extended mode volume.

14. A method according to claim 13, wherein the rules further define types of files that may be created in a native mode volume.

15. A method according to claim 14, wherein the rules further define at least one of:
types of files that are expressly allowed to be created in the native mode volume; or
types of files that expressly denied from being created in the native mode volume.

16. A method according to claim 14, wherein the rules further define the types of files that may be created in the native mode volume based on at least one of a file suffix or a file size.

17. A method according to claim 13, wherein storing the file according to the set of rules is performed upon receipt of a request to create the file.

18. A method according to claim 13, wherein storing the file according to the set of rules is performed upon receipt of a request to rename the file.

19. A method according to claim 13, wherein storing the file according to the set of rules involves reapplying the set of rules to a pre-existing file.

20. A switched file apparatus for managing files, the apparatus comprising:
one or more processors; and
a memory coupled to the one or more processors, the one or more processors configured to execute programmed instructions stored in the memory, the programmed instructions comprising:
aggregating a plurality of storage volumes into a global namespace, the plurality of storage volumes including at least one native mode volume and at least one extended mode volume;
allowing client access to files in the at least one native mode volume indirectly via the aggregated global namespace;
maintaining a set of rules for storing files in a plurality of file servers including at least a metadata server and a storage server, the rules defining at least one file type to be stored in the metadata server; and
storing a file based at least in part on the file type associated with the file according to the set of rules, whereby the file is stored in the metadata server only if the file type associated with the file is a file type to be stored in the metadata server.

21. A switched file apparatus according to claim 20, further comprising selectively migrating files from at least one of the at least one native mode volume into at least one of the at least one extended mode volume.

22. A switched file apparatus according to claim 21, wherein such selective migration comprises:
converting a native mode file to an extended mode file stored in a fragmented form over a plurality of file servers.

23. A switched file apparatus according to claim 21, wherein such selective migration comprises:
converting a native mode file to an extended mode file stored redundantly over a plurality of file servers.

24. A switched file apparatus according to claim 20, further comprising creating a mount point for the native mode volume within the global namespace, the mount point associated with a pathname prefix.

25. A switched file apparatus according to claim 24, further comprising:
receiving a first request for access to a native mode file, the first request including a pathname for the native mode file in the global namespace including the pathname prefix; and
transmitting a second request to a file server hosting the native mode file, the second request including a pathname for the native mode file in the native mode volume without the pathname prefix.

26. A switched file apparatus according to claim 25, further comprising:
receiving a handle from the native mode volume in response to the second request; and
transmitting the handle to a client as a response to the first request.

27. A switched file apparatus according to claim 26, further comprising:
receiving from the client a third request including the handle; and
transmitting the third request to the native mode volume.

28. A switched file apparatus according to claim 27, further comprising:
receiving a reply from the native mode volume in response to the third request; and transmitting the reply to the client.

29. A switched file apparatus according to claim 25, wherein transmitting the second request comprises:
spoofing between a first network file protocol used by a client and a second network file protocol used by a file server.

30. A switched file apparatus according to claim 25, wherein transmitting the second request comprises:
protocol translation between a first network file protocol used by a client and a second network file protocol used by a file server.

31. A switched file apparatus according to claim 20, further comprising managing file storage operations according to the set of rules, wherein the rules further define criteria for storing files using the at least one native mode volume and the at least one extended mode volume.

32. A switched file apparatus according to claim 31, wherein the rules define types of files that may be created in a native mode volume.

33. A switched file apparatus according to claim 32, wherein the rules define at least one of:
   types of files that are expressly allowed to be created in the native mode volume; or
   types of files that are expressly denied from being created in the native mode volume.

34. A switched file apparatus according to claim 32, wherein the rules specify the types of files that may be created in the native mode volume based on at least one of a file suffix or a file size.

35. A switched file apparatus according to claim 31, further comprising storing the file according to the set of rules upon receipt of a request to create the file.

36. A switched file apparatus according to claim 31, further comprising storing the file according to the set of rules upon receipt of a request to rename the file.

37. A switched file apparatus according to claim 31, further comprising selectively reapplying the set of rules to a pre-existing file.

38. A method of storing files by a file switch in a switched file system, each file associated with a file type, the method comprising:
   maintaining, by the file switch, a set of rules for storing files in a plurality of file servers including at least a metadata server and a storage server, the rules defining at least one file type to be stored in the metadata server; and
   storing, by the file switch, a file based at least in part on the file type associated with the file according to the set of rules, whereby the file is stored in the metadata server only if the file type associated with the file is a file type to be stored in the metadata server.

39. A method according to claim 38, wherein the rules further define a file size threshold for each file type, and wherein the file is stored in the metadata server only if the file type associated with the file is a file type to be stored in the metadata server and a size of the file is below the file size threshold defined for the file type.

40. A method according to claim 39, wherein the file size threshold is the same for all file types.

41. A method according to claim 39, wherein the file size threshold is different for at least two different file types.

42. A method according to claim 38, wherein storing the file according to the set of rules is performed upon receipt of a request to create the file.

43. A method according to claim 38, wherein storing the file according to the set of rules is performed upon receipt of a request to rename the file.

44. A method according to claim 38, wherein storing the file according to the set of rules involves reapplying the set of rules to a pre-existing file.

45. A switched file apparatus for storing files, each file associated with a file type, the apparatus comprising:
   one or more processors; and
   a memory coupled to the one or more processors, the one or more processors configured to execute programmed instructions stored in the memory, the programmed instructions comprising:
      maintaining a set of rules for storing files in a plurality of file servers comprising a metadata server and a storage server, the rules defining at least one file type to be stored in the metadata server; and
      storing a file based at least in part on the file type associated with the file according to the set of rules, whereby the file is stored in the metadata server only if the file type associated with the file is a file type to be stored in the metadata server.

46. A switched file apparatus according to claim 45, wherein the rules further define a file size threshold for each file type, and wherein the file is stored in the metadata server only if the file type associated with the file is a file type to be stored in the metadata server and a size of the file is below the file size threshold defined for the file type.

47. A switched file apparatus according to claim 46, wherein the file size threshold is the same for all file types.

48. A switched file apparatus according to claim 46, wherein the file size threshold is different for at least two different file types.

49. A switched file apparatus according to claim 45, wherein storing the file according to the set of rules is performed upon receipt of a request to create the file.

50. A switched file apparatus according to claim 45, wherein storing the file according to the set of rules is performed upon receipt of a request to rename the file.

51. A switched file apparatus according to claim 45, wherein storing the file according to the set of rules involves reapplying the set of rules to a pre-existing file.

* * * * *